(12) United States Patent
Holman

(10) Patent No.: US 10,452,192 B2
(45) Date of Patent: Oct. 22, 2019

(54) APPARATUS AND METHODS FOR ENHANCING DIGIT SEPARATION AND REPRODUCTION

(71) Applicant: Tactual Labs Co., New York, NY (US)

(72) Inventor: David Holman, Toronto (CA)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/036,218

(22) Filed: Jul. 16, 2018

(65) Prior Publication Data

US 2019/0018534 A1 Jan. 17, 2019

Related U.S. Application Data

(60) Provisional application No. 62/533,405, filed on Jul. 17, 2017.

(51) Int. Cl.
*G06F 3/041* (2006.01)
*G06F 3/044* (2006.01)
*G06F 3/01* (2006.01)

(52) U.S. Cl.
CPC ............ *G06F 3/0416* (2013.01); *G06F 3/014* (2013.01); *G06F 3/044* (2013.01); *G06F 3/0418* (2013.01); *G06F 2203/04101* (2013.01); *G06F 2203/04104* (2013.01)

(58) Field of Classification Search
CPC ..... G06F 3/0416–041662; G06F 3/014; G06F 3/0418–04186; G06F 3/044–0448; G06F 2203/04101; G06F 2203/04104
USPC ...................... 178/18.01–19.07; 345/173–178
See application file for complete search history.

(56) References Cited

U.S. PATENT DOCUMENTS

| 2011/0115732 A1* | 5/2011 | Coni ...................... G06F 3/0414 345/173 |
| 2012/0086667 A1* | 4/2012 | Coni ...................... G06F 3/0416 345/174 |
| 2016/0246396 A1* | 8/2016 | Dickinson ........... G06F 3/03545 |

* cited by examiner

*Primary Examiner* — Michael Pervan
(74) *Attorney, Agent, or Firm* — Adam Landa

(57) ABSTRACT

A handheld controller and a system for modeling movement of fingers about the handheld controller is disclosed. In an embodiment, the handheld controller generates signals for, and acquires touch and infusion data. In an embodiment, a processor creates a heatmap and an infusion map, and combines the information in the maps to determine boundaries between finger positions. In an embodiment, movement of a particular digit on a handheld controller is identified through such boundary constraints. In an embodiment, movement of fingers about a handheld controller is efficiently modeled based on the boundary constraints.

20 Claims, 50 Drawing Sheets

| FREQUENCY (KHz) | INDEX FINGER (mVpp) | MIDDLE FINGER (mVpp) | RING FINGER (mVpp) | PALM (mVpp) |
|---|---|---|---|---|
| 10 | 890 | 800 | 820 | 820 |
| 25 | 880 | 740 | 740 | 740 |
| 50 | 860 | 620 | 600 | 620 |
| 75 | 840 | 560 | 500 | 520 |
| 100 | 825 | 500 | 440 | 460 |
| 125 | 820 | 440 | 385 | 405 |
| 150 | 810 | 400 | 340 | 360 |
| 175 | 810 | 380 | 320 | 340 |
| 200 | 810 | 360 | 300 | 320 |
| 250 | 790 | 300 | 260 | 300 |
| 300 | 790 | 280 | 240 | 280 |
| 400 | 800 | 240 | 220 | 240 |
| 500 | 760 | 220 | 140 | 120 |
| 600 | 750 | 200 | 00 | 140 |
| 700 | 740 | 180 | 90 | 130 |
| 800 | 720 | 160 | 80 | 120 |
| 900 | 720 | 160 | 78 | 110 |
| 1000 | 710 | 140 | 74 | 108 |

FIG. 3

|  | COLUMN 1 SENSORS | COLUMN 2 SENSORS |
|---|---|---|
| ROW 1 SENSORS | 28.45 | 14.09 |
| ROW 2 SENSORS | 15.02 | 14.17 |

|  | COLUMN 1 SENSORS | COLUMN 2 SENSORS |
|---|---|---|
| ROW 1 SENSORS | 18.16 | 23.63 |
| ROW 2 SENSORS | 18.82 | 18.89 |

|  | COLUMN 1 SENSORS | COLUMN 2 SENSORS |
|---|---|---|
| ROW 1 SENSORS | 18.0 | 18.6 |
| ROW 2 SENSORS | 18.63 | 27.06 |

|  | COLUMN 1 SENSORS | COLUMN 2 SENSORS |
|---|---|---|
| ROW 1 SENSORS | 18.6 | 18.23 |
| ROW 2 SENSORS | 28.4 | 18.34 |

|  | COLUMN 1 SENSORS | COLUMN 2 SENSORS |
|---|---|---|
| ROW 1 SENSORS | 23.88 | 17.93 |
| ROW 2 SENSORS | 24.39 | 18.77 |

|  | COLUMN 1 SENSORS | COLUMN 2 SENSORS |
|---|---|---|
| ROW 1 SENSORS | 24.01 | 17.87 |
| ROW 2 SENSORS | 19.03 | 25.39 |

|  | COLUMN 1 SENSORS | COLUMN 2 SENSORS |
|---|---|---|
| ROW 1 SENSORS | 18.97 | 18.18 |
| ROW 2 SENSORS | 25.6 | 25.2 |

|  | COLUMN 1 SENSORS | COLUMN 2 SENSORS |
|---|---|---|
| ROW 1 SENSORS | 0.3 | 0.47 |
| ROW 2 SENSORS | 0.24 | 0.28 |

|  | COLUMN 1 SENSORS | COLUMN 2 SENSORS |
|---|---|---|
| ROW 1 SENSORS | 2.51 | 3.66 |
| ROW 2 SENSORS | 2.78 | 3.07 |

|  | COLUMN 1 SENSORS | COLUMN 2 SENSORS |
|---|---|---|
| ROW 1 SENSORS | 5.74 | 6.79 |
| ROW 2 SENSORS | 6.41 | 7.31 |

|  | COLUMN 1 SENSORS | COLUMN 2 SENSORS |
|---|---|---|
| ROW 1 SENSORS | 10.71 | 11.94 |
| ROW 2 SENSORS | 10.82 | 11.67 |

| INDEX FINGER / MIDDLE FINGER | COLUMN 1 SENSORS | COLUMN 2 SENSORS |
|---|---|---|
| ROW 1 SENSORS | 19.66 / 9.78 | 22.08 / 11.42 |
| ROW 2 SENSORS | 14.77 / 4.76 | 19.61 / 10.3 |

| INDEX FINGER / MIDDLE FINGER | COLUMN 1 SENSORS | COLUMN 2 SENSORS |
|---|---|---|
| ROW 1 SENSORS | 29.97 / 16.31 | 17.88 / 8.54 |
| ROW 2 SENSORS | 17.78 / 8.31 | 16.82 / 7.98 |

| INDEX FINGER / MIDDLE FINGER | COLUMN 1 SENSORS | COLUMN 2 SENSORS |
|---|---|---|
| ROW 1 SENSORS | 20.98 / 11.01 | 21.61 / 11.7 |
| ROW 2 SENSORS | 30.2 / 18.54 | 20.19 / 10.85 |

| INDEX FINGER / MIDDLE FINGER | COLUMN 1 SENSORS | COLUMN 2 SENSORS |
|---|---|---|
| ROW 1 SENSORS | 19.99 / 9.8 | 20.94 / 10.65 |
| ROW 2 SENSORS | 19.72 / 9.4 | 30.0 / 17.91 |

| INDEX FINGER / MIDDLE FINGER | COLUMN 1 SENSORS | COLUMN 2 SENSORS |
|---|---|---|
| ROW 1 SENSORS | 13.94 / 33.33 | 5.69 / 20.44 |
| ROW 2 SENSORS | 5.8 / 20.11 | 5.16 / 19.49 |

| INDEX FINGER / MIDDLE FINGER | COLUMN 1 SENSORS | COLUMN 2 SENSORS |
|---|---|---|
| ROW 1 SENSORS | 8.13 / 24.0 | 8.51 / 24.99 |
| ROW 2 SENSORS | 13.12 / 32.43 | 7.61 / 23.76 |

| INDEX FINGER / MIDDLE FINGER | COLUMN 1 SENSORS | COLUMN 2 SENSORS |
|---|---|---|
| ROW 1 SENSORS | 6.96 / 23.06 | 7.67 / 24.4 |
| ROW 2 SENSORS | 7.31 / 23.42 | 13.9 / 33.33 |

| INDEX FINGER / MIDDLE FINGER | COLUMN 1 SENSORS | COLUMN 2 SENSORS |
|---|---|---|
| ROW 1 SENSORS | 6.77 / 22.31 | 8.26 / 25.0 |
| ROW 2 SENSORS | 2.16 / 17.55 | 6.89 / 22.76 |

| INDEX FINGER / MIDDLE FINGER | COLUMN 1 SENSORS | COLUMN 2 SENSORS |
|---|---|---|
| ROW 1 SENSORS | 14.81 / 32.54 | 16.51 / 19.39 |
| ROW 2 SENSORS | 15.84 / 19.11 | 25.53 / 18.1 |

| INDEX FINGER / MIDDLE FINGER | COLUMN 1 SENSORS | COLUMN 2 SENSORS |
|---|---|---|
| ROW 1 SENSORS | 10.77 / 29.82 | 20.08 / 20.16 |
| ROW 2 SENSORS | 18.6 / 19.21 | 29.57 / 18.53 |

| INDEX FINGER / MIDDLE FINGER | COLUMN 1 SENSORS | COLUMN 2 SENSORS |
|---|---|---|
| ROW 1 SENSORS | 18.36 / 22.35 | 19.51 / 23.48 |
| ROW 2 SENSORS | 14.29 / 32.56 | 29.43 / 18.89 |

| INDEX FINGER / MIDDLE FINGER | COLUMN 1 SENSORS | COLUMN 2 SENSORS |
|---|---|---|
| ROW 1 SENSORS | 10.87 / 29.53 | 19.96 / 20.11 |
| ROW 2 SENSORS | 15.57 / 16.62 | 29.4 / 18.61 |

| INDEX FINGER / MIDDLE FINGER | COLUMN 1 SENSORS | COLUMN 2 SENSORS |
|---|---|---|
| ROW 1 SENSORS | -1.78 / -2.49 | -1.1 / -1.97 |
| ROW 2 SENSORS | -1.49 / -2.33 | -1.6 / -2.77 |

| INDEX FINGER / MIDDLE FINGER | COLUMN 1 SENSORS | COLUMN 2 SENSORS |
|---|---|---|
| ROW 1 SENSORS | 1.73 / 3.25 | 1.86 / 3.34 |
| ROW 2 SENSORS | 1.73 / 3.11 | 2.11 / 4.07 |

| INDEX FINGER / MIDDLE FINGER | COLUMN 1 SENSORS | COLUMN 2 SENSORS |
|---|---|---|
| ROW 1 SENSORS | 4.73 / 6.4 | 5.02 / 6.53 |
| ROW 2 SENSORS | 4.96 / 6.28 | 6.05 / 8.85 |

| INDEX FINGER / MIDDLE FINGER | COLUMN 1 SENSORS | COLUMN 2 SENSORS |
|---|---|---|
| ROW 1 SENSORS | 10.29 / 9.29 | 11.1 / 9.45 |
| ROW 2 SENSORS | 10.64 / 9.5 | 11.57 / 11.44 |

APPARATUS AND METHODS FOR ENHANCING DIGIT SEPARATION AND REPRODUCTION

This application claims the benefit of U.S. Provisional Patent Application No. 62/533,405, entitled "Apparatus and Methods for Enhancing Digit Separation and Reproduction," filed Jul. 17, 2017, the contents of the aforementioned application hereby incorporated herein by reference.

FIELD

The disclosed systems and methods relate, in general, to the field of contact and non-contact sensing, and in particular to sensing and interpreting contact and non-contact events.

BACKGROUND

This application relates to user interfaces such as the fast multi-touch sensors and other methods and techniques disclosed in: U.S. Pat. No. 9,019,224 entitled "Low-Latency Touch Sensitive Device"; U.S. Pat. No. 9,235,307 entitled "Fast Multi-Touch Stylus And Sensor"; U.S. Pat. No. 9,710,113 entitled "Fast Multi-Touch Sensor With User-Identification Techniques"; U.S. Pat. No. 9,811,214 entitled "Fast Multi-Touch Noise Reduction"; U.S. Pat. No. 9,158,411 entitled "Fast Multi-Touch Post Processing"; U.S. patent application Ser. No. 14/603,104, entitled "Dynamic Assignment of Possible Channels in a Touch Sensor"; U.S. Pat. No. 9,710,116 entitled "Frequency Conversion in a Touch Sensor"; U.S. Pat. No. 9,933,880 entitled "Orthogonal Signaling Touch User, Hand and Object Discrimination Systems and Methods"; U.S. patent application Ser. No. 14/812,529 entitled "Differential Transmission for Reduction of Cross-Talk in Projective Capacitive Touch Sensors"; U.S. patent application Ser. No. 15/162,240, entitled "Transmitting and Receiving System and Method for Bidirectional Orthogonal Signaling Sensors"; U.S. Provisional Patent Application No. 62/473,908, entitled "Hand Sensing Controller," filed Mar. 20, 2017; and U.S. Provisional Patent Application No. 62/488,753, entitled "Heterogenous Sensing Apparatus and Methods" filed on Apr. 22, 2017. The entire disclosures of the aforementioned patents and patent applications are incorporated herein by reference.

In recent years, the capacitive touch sensors for touch screens have gained popularity, in addition to the development of multi-touch technologies. A capacitive touch sensor comprises rows and columns of conductive material in spatially separated layers (sometimes on the front and back of a common substrate). To operate the sensor, a row is stimulated with an excitation signal. The amount of coupling between each row and column can be affected by an object proximate to the junction between the row and column (i.e., taxel). In other words, a change in capacitance between a row and column can indicate that an object, such as a finger, is touching the sensor (e.g., screen) near the region of intersection of the row and column. By sequentially exciting the rows and measuring the coupling of the excitation signal at the columns, a heatmap reflecting capacitance changes, and thus proximity, can be created.

Generally, taxel data is aggregated into heatmaps. These heatmaps are then post-processed to identify touch events, and the touch events are streamed to downstream processes that seek to understand touch interaction, including, without limitation, gestures, and the objects in which those gestures are performed.

In 2013, the application leading to U.S. Pat. No. 9,019,224 was filed (hereinafter the "'224 Patent"). The '224 Patent describes a fast multi-touch sensor and method. Among other things, the '224 Patent describes simultaneous excitation of the rows using unique, frequency orthogonal signals on each row. According to the '224 Patent, the frequency spacing ($\Delta f$) between the signals is at least the reciprocal of the measurement period ($\tau$). Thus, as illustrated in the '224 Patent, frequencies spaced by 1 KHz (i.e., having a $\Delta f$ of 1,000 cycles per second) required at least a once per millisecond measurement period (i.e., having T of $\frac{1}{1,000}$th of a second). Numerous patent applications have been filed concerning interaction sensing using a sensor driven by a simultaneous orthogonal signaling scheme, including, without limitation, Applicant's prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing."

These systems and methods are generally directed to multi-touch sensing on planar sensors. Obtaining information to understand a user's touch, gestures and interactions with an object introduces a myriad of possibilities, but because handheld objects, for example, come in a multitude of shapes, it can be difficult to incorporate capacitive touch sensors into objects such as a controller, ball, stylus, wearable device, and so on, so that the sensors can thereby provide information relative to a user's gestures and other interactions with the handheld objects.

While fast multi-touch sensors enable faster sensing on planar and non-planar surfaces, they lack capabilities to provide detailed detection of non-contact touch events occurring more than a few millimeters from the sensor surface. Fast multi-touch sensors also lack capabilities to provide more detailed information relative to the identification, and/or position and orientation of body parts (for example, the finger(s), hand, arm, shoulder, leg, etc.) while users are performing gestures or other interactions.

BRIEF DESCRIPTION OF THE DRAWINGS

The foregoing and other objects, features, and advantages of the disclosure will be apparent from the following more particular descriptions of embodiments as illustrated in the accompanying drawings, in which the reference characters refer to the same parts throughout the various views. The drawings are not necessarily to scale, with emphasis instead being placed upon illustrating principles of the disclosed embodiments.

FIG. 3 is a table of illustrative amplitude measurements, in mVpp, for injected signals conducted across areas of a hand.

DETAILED DESCRIPTION

Figure 1:
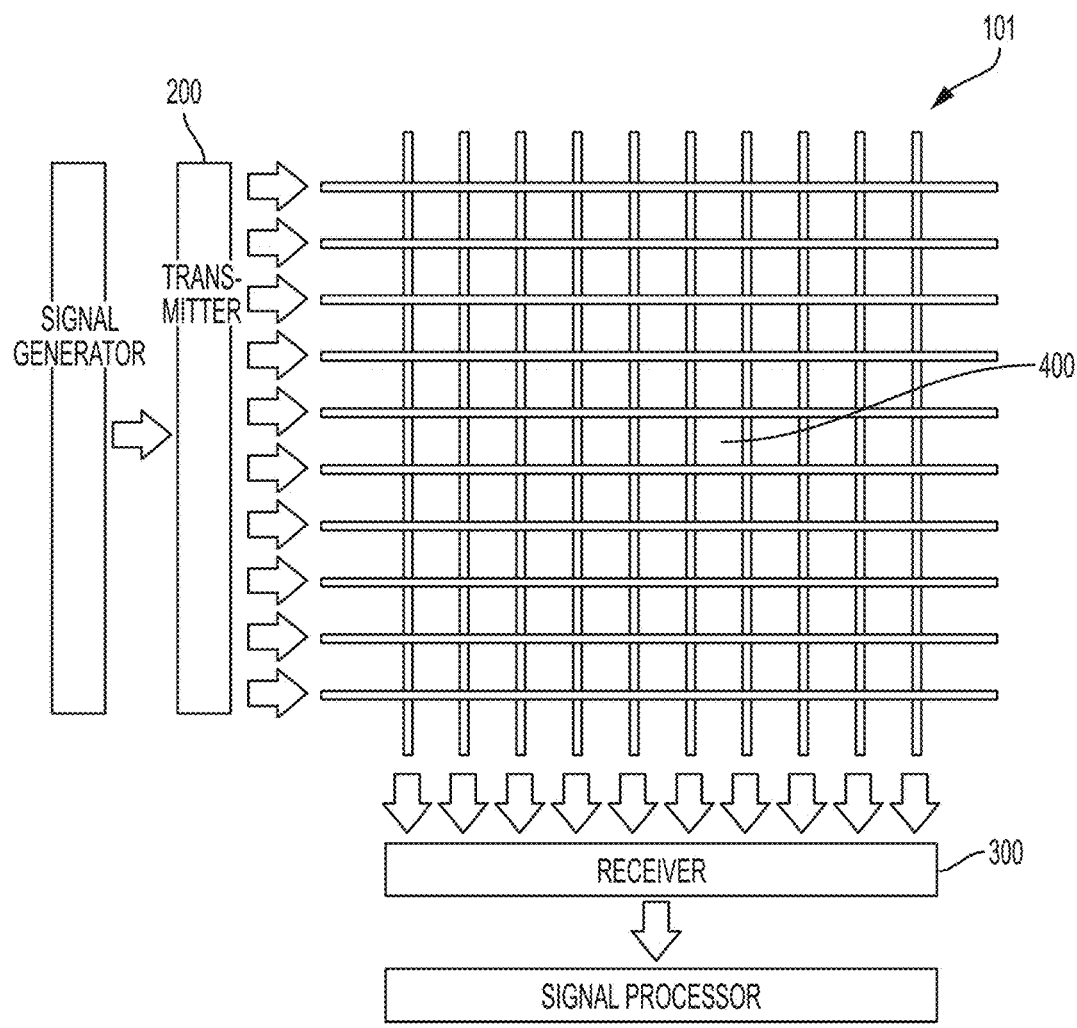
FIG. 1 provides a high-level block diagram illustrating an embodiment of a low-latency touch sensor device having two conductive layers.

Throughout this disclosure, the terms "touch", "touches", "touch events" "contact", "contacts", "hover", or "hovers" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which being a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency—e.g., the first frequency being 10 Mhz and the second frequency being 10 Mhz; or could be different frequencies—e.g., the first frequency being 10 Mhz and the second frequency being 11 Mhz. Context may dictate otherwise, for example, where a first and a second frequency are further limited to being orthogonal to each other in frequency, in which case, they could not be the same frequency.

The presently disclosed heterogeneous sensors and methods provide for the detection of touch and non-contact touch events and detect more data and resolve more accurate data resulting from touch events occurring on the sensor surface and touch events (including near and far non-contact touch events) occurring away from the sensor surface.

Fast Multi-Touch Sensing (FMT)

FIG. 1 illustrates certain principles of a fast multi-touch sensor 100 in accordance with an embodiment. Transmitter 200 transmits a different signal into each of the surface's rows. Generally, the signals are "orthogonal", i.e. separable and distinguishable from each other. Receiver 300 is attached to each column. The receiver 300 is designed to receive any of the transmitted signals, or an arbitrary combination of them, and to individually measure the quantity of each of the orthogonal transmitted signals present on that column. The touch surface 400 of the sensor 100 comprises a series of rows and columns (not all shown), along which the orthogonal signals can propagate.

In an embodiment, a touch event proximate to, or in the vicinity of, a row-column junction causes a change in coupling between the row and column. In an embodiment, when the rows and columns are not subject to a touch event, a lower or negligible amount of signal may be coupled between them, whereas, when they are subject to a touch event, a higher or non-negligible amount of signal is coupled between them. In an embodiment, when the rows and columns are not subject to a touch event, a higher amount of signal may be coupled between them, whereas, when they are subject to a touch event, a lower amount of signal is coupled between them. As discussed above, the touch, or touch event does not require a physical touching, but rather an event that affects the level of the coupled signal.

Because the signals on the rows are orthogonal, multiple row signals can be coupled to a column and distinguished by the receiver. Likewise, the signals on each row can be coupled to multiple columns. For each column coupled to a given row, the signals found on the column contain information that will indicate which rows are being touched simultaneously with that column. The signal strength or quantity of each signal received is generally related to the amount of coupling between the column and the row carrying the corresponding signal, and thus, may indicate a distance of the touching object to the surface, an area of the surface covered by the touch, and/or the pressure of the touch.

In an embodiment, the orthogonal signals being transmitted into the rows may be unmodulated sinusoids, each having a different frequency, the frequencies being chosen so that they can be easily distinguished from each other in the receiver. In an embodiment, frequencies are selected to provide sufficient spacing between them such that they can be easily distinguished from each other in the receiver. In an embodiment, no simple harmonic relationships exist between the selected frequencies. The lack of simple harmonic relationships may mitigate nonlinear artifacts that can cause one signal to mimic another.

In an embodiment, a "comb" of frequencies may be employed. In an embodiment, the spacing between adjacent frequencies is constant. In an embodiment, the highest frequency is less than twice the lowest. In an embodiment, the spacing between frequencies, $\Delta f$, is at least the reciprocal of the measurement period $\tau$. In an embodiment, to determine the strength of row signals present on a column the signal on the column is received over a measurement period $\tau$. In an embodiment, a column may be measured for one millisecond ($\tau$) using frequency spacing ($\Delta f$) of one kilohertz (i.e., $\Delta f=1/\tau$). In an embodiment, a column is measured for one millisecond ($\tau$) using frequency spacing ($\Delta f$) greater than or equal to one kilohertz (i.e., $\Delta f>1/\tau$). In an embodiment, a column may be measured for one millisecond ($\tau$) using frequency spacing ($\Delta f$) greater than or equal to one kilohertz (i.e., $\Delta f \geq 1/\tau$). It will be apparent to one of skill in the art in view of this disclosure that the one millisecond measurement period ($\tau$) is merely illustrative, and that other measurement periods can be used. It will be apparent to one of skill in the art in view of this disclosure that frequency spacing may be substantially greater than the minimum of $\Delta f=1/\tau$ to permit robust design.

In an embodiment, unique orthogonal sinusoids may be generated by a drive circuit or signal generator. In an embodiment, unique orthogonal sinusoids may be transmitted on separate rows by a transmitter. To identify touch events, a receiver receives signals present on a column and a signal processor analyzes the signal to determine the strength of each of the unique orthogonal sinusoids. In an embodiment, the identification can be supported with a frequency analysis technique, or by using a filter bank. In an embodiment, the identification can be supported with a Fourier transform. In an embodiment, the identification can be supported with a fast Fourier transform (FFT). In an embodiment, the identification can be supported with a discrete Fourier transform (DFT). In an embodiment, a DFT is used as a filter bank with evenly-spaced bandpass filters. In an embodiment, prior to analysis, the received signals can be shifted (e.g., heterodyned) to a lower or higher center frequency. In an embodiment, when shifting the signals, the frequency spacing of the unique orthogonal signals is maintained.

Once the signals' strengths have been calculated (e.g., for at least two frequencies (corresponding to rows) or for at least two columns), a two-dimensional heatmap can be created, with the signal strength being the value of the map at that row/column intersection. In an embodiment, the signals' strengths are calculated for each frequency on each column. In an embodiment, the signal strength is the value of the heatmap at that row/column intersection. In an embodiment, post processing may be performed to permit the heatmap to more accurately reflect the events it portrays. In an embodiment, the heatmap can have one value represent each row-column junction. In an embodiment, the heatmap can have two or more values (e.g., quadrature values) represent each row/column junction. In an embodiment, the heatmap can be interpolated to provide more robust or additional data. In an embodiment, the heatmap may be used to infer information about the size, shape, and/or orientation of the interacting object.

In an embodiment, a modulated or stirred sinusoid may be used in lieu of, in combination with, and/or as an enhancement of, the sinusoid embodiment. In an embodiment, frequency modulation of the entire set of sinusoids may be used to keep them from appearing at the same frequencies by "smearing them out." In an embodiment, the set of sinusoids may be frequency modulated by generating them all from a single reference frequency that is, itself, modulated. In an embodiment, the sinusoids may be modulated by periodically inverting them on a pseudo-random (or even truly random) schedule known to both the transmitter and receiver. Because many modulation techniques are independent of each other, in an embodiment, multiple modulation techniques could be employed at the same time, e.g. frequency modulation and direct sequence spread spectrum modulation of the sinusoid set. Although potentially more complicated to implement, such multiple modulated implementation may achieve better interference resistance.

While the discussion above focused on magnitude, phase shift of the signal may also provide useful information. It has been understood that a measure corresponding to signal strength in a given bin (e.g., $(I^2+Q^2)$ or $(I^2+Q^2)^{1/2}$) changes as a result of a touch event proximate to a tixel. Because the square-root function is computationally expensive, the former $(I^2+Q^2)$ is often a preferred measurement. Attention has not been focused on phase shift occurring as a consequence of touch or other sensor interaction, likely because in an uncorrelated system, the phases of the signals received tend to be random from frame to frame. The recent development of frame-phase synchronization overcame certain conditions in which noise or other artifacts produce interference with, jitter in, or phantom touches on an FMT sensor. Nonetheless, frame-phase synchronization was used in an effort to better measure the signal strength.

Synchronization of the phase from frame to frame, however, led to the discovery that touch events affect the phase of signals, and thus, touch events can be detected by examining changes in the phase corresponding to a received frequency (e.g., a bin). Thus, in addition to the received signal strength, the received signal phase also informs detection. In an embodiment, phase changes are used to detect events. In an embodiment, a combination of changes in signal strength and changes in phase are used to detect touch events. In an embodiment, an event delta (a vector representing a change of phase and the change in signal strength of the received signal) is calculated. In an embodiment, events are detected by examining the change in a delta over time.

The implementation of frame-phase synchronization provides an opportunity for obtaining another potential source of data that can be used for detecting, identifying and/or measuring an event. At least some of the noise that affects the measurement of the signal strength may not affect the measurement of phase. Thus, this phase measurement may be used instead of, or in combination with a signal strength measurement to detect, identify and/or measure a touch event. The measurement of received signal can refer to measurement of the phase, determination of signal strength and/or both. For the avoidance of doubt, it is within the scope of detecting, identifying and/or measuring an event to detect, identify and/or measure hover (non-touch), contact and/or pressure.

Absent frame-phase synchronization, even in the absence of other stimuli (such as touch), phase may not remain stable from one frame to another. In an embodiment, if phase were to change from one frame to another (e.g., due to lack of synchronization) the information that could be extracted from changes in the phase may not reveal meaningful information about an event. In an embodiment, synchronization of phase for each frame (e.g., by methods discussed) in the absence of other stimuli, phase remains stable frame-to-frame, and meaning can be extracted from frame-to-frame changes in phase.

Many applications for capacitive sensing have involved touch screens. Accordingly, the level of visual transparency of a touch sensor has been important to persons of skill in the art. But it will be apparent to a person of skill in the art in view of this disclosure that because of the properties of the presently disclosed technology and innovations in some embodiments, visual transparency is not a primary consideration. In some embodiments, visual transparency may be a secondary consideration. In some embodiments, visual transparency is not a consideration at all.

Frequency Infusion (Injection)

Generally, as the term is used herein, frequency infusion (also referred to as injection) refers to the process of transmitting signals of a particular frequency (or of particular frequencies) to the body of a user, effectively allowing the body (or parts of the body) to become an active transmitting source. In an embodiment, an electrical signal is injected into the hand (or other part of the body), and this signal can be detected by the capacitive touch sensor even when the hand (or fingers or other part of the body) are not in direct contact with the touch surface. This allows the proximity and orientation of the hand (or finger or some other body part) to be determined, relative to a surface. In an embodiment, signals are carried (e.g., conducted) by the body, and depending on the frequencies involved, may be carried near the surface or below the surface as well. In an embodiment, frequencies of at least the KHz range may be used in frequency infusion. In an embodiment, frequencies in the MHz range may be used in frequency injection.

In an embodiment, frequency infusion interactions can provide hover information up to 10 cm away. In an embodiment, frequency infusion interactions can provide hover information at distances greater than 10 cm. In an embodiment, frequency injection interactions provide a signal level (in dB) that is roughly linear with distance. In an embodiment, received signal levels can be achieved by injecting a low amplitude voltage, e.g., 1 Volt peak-to-peak (Vpp). Single or multiple frequencies can be injected by each signal injection conductor. As used herein, the term "signal injection conductor" refers to an electrode; the terms "electrode", "electrode dot", "dot electrode" and "dot" may also be used interchangeably with the term "signal infusion conductor" or "signal injection conductor" within this context. In an embodiment, for skin contact, a dot electrode may employ a contact substance that is effective in converting between the ionic signal and the electrical signal. In an embodiment, the dot electrode can use a silver or silver chloride sensing element. In an embodiment, a Red Dot™ Monitoring Electrode with Foam Tape and Sticky Gel, available from 3M, may be employed as a signal infusion conductor.

In an embodiment, a single dot electrode can be used to inject one or more frequencies. In an embodiment, each of a plurality of dot electrodes spaced from one another can be used to inject single or multiple frequencies. In an embodiment, dot electrodes may be used to inject signal into a plurality of the digits on a hand. In an embodiment, dot electrodes may be used to inject one or more frequencies into or onto a user at one, or a plurality of other body parts. These might include ears, the nose, the mouth and jaw, feet and toes, elbows and knees, chest, genitals, buttocks, etc. In an embodiment, dot electrodes may be used to inject signal to a user at one, or a plurality of locations on a seat, rest, or restraint.

In an embodiment, the degree of contact between the user and the dot electrode may dictate the amplitude voltage used. In an embodiment, if a highly conductive connection is made between the user and the dot electrode, a lower amplitude voltage may be used, whereas if a less conductive connection is made between the user and the dot electrode, a higher amplitude voltage may be used. In an embodiment, actual contact is not required between the dot electrode and the skin of the user. In an embodiment, clothing and/or other layers may exist between the dot electrode and the user.

In an embodiment, where the infusion area or point is generally closer to the user interaction point, a lower amplitude voltage may be used; although care must be taken to allow the user's body to conduct the signal, and not to have the injection point so close to the user interaction point that the dot electrode itself interacts at a meaningful level with the various receivers measuring interaction. When referring to an injection point or an interaction point herein, it should be understood that this refers not to an actual point, but rather to an area where the signal is injected or where the interaction takes place, respectively. In an embodiment, the infusion area or point is a relatively small area. In an embodiment, the infusion area is a finger pad. In an embodiment, the infusion area is a large area. In an embodiment, the infusion area is an entire hand. In an embodiment, the infusion area is an entire person.

In an embodiment, dot electrodes are located at the mid-finger and fingertips may be used as the body-side of the interaction area. In an embodiment, where multiple infusion areas or points are used on a body, other locations of the body may be grounded to better isolate the signals. In an embodiment, frequencies are injected at the mid-finger on a plurality of digits, while a grounding contact is placed near one or more of the proximal knuckles. Grounding contacts may be similar (or identical) in form and characteristics with electrode dots. In an embodiment, for application directly to the skin, similar dot electrodes employing a silver or silver chloride sensing element may be used. In an embodiment, the identity of the fingers near a particular sensor is enhanced by injecting different frequencies to each finger and grounding around, and/or between them. As an example, five injector pads may be positioned proximate to the five knuckles where the fingers join to the hand, and ten unique, frequency orthogonal signals (frequency orthogonal with the other injected signals and the signals used by the touch detector) are injected into the hand via each of the five injector pads. In the example, each of the five injector pads injects two separate signals, an in an embodiment, each pair of signals are at relatively distant frequencies from each other because higher and lower frequencies have differing detection characteristics.

In an embodiment, dot electrodes can be used for both injecting (e.g., transmitting) and receiving signals. In an embodiment, the signal or signals injected may be periodic. In an embodiment, the signal or signals injected may be sinusoidal. In an embodiment, an injected signal can comprise one or more of a set of unique orthogonal signals. In an embodiment, an injected signal can comprise one or more of a set of unique orthogonal signals, where other signals from that set are transmitted on other dot electrodes. In an embodiment, an injected signal can comprise one or more of a set of unique orthogonal signals, where other signals from that set are transmitted on the rows of a heterogeneous sensor. In an embodiment, an injected signal can comprise one or more of a set of unique orthogonal signals, where other signals from that set are transmitted on both other dot electrodes and the rows of a heterogeneous sensor. In an embodiment, the sinusoidal signals have a 1 Vpp. In an embodiment, the sinusoidal signals are generated by a drive circuitry. In an embodiment, the sinusoidal signals are generated by a drive circuitry including a waveform generator. In an embodiment, an output of the waveform generator is fed to each dot electrode that is used to inject signal. In an embodiment, more than one output of the waveform generator is fed to each dot electrode that is used to inject signal.

In an embodiment, it is not required that the transmitted sinusoids are of very high quality, but rather, the disclosed system and methods can accommodate transmitted sinusoids that have more phase noise, frequency variation (over time, temperature, etc.), harmonic distortion and other imperfections than may usually be allowable or desirable in radio circuits. In an embodiment, a number of frequencies may be generated by digital means and then employ a relatively coarse analog-to-digital conversion process. In an embodiment, the generated orthogonal frequencies should have no simple harmonic relationships with each other, any non-linearities in the described generation process should not cause one signal in the set to "alias" or mimic another.

In an exemplary embodiment, a single frequency is injected into a hand via a dot electrode placed at one of numerous different locations on the hand. Experimental measurements have shown that using 1 Vpp, that at least at some frequencies the hand is a good conductor, and an injected signal can be measured with almost no loss from every location of the hand. In an embodiment, a signal injected hand can provide additional data for touch, including hover.

Thus, in an embodiment, a signal injected hand can be regarded as a source of signal for the receiving antenna or rows. As used herein, the term antenna or receive antenna refers to conductive material appropriately connected to a receiver that can detect signals incident on the antenna; "dot sensor", "dot", "point", "spot", or "localized spot", may also be used interchangeably with the term antenna in this context.

In an embodiment, different locations of the hand are injected with different orthogonal frequencies. Despite the spatially separate locations of the signal infusion conductors, within a certain frequency and Vpp range, all injected frequencies have a uniform amplitude throughout the hand. In an embodiment, grounding regions can be used to isolate different frequencies in different portions of the hand.

Consider an example where one frequency is injected via an electrode located on the index finger, and an orthogonal frequency is injected via another electrode located on the ring finger. In an embodiment, both injected frequencies have relatively uniform amplitude throughout the hand. In an embodiment, a conductive material, for example, but not limited to, copper tape, can be deployed around the proximal knuckles and connected to ground to achieve substantial isolation of frequencies injected into the fingers. In an embodiment, a ground runs around and between all four fingers, and provides isolation for each of those fingers. In an embodiment, a ground sink may be deployed by connecting a dot electrode to ground and placing the dot electrode in contact with the skin at a location between the two infusion conductors. In an embodiment, a grounded conductor may cause the amplitude nearer to one injector to be considerably higher than the amplitude of another more distant injector, especially if the path from the more distant injector to the measuring point crosses the grounded conductor. In an embodiment, a grounded conductor around the knuckles may cause the amplitude of the index finger frequency to be considerably higher than the amplitude of the ring finger frequency.

In an embodiment, isolating the fingers allows for the identification of different fingers from the sensor data, from the frequency or frequencies with the highest amplitude signal where they are received, e.g., on rows, on antennas, or dot sensors.

Figure 2A:
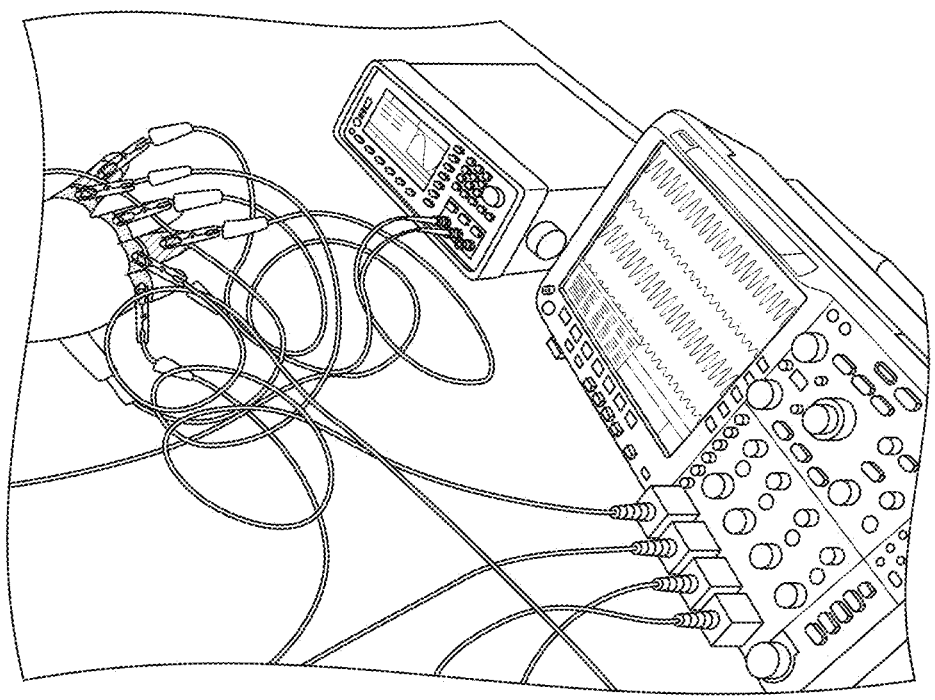
FIG. 2A shows a setup for amplitude measurements.
Figure 2B:
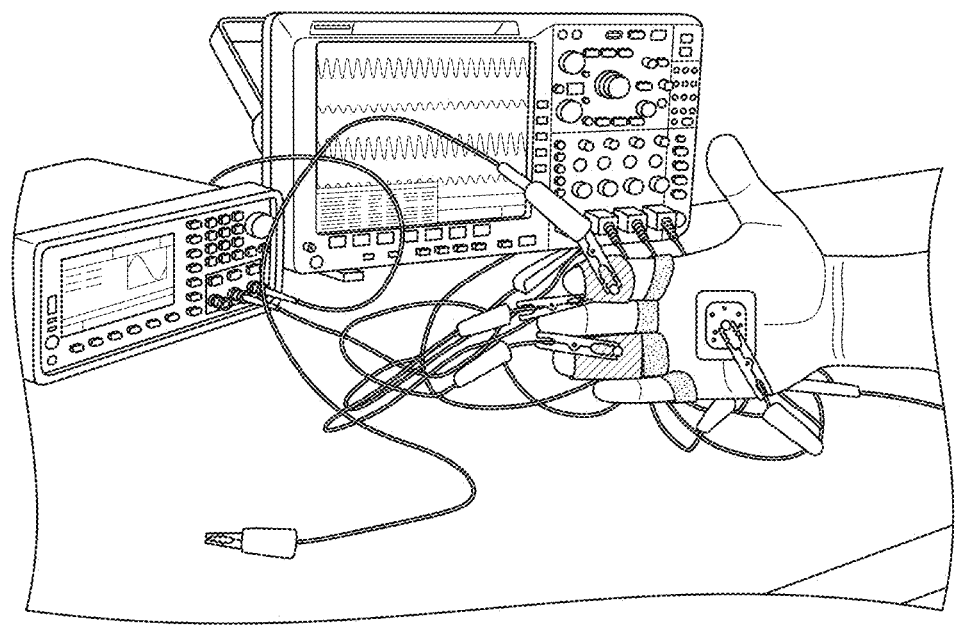
FIG. 2B shows another view of a setup for amplitude measurements.

FIGS. 2A and AB show an exemplary measurement setup. In an embodiment, an infusion signal conductor is placed in the backside of the index finger and measurements are taken at dot electrodes placed on the palm side of the index finger, middle finger, ring finger, and the palm. In an embodiment, the ground is established using copper tape covering all the knuckles on the back and front side of the hand. In an embodiment, ground may be established using braided copper around the knuckles.

FIG. 3 shows exemplary amplitude measurements from the frequency injected index finger for increasing frequencies of a 1 Vpp sinusoidal signal for variations dot electrode locations, i.e., the index finger, middle, ring finger and palm.

FIG. 3 also illustrates that in an embodiment, the amplitude measured at the injection finger, i.e., the index finger, is higher than at the other locations, for every frequency. In an embodiment, the difference in amplitude between the isolated finger and other regions increases with increasing frequency. In an embodiment, within a range, higher frequencies can be better isolated than lower frequencies. In the exemplary embodiment, the palm measurements are higher than the ring finger measurements. The palm measurements may be higher than the ring finger measurements because the palm electrode is closer to the infusion electrode. The palm measurements may be higher than the ring finger measurements because there is more ground cover between the ring and index finger. In the exemplary embodiment, the middle finger measurements are higher than the ring finger and palm measurements. The middle finger measurements may be higher than the ring finger and palm measurements because there is current leakage between the index and middle finger, as they are proximate to each other. Nonetheless, in an embodiment, using a ground and signal injector, locations other than the index finger show similar voltages in that they are considerably lower than the index finger (i.e., the source of the frequency of interest), especially for higher frequencies. In an embodiment, the frequencies in each finger may be isolated so that a receiving sensor can identify the finger interacting with it by its frequency.

Figure 4:
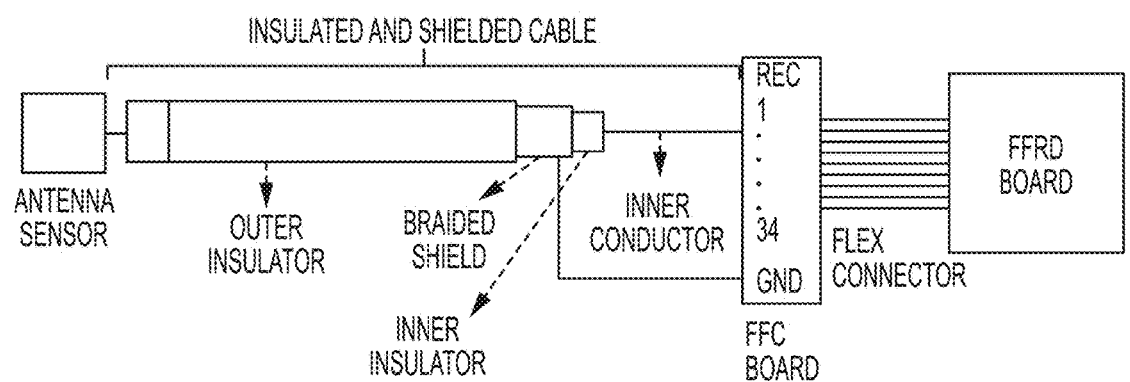
FIG. 4 shows an embodiment of a wiring and shielding scheme for a sensor.

Turning to FIG. 4, a wiring and shielding scheme for a localized dot sensor is shown. In an embodiment, there are two main components, the dot sensor and an adapter board (labeled FFC Board). In an embodiment, the dot sensor may have a surface area of between several square centimeters and a fraction of a square centimeter. In an embodiment, the dot sensor may have a surface area of approximately 1 cm$^2$. In an embodiment, the surface of the dot sensor is generally flat. In an embodiment, the surface of the dot sensor is domed. In an embodiment, the surface of the dot sensor is oriented normal to direction of intended sensitivity. The dot sensor may be any shape. In an embodiment, the dot sensor is square. In an embodiment, the dot sensor is 10 mm by 10 mm. In an embodiment, the dot sensor's interior is made using copper braid and the dot sensor's exterior is made from copper tape.

In an embodiment, the dot sensor is electrically connected to a receiver channel on an adapter board. In an embodiment, the dot sensor is electrically connected to a receiver channel on an adapter board via a shielded coax cable. In an embodiment, one end of the inner conductor cable from the shielded coax cable is soldered to the dot sensor. In an embodiment, one end of the inner conductor cable from the coax cable is soldered to the copper braid interior of the dot sensor and the other end of the inner conductor is connected to a receiver channel on the adapter board. In an embodiment, the coax braided shield (i.e., outer conductor) is grounded. In an embodiment, the coax braided shield is grounded to a grounding point on the adapter board. In an embodiment, grounding the coax shielding may reduce interference (EMI/RFI) between the receiver's channel and dot sensor. In an embodiment, grounding the coax shielding may reduce interference or crosstalk between the receive signal and other cables or electronic devices. In an embodiment, grounding the coax shielding reduces the capacitance effect from the coax cable itself.

An adapter board is the interface between the dot sensors and the circuitry (FIG. 4 labeled FFC Board) that can measure strength of orthogonal signals received at the dot sensors. An adapter board can also be used as the interface between circuitry that can generate signals and injection electrodes. An adapter board should be selected to have sufficient receive channels for the number of dot sensors desired. In an embodiment, the adapter board should be selected to have sufficient signal generation channels for the number of desired injection signal conductors. In an embodiment, a flex connector may be used to connect the adapter board with circuitry that can generate orthogonal signals or measure strength of received orthogonal signals.

In an embodiment, frequency infusion allows for a more accurate measurement of hover, i.e., non-contact touch. In an embodiment, FMT capacitive sensing can be improved when supported by frequency injection. For a description of the FMT capacitive sensor, see, generally, Applicant's prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." Because frequency infusion applies a frequency, or multiple frequencies, to a user's body, the user's body can act as a conductor of that frequency onto an FMT capacitive sensor. In an embodiment, an injected frequency is frequency orthogonal to the frequencies that are transmitted on the FMT capacitive sensor transmitters. In an embodiment, a plurality of injected frequencies are both frequency orthogonal with respect to each other, and frequency orthogonal to the frequencies that are transmitted on the FMT capacitive sensor transmitters. In an embodiment, when combining frequency infusion with FMT, the columns are additionally used as receivers to listen for the injected frequency or frequencies. In an embodiment, when combining frequency infusion with FMT, both the rows and the columns are additionally used as receivers to listen for the injected frequency or frequencies. In an embodiment, interaction between a frequency injected body and a fast multi-touch sensor provides hover information at further distances than a similar interaction without using frequency infusion.

Demonstrative Frequency Infusion Embodiments

In an embodiment, a first frequency is applied to one of the two finger electrodes, and a second electrode is connected to ground. In an embodiment, a first frequency is applied to one of the two finger electrodes, and a second frequency is applied to the other of the two finger electrodes, while the third electrode is connected to ground. In an embodiment, a first frequency is applied to one of the three finger electrodes, a second frequency is applied to one of the other two finger electrodes, a third frequency is applied to the other finger electrode, and a fourth electrode is connected to ground. In an embodiment, a first frequency is applied to one of the four finger electrodes, a second frequency is applied to one of the other three finger electrodes, a third frequency is applied to one of the other two finger electrodes, a fourth frequency is applied to the other finger electrode, and a fifth electrode is connected to ground. In an embodiment, a first frequency is applied to one of the five finger electrodes, a second frequency is applied to one of the other four finger electrodes, a third frequency is applied to one of the other three finger electrodes, a fourth frequency is applied to one of the other two finger electrodes, and a fifth frequency is applied to the other finger electrode, while a sixth electrode is connected to ground. In an embodiment, heatmaps with signal strength values from the receiving channels are produced as the fingers in the hand wearing such a glove move in the space above, and come in contact with, the different dot sensors, such as shown in FIG. 5.

Figure 5:
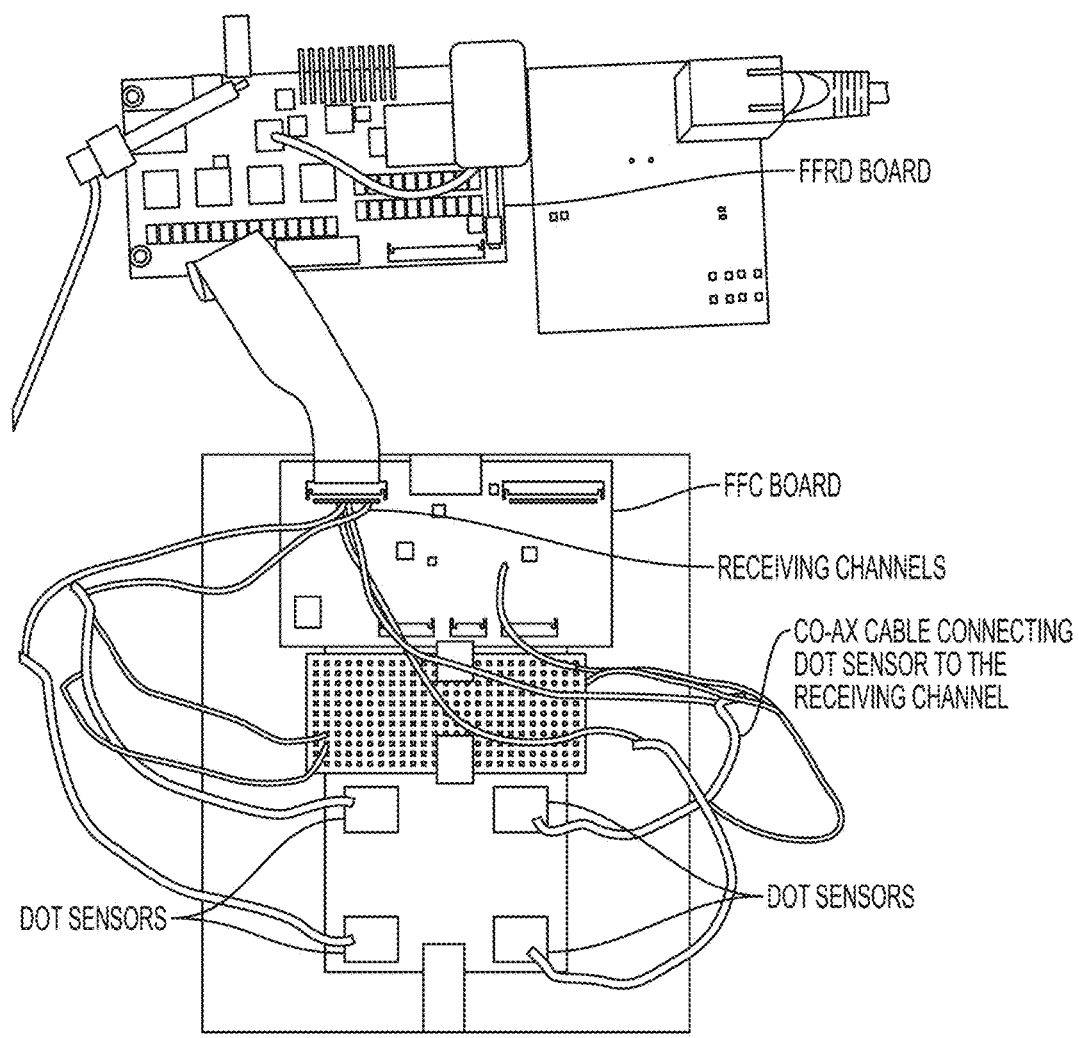
FIG. 5 illustrates a setup with a 2×2 grid of antennas on a rectangular grid.

FIG. 5 shows an exemplary embodiment, comprised of a 2 by 2 grid of dot sensors arranged in square and circular fashion on a flat surface equidistantly. As used herein, the term exemplary embodiment reflects that the embodiment is a demonstrative embodiment or an example embodiment; the term exemplary is not intended to infer that the embodiment is preferred over or more desirable than another embodiment, nor that it represents a best-of-kind embodiment. In an embodiment, each dot sensor is placed 10-15 mm apart from one another. Each of the dot sensors are connected to the receiving channels of the adapter board (labeled FFC board) via a shielded coax cable. In an embodiment, the coax shielding is grounded. In an embodiment, a voltage buffer with an op-amp is also referenced. In an embodiment, instead of grounding the outer shield of the coax, it is connected to the output of the voltage buffer, whereas the input of the buffer is connected to the receiving channels of the adapter board.

Figure 6:
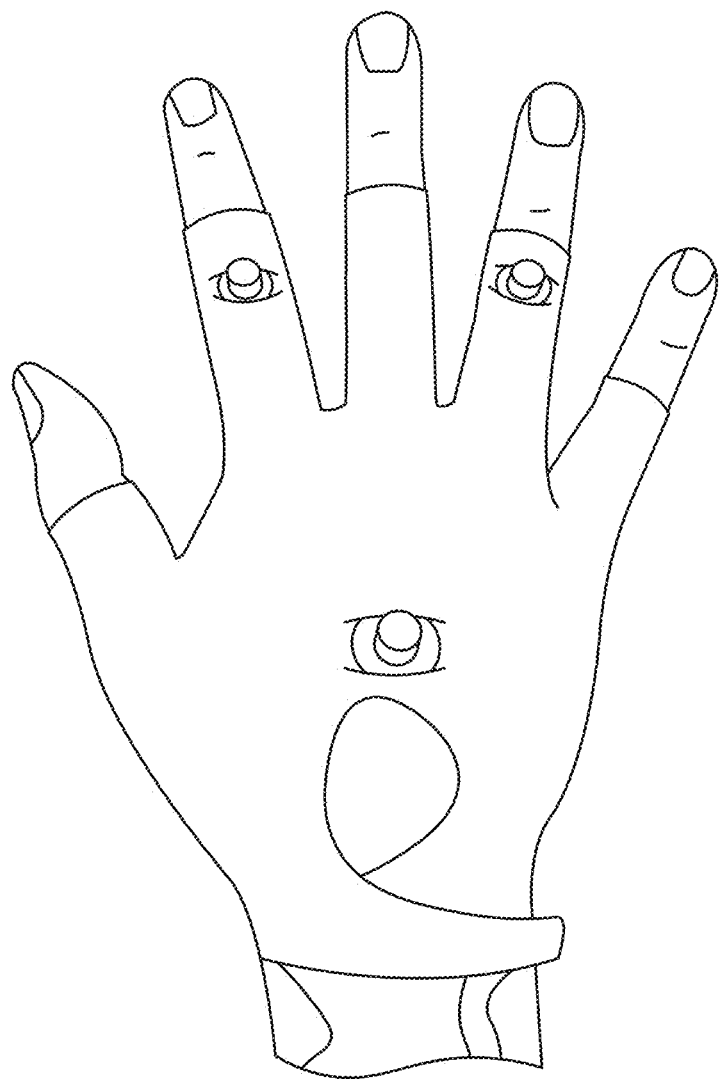
FIG. 6 illustrates a wearable glove, in accordance with an embodiment, with the wearable glove having both signal infusion conductors and an electrode to support the isolation of frequencies in the fingers.
Figure 7A:
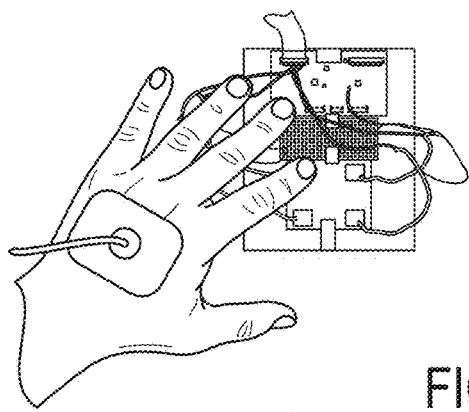
FIG. 7A illustrates results for an injected frequency, in dB, achieved using a 2-by-2 grid of antennas and a frequency injected index finger moving among the antennas.
Figure 7B:
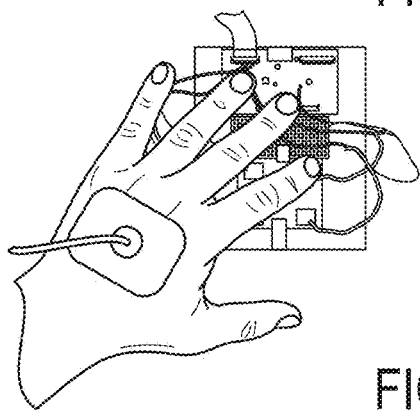
FIG. 7B illustrates results for an injected frequency, in dB, achieved using a 2-by-2 grid of antennas and a frequency injected index finger moving among the antennas.
Figure 7C:
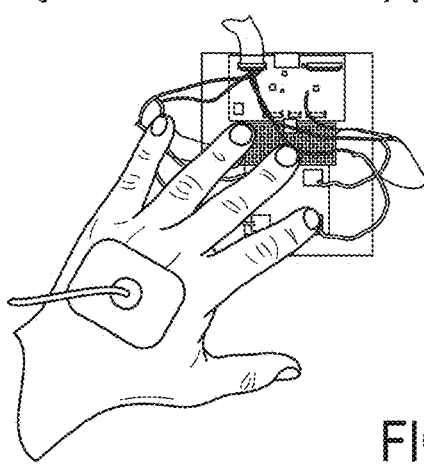
FIG. 7C illustrates results for an injected frequency, in dB, achieved using a 2-by-2 grid of antennas and a frequency injected index finger moving among the antennas.
Figure 7D:
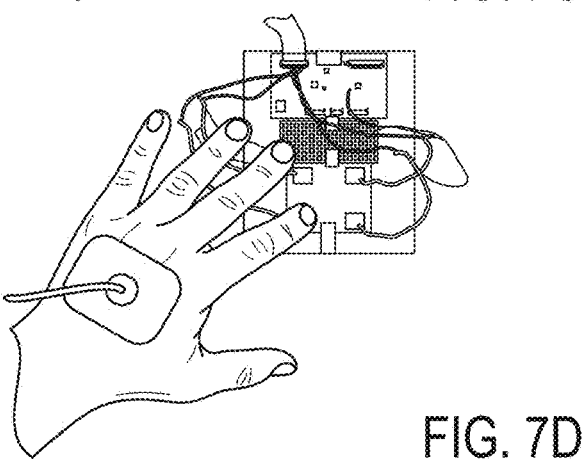
FIG. 7D illustrates results for an injected frequency, in dB, achieved using a 2-by-2 grid of antennas and a frequency injected index finger moving among the antennas.

FIG. 6 shows an exemplary embodiment placing dot electrodes at various locations on the hand and fingers. In an embodiment, two dot electrodes are positioned on the back of the index and ring finger, respectively, while a third dot electrode is positioned on the back of the hand. The two dot electrodes positioned on the fingers are used as injection signal conductors, while the third dot electrode is connected to ground to support the isolation of separate orthogonal frequencies sent to the electrodes on the fingers. In an embodiment, a fingerless glove can be employed with electrodes attached to its inner side. In an embodiment, other means of deploying the electrodes may be used (e.g., fingered gloves, gloves of different materials and sizes, straps, a harness, self-stick electrodes, etc.).

FIGS. 7A-7D show 2 by 2 heatmaps that result from the injection of a single frequency through a signal injection electrode placed on the back of a user's hand when the hand hovers near, and contacts, the 2-by-2 dot sensor grid shown in FIG. 5. In this embodiment, the human body (i.e., hand) acts as an active signal source to the receiving dot sensors. In an exemplary embodiment, a 1 Vpp sinusoidal wave of 117,187.5 Hz is injected through an electrode placed on the back of the hand. The received signal levels for each dot sensor is measured via FFT values of the signal in dB (20×log 10 of the FFT of the received signal for the injected frequency). In an embodiment, the stronger the received signals, the higher the FFT values. The dB values shown in the results are the positive difference from a reference value for each sensor captured when the frequency injected hand was lifted 10 cm above the dot sensor grid. The 2-by-2 heatmap (also referred to herein as a FFT grid) reflects one value for each of the four dot sensors. In an embodiment, multiple (e.g., quadrature) values could be provided for each of the dot sensors. The interacting hand is the only transmitting source in this exemplary embodiment, thus values on the FFT grid increase as the hand moves from a distant hover to contact with the dot sensor. In FIGS. 7A-7D, the FFT grid shows the greatest amplitude for the dot sensor that the finger contacts, and that contact produces values more than 20 dB from the 10-cm reference calibration.

Figure 8A:
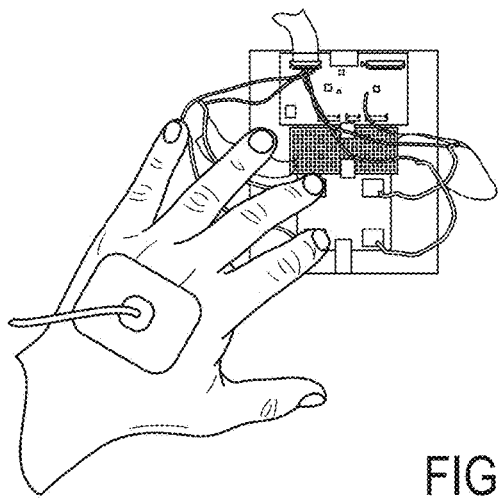
FIG. 8A illustrates results for an injected frequency, in dB, achieved using a 2-by-2 grid of antennas as an index finger and a middle finger simultaneously touch two antennas.
Figure 8B:
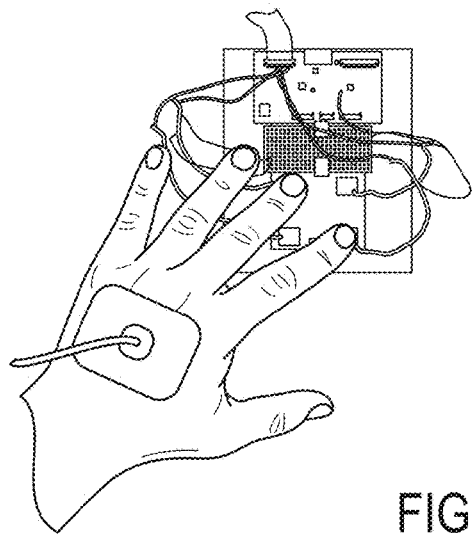
FIG. 8B illustrates results for an injected frequency, in dB, achieved using a 2-by-2 grid of antennas as an index finger and a middle finger simultaneously touch two antennas.
Figure 8C:
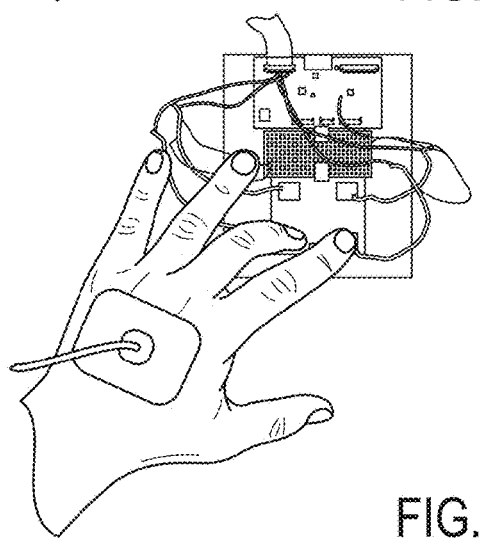
FIG. 8C illustrates results for an injected frequency, in dB, achieved using a 2-by-2 grid of antennas as an index finger and a middle finger simultaneously touch two antennas.
Figure 9A:
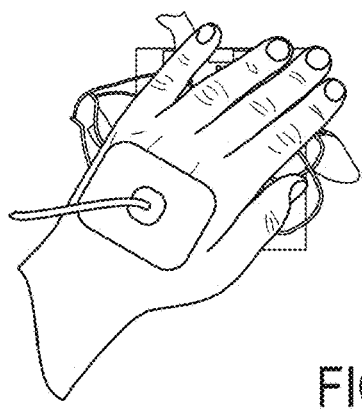
FIG. 9A illustrates results for an injected frequency, in dB, achieved using a 2-by-2 grid of antennas as a hand moves towards and away from the antennas.
Figure 9B:
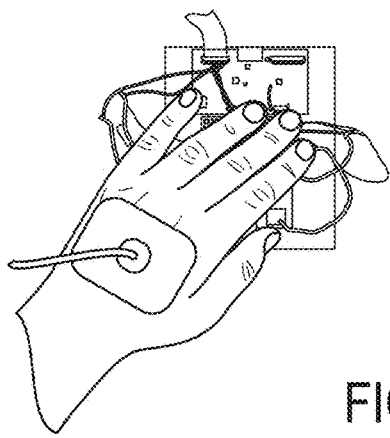
FIG. 9B illustrates results for an injected frequency, in dB, achieved using a 2-by-2 grid of antennas as a hand moves towards and away from the antennas.
Figure 9C:
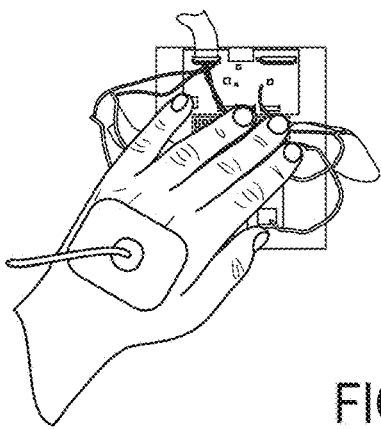
FIG. 9C illustrates results for an injected frequency, in dB, achieved using a 2-by-2 grid of antennas as a hand moves towards and away from the antennas.
Figure 9D:
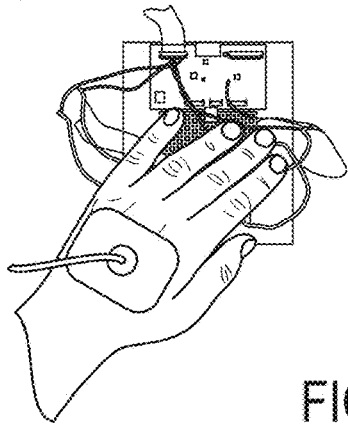
FIG. 9D illustrates results for an injected frequency, in dB, achieved using a 2-by-2 grid of antennas as a hand moves towards and away from the antennas.
Figure 10A:
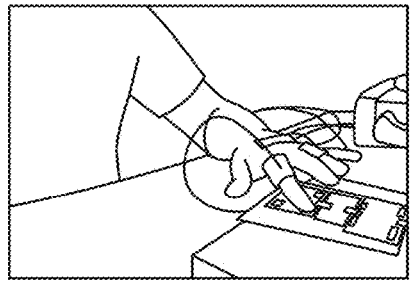
FIG. 10A illustrates results for two injected frequencies, in dB, achieved using a 2-by-2 grid of antennas as an index finger moves among the antennas.
Figure 10B:
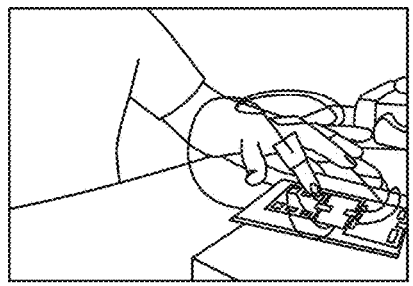
FIG. 10B illustrates results for two injected frequencies, in dB, achieved using a 2-by-2 grid of antennas as an index finger moves among the antennas.
Figure 10C:
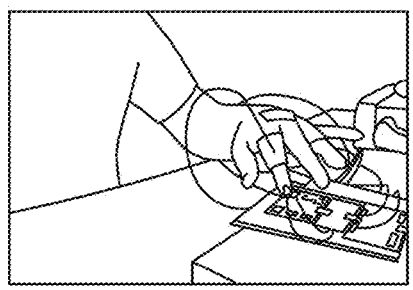
FIG. 10C illustrates results for two injected frequencies, in dB, achieved using a 2-by-2 grid of antennas as an index finger moves among the antennas.
Figure 10D:
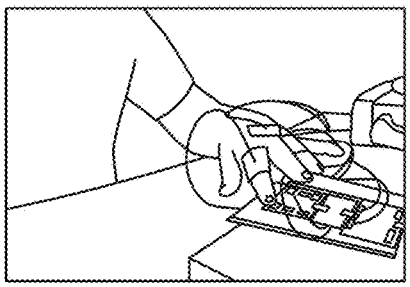
FIG. 10D illustrates results for two injected frequencies, in dB, achieved using a 2-by-2 grid of antennas as an index finger moves among the antennas.
Figure 11A:
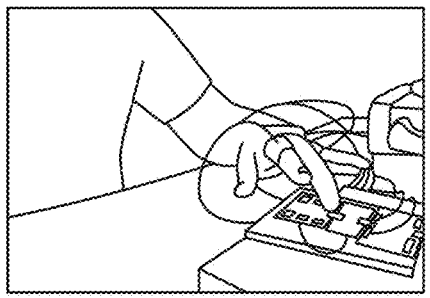
FIG. 11A illustrates results for two injected frequencies, in dB, achieved using a 2-by-2 grid of antennas as a ring finger moves among the antennas.
Figure 11B:
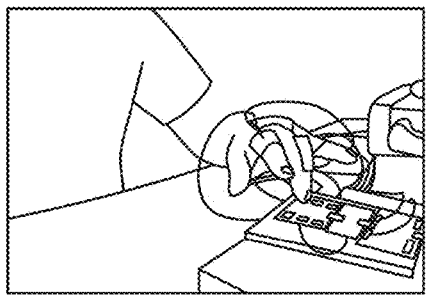
FIG. 11B illustrates results for two injected frequencies, in dB, achieved using a 2-by-2 grid of antennas as a ring finger moves among the antennas.
Figure 11C:
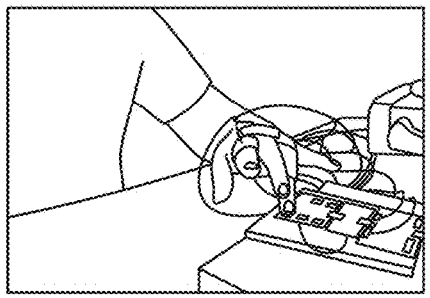
FIG. 11C illustrates results for two injected frequencies, in dB, achieved using a 2-by-2 grid of antennas as a ring finger moves among the antennas.
Figure 11D:
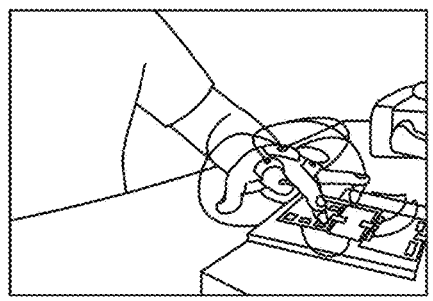
FIG. 11D illustrates results for two injected frequencies, in dB, achieved using a 2-by-2 grid of antennas as a ring finger moves among the antennas.
Figure 12A:
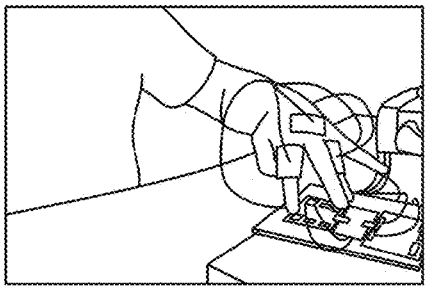
FIG. 12A illustrates results for two injected frequencies, in dB, achieved using a 2-by-2 grid of antennas as an index finger and a ring finger simultaneously move among the antennas
Figure 12B:
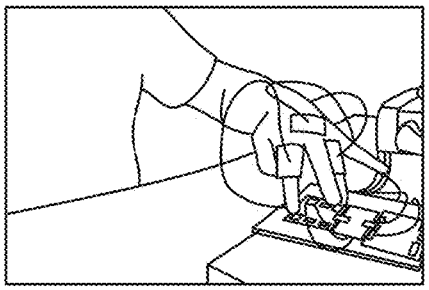
FIG. 12B illustrates results for two injected frequencies, in dB, achieved using a 2-by-2 grid of antennas as an index finger and a ring finger simultaneously move among the antennas.
Figure 12C:
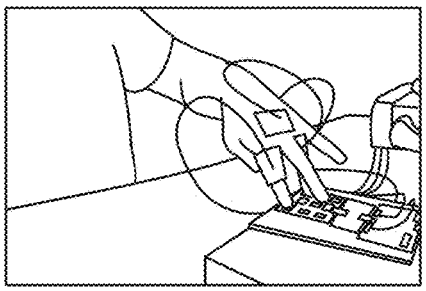
FIG. 12C illustrates results for two injected frequencies, in dB, achieved using a 2-by-2 grid of antennas as an index finger and a ring finger simultaneously move among the antennas.
Figure 12D:
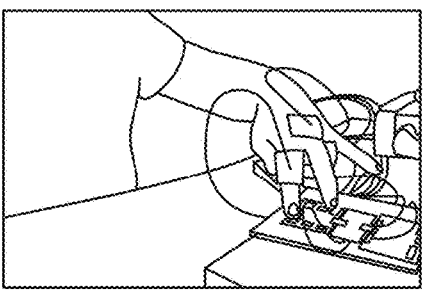
FIG. 12D illustrates results for two injected frequencies, in dB, achieved using a 2-by-2 grid of antennas as an index finger and a ring finger simultaneously move among the antennas.
Figure 13A:
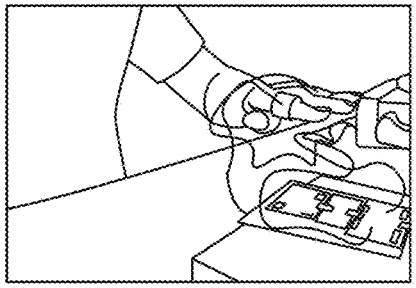
FIG. 13A illustrates results for two injected frequencies, in dB, achieved using a 2-by-2 grid of antennas as a hand moves towards and away from the antennas.
Figure 13B:
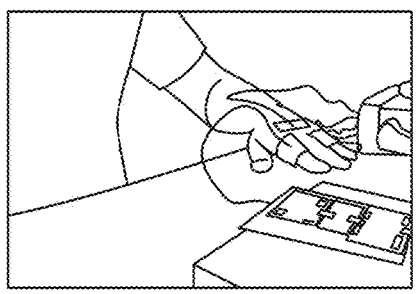
FIG. 13B illustrates results for two injected frequencies, in dB, achieved using a 2-by-2 grid of antennas as a hand moves towards and away from the antennas.
Figure 13C:
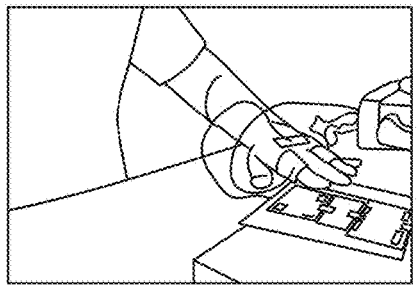
FIG. 13C illustrates results for two injected frequencies, in dB, achieved using a 2-by-2 grid of antennas as a hand moves towards and away from the antennas.
Figure 13D:
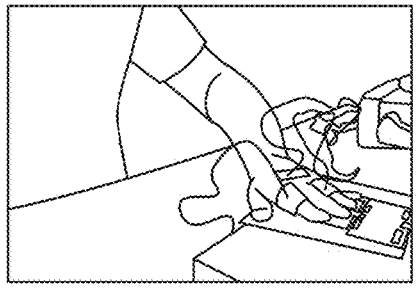
FIG. 13D illustrates results for two injected frequencies, in dB, achieved using a 2-by-2 grid of antennas as a hand moves towards and away from the antennas.

FIGS. 8A-8C similarly show the FFT grid reflecting the results where the same hand is making contact with two dot sensors. As with FIG. 7, the FFT grid shows a greater amplitude for the dot sensors that the fingers contact. Note that in the testing embodiment, sensors without contact often show values over 15 dB; these high signal values are believed to be due to unwanted cross-talk between the receiving channels on the current board, and can be prevented by isolating the channels more effectively.

FIGS. 9A-9D show the FFT grid reflecting the results when the hand is moved toward the dot sensor grid. FIG. 9A-9D, shows a more than 11 dB difference in signal values as the frequency injected hand is moved toward the dot sensor grid from about 10 cm away. In an embodiment, the dB values change in a substantially linear manner for all of the dot sensors in the grid.

In an embodiment, using multiple frequencies has the advantage of being able to identify the interacting fingers simultaneously. In an embodiment, the FFT grid for each frequency, enables for the detection of contact with a sensor based on the amplitude. In an embodiment, the amplitudes for each grid also enable identification where multiple injected fingers touch different sensors at the same time. In an embodiment, multiple frequency injection using multiple electrodes is an effective way to characterize different parts of the hand to map them continuously on a sensor grid using touch signal strengths (i.e., hover and contact signal strength) at each frequency.

FIGS. 10A-10D show a 2 by 2 heatmap resulting from various hand movements where two orthogonal frequencies are injected. In an exemplary embodiment, two orthogonal frequencies are injected through two separate infusion electrodes—one on an index finger and one on a ring finger—and a ground electrode is placed on the back of the hand, which moves (i.e., hovers and makes contact) in range of the 2-by-2 dot sensor grid shown in FIG. 5. In this exemplary embodiment, although the hand acts as an active signal source of the two orthogonal frequencies, due to the described exemplary configuration, the amplitude of the two orthogonal frequencies varies across portions of the hand. In an exemplary embodiment, two 1 Vpp sinusoidal waves of 117,187.5 Hz and 121,093.75 Hz are sent to the index and finger electrodes, respectively. The received signal levels for each dot sensor is measured via FFT values of the signal in dB (20×log 10 of the FFT of the received signal for the injected frequency). In an embodiment, stronger received signals are reflected as higher FFT values. As above, the dB values shown in the results are the positive difference from a reference value for each sensor captured when the frequency injected fingers are lifted 10 cm above the dot sensor grid. The 2-by-2 heatmap (also referred to herein as a FFT grid) reflects one value for each of the four dot sensors on the top and one value for each of the four dot sensors below—the two sets of values corresponding to the strength of the two orthogonal signals. In an embodiment, multiple (e.g., quadrature) values could be provided for each of the frequencies for each of the dot sensors. The interacting fingers are the only transmitting sources in this exemplary embodiment, thus values on the FFT grid increase as the fingers move their touch from a distant hover to contact. The position of the injected index finger and the values for each sensor for each frequency can be seen in FIGS. 10A-10D. The FFT grid shows the greatest amplitude for the dot sensor that the injected index finger contacts, and that contact produces values more than 20 dB from the 10-cm reference calibration.

The position of the injected ring finger and the values for each sensor for each frequency can be seen in FIGS. 11A-11D. The FFT grid shows the greatest amplitude for the dot sensor that the injected ring finger contacts, and the contact produces values of at least 22 dB, and often in excess of 30 dB, from the 10 cm reference calibration. As discussed above, in the demonstrative embodiments, high signal level values of the non-contact sensors are believed to be due to unwanted cross-talk between the receiving channels on the testing environment board. The unwanted cross-talk can be mitigated by isolating the channels more effectively.

FIGS. 12A-12D show a 2 by 2 heatmap resulting from various hand movements where two orthogonal frequencies are injected into fingers, and both injected fingers move about and make contact with the dot sensors. The measurements are taken using the same exemplary setup as described in connection with FIGS. 10A-10D and 11A-11D. The position of the injected index finger and injected ring finger, and the values for each sensor for each frequency can be seen in FIGS. 12A-12D. As above, the FFT grid shows the greatest amplitude for the dot sensor that the injected fingers contacts, and that contact produces values of greater than 20 dB from the 10 cm reference calibration. As above, in the demonstrative set-up, the values of the non-contact sensors often show high signal levels that are believed to be due to unwanted cross-talk between the receiving channels on the testing environment board. The unwanted cross-talk can be mitigated isolating the channels more effectively.

FIGS. 13A-13D show a 2 by 2 heatmap resulting from various hand movements where two orthogonal frequencies are injected into fingers, and the hand moves above, and makes contact with, the dot sensor grid. The measurements are taken using the same exemplary setup as described in connection with FIGS. 10A-10D and 11A-11D. The position of the hand having the injected index finger and injected ring finger, and the values for each sensor for each frequency can be seen in FIGS. 12A-12D. Note that unlike FIGS. 12A-12D, the fingers are touching each other, thus mitigating the isolating effect of the ground electrode. The FFT grid shows a substantially linear change in amplitude, which increases as the dual-frequency injected hand approaches the dot sensor. Contact produces values of near 10 dB in all of the dot sensors.

These illustrative and exemplary embodiments demonstrate the frequencies that the dot sensors receive, which provide reliable non-contact touch (i.e., hover) information, far more than is available from traditional capacitive sensing systems or fast multi-touch systems as shown in FIG. 1. However, due at least in part to the size and spacing of the dot sensors, the resolution at near-contact, and sensitivity to contact, may be less than the sensitivity produced by traditional capacitive sensing or fast multi-touch systems.

In an embodiment, the efficiency of conductivity through the body may be affected by the frequency of an injected signal. In an embodiment, grounding electrodes or strips may be positioned to cause the frequency of an injected signal to affect the efficiency of conductivity through the body. In an embodiment, multiple orthogonal frequencies are injected from a single electrode. A variety of meaningful information can be determined from differing amplitudes of orthogonal signals injected by the same electrode. Consider, as an example, a lower frequency and a higher frequency signal both injected through a single electrode. In an embodiment, the lower frequency signal (e.g., 10 KHz signal) is known to lose amplitude over distance at a slower rate than the higher frequency signal (e.g., 1 MHz signal). In an embodiment, where the two frequencies are detected (e.g., a row or dot sensor), the difference in amplitude (e.g., Vpp) may be used to determine information about the distance traversed by the signal. In an embodiment, multi-frequency injection done at one side of a hand can be distinguished at the tips of each finger. In an embodiment, the signals received at a variety of locations on the body can be used to provide information about the location of the electrode providing those signals. In an embodiment, the delta between amplitude in two signals injected by the same injection electrode and sensed at another location on the body can provide information about the path from the electrode to the sensing point and/or the relative location of the electrode with respect to the sensing point. It will be apparent to a person of skill in the art in view of this disclosure that, in an embodiment, an injection configuration may comprise multiple electrodes, each using multiple frequencies.

Heterogeneous Sensor Manifold

In an embodiment, the patterns of the sensor, heterogeneous or not, may be formed in a manifold that can be laid upon, with, within, or wrapped around an object. In an embodiment, the patterns of the sensor may be formed by a plurality of manifolds that can be laid upon, with, within, or wrapped around an object or other manifolds. The term "patterns" as used in the two prior sentences refer generally to the conductive material forming the transmitting and receiving conductors, which in some embodiments is a grid or mesh, and which is affected by the movements or other things sensed by the sensor. In an embodiment, the patterns are disposed on a substrate. In an embodiment, the patterns are produced in layers. In an embodiment, the rows and columns may be formed on opposite sides of the same substrate (e.g., film, plastic, or other material provide the requisite physical distance and insulation between them). In an embodiment, the rows and columns may be formed on the same sides of the same substrate, in different spatial locations (e.g., film, plastic, or other material provide the requisite physical distance and insulation between them). In an embodiment, the rows and columns may be formed on the same side of a flexible substrate. In an embodiment, the rows and columns may be formed on opposite sides of a flexible substrate. In an embodiment, the rows and columns may be formed on separate substrates and those substrates brought together as a manifold or as part of a manifold.

In an embodiment, a sensor manifold can be placed on a surface to enable sensing of contact and non-contact events on, or near, or at some distance from, the surface. In an embodiment, the sensor manifold is sufficiently flexible to be curved about at least one radius. In an embodiment, the sensor manifold is sufficiently flexible to withstand compound curvature, such as to the shape of a regular or elongated sphere, or a toroid. In an embodiment, the sensor manifold is sufficiently flexible to be curved around at least a portion of a game controller. In an embodiment, the sensor manifold is sufficiently flexible to be curved around at least a portion of a steering wheel. In an embodiment, the sensor manifold is sufficiently flexible to be curved around at least a portion of an arbitrarily shaped object, for example, and not by way of limitation, a computer mouse.

Figure 14:
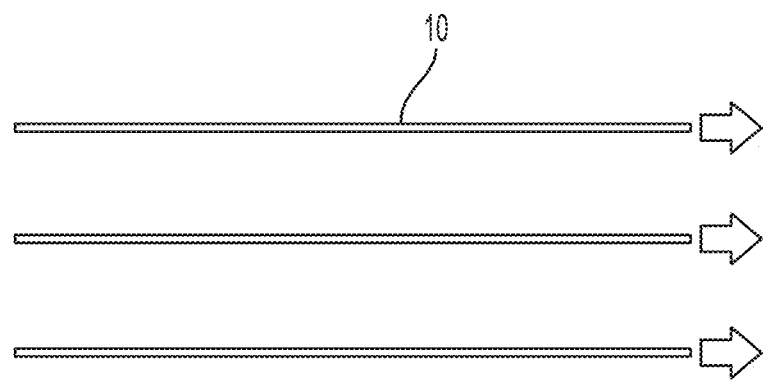
FIG. 14 illustrates an embodiment of a conductor layer for use in a heterogeneous sensor.

FIG. 14 illustrates an embodiment of a conductor layer for use in a heterogeneous sensor. In an embodiment, as illustrated in FIG. 14, additional row conductors 10 are provided on a layer that is joined with the sensor manifold. In an embodiment, the rows and columns are disposed on each side of a plastic substrate providing a physical gap between their layers, while the additional row conductors 10 are disposed on a separate piece of plastic and the two plastic sheets brought in close proximity as part of the sensor manifold.

Figure 15:
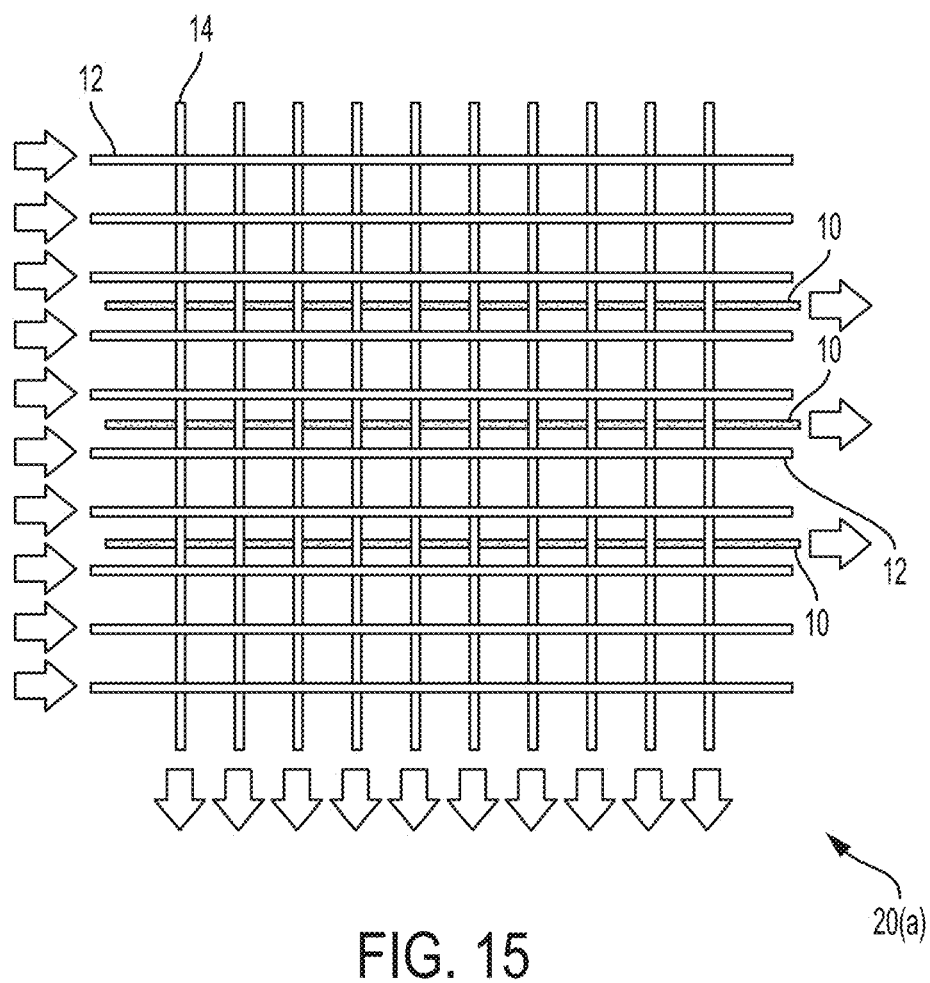
FIG. 15 illustrates a schematic layout of an exemplary heterogeneous layer sensor.

FIG. 15 illustrates a schematic layout of an exemplary heterogeneous sensor 20(a) having row conductors 12 and column conductors 14. In an embodiment, additional row conductors 10 (in a separate layer) are oriented substantially parallel with the other row conductors 12. In an embodiment, the row conductors 12 and the additional row conductors 10 may be on opposite sides of a common substrate (not shown in FIG. 15 for ease of viewing). In an embodiment, the row conductors 12 and the additional row conductors 10 may be on different substrates. In an embodiment, the additional row conductors 10 are each associated with row receiver circuitry that is adapted to receive signals present on the additional row conductors 10 and to determine a strength for at least one unique signal. In an embodiment, the row receiver circuitry is adapted to receive signals present on the additional row conductors 10 and to determine a strength a plurality of orthogonal signals. In an embodiment, the row receiver circuitry is adapted to receive signals present on the additional row conductors 10 and to determine signal strengths for the same plurality of signals as the circuitry associated with receiving signals on the columns. Thus, in an embodiment, the row receiver is designed to receive any of the transmitted signals, or an arbitrary combination of them, and to individually measure the quantity of each of the orthogonal transmitted signals present on that additional row conductors 10.

In an embodiment, row signals can be conducted from one of the row conductors 12 to additional row conductors 10 by a user's interaction with the heterogeneous sensor 20(a). In an embodiment, row receiver circuitry is adapted to receive signals present on the additional row conductors 10 and to determine signal strengths for each of the orthogonal transmitted signals. In an embodiment, row receiver circuitry is adapted to receive signals present on the additional row conductors 10 and to determine signal strengths for one or more of the orthogonal transmitted signals. In an embodiment, determined signal strengths for each of the orthogonal transmitted signals provides additional information concerning a user's interaction with the heterogeneous sensor 20(a). In an embodiment, signal injection conductors (not shown in FIG. 15) may impart unique orthogonal signals into the body of a user. In an embodiment, row receiver circuitry is adapted to receive signals present on the additional row conductors 10 and to determine signal strengths for one or more injected signals. In an embodiment, signal strength is determined for each of the signals for each row. In an embodiment, signal strength is represented in a heatmap.

Figure 16:
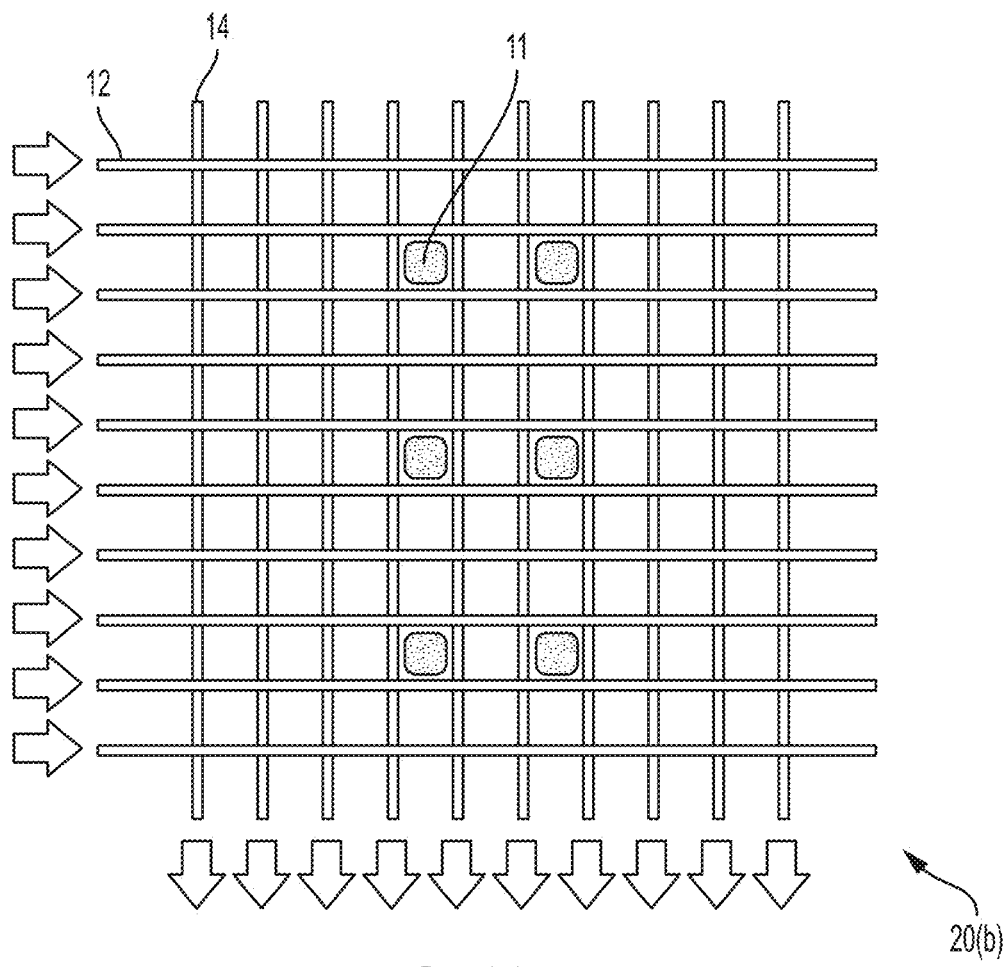
FIG. 16 shows an illustration of an embodiment of a heterogeneous sensor having interleaved antennas and two conductive layers.
Figure 17:
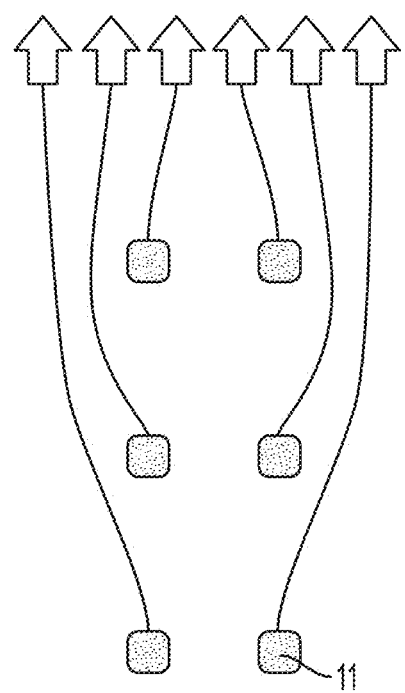
FIG. 17 shows an illustration of the connection between interleaved antennas and their associated receiver circuitry.
Figure 18:
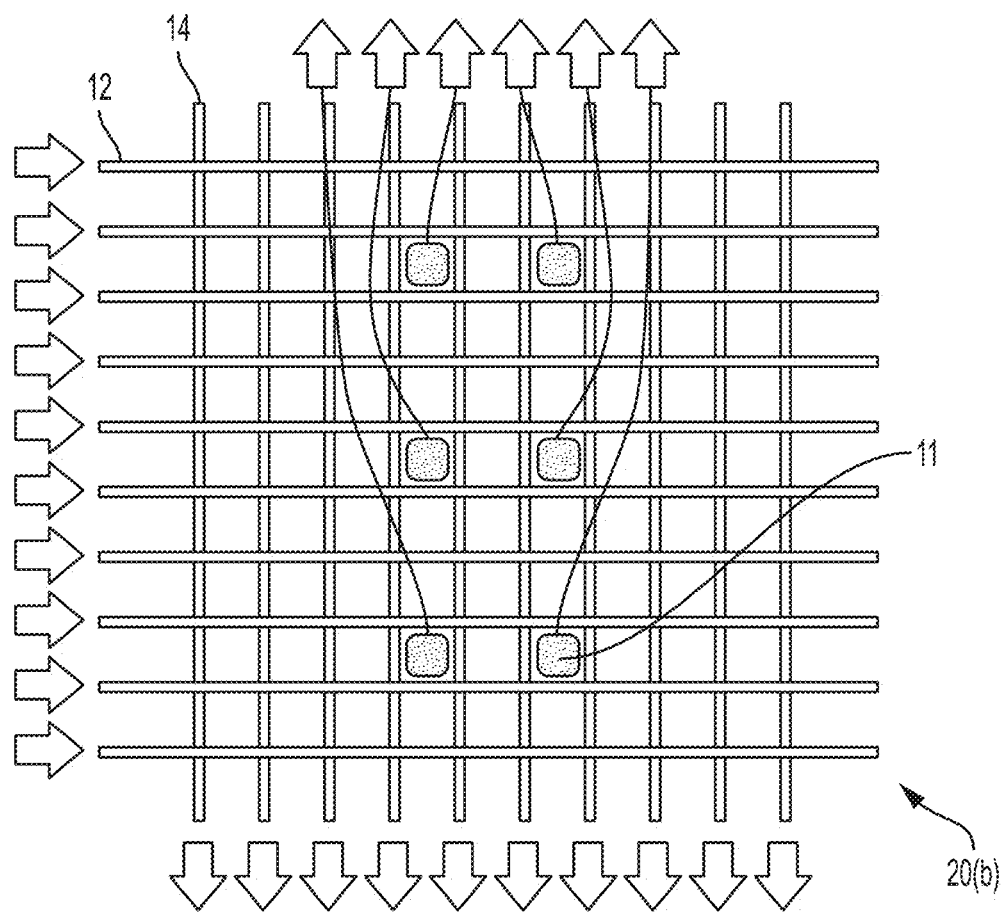
FIG. 18 shows an illustration of an embodiment of a heterogeneous sensor having interleaved antennas and two conductive layers as shown in FIG. 16, with connections between the interleaved antennas and their associated circuitry.

FIG. 16 shows an illustration of an embodiment of a heterogeneous sensor 20(b) having interleaved antennas 11. FIG. 17. shows an illustration of the connection between an interleaved antenna 11 and its associated receiver circuitry. FIG. 18 shows an illustration of an embodiment of a heterogeneous sensor 20(b) having interleaved antennas 11 as shown in FIG. 16, with connections between interleaved antennas 11 and its associated circuitry. As used herein the term "antenna" or "receive antenna" refers to conductive material appropriately connected to a receiver that can detect signals incident on the antenna, a dot sensor or dot, or localized spot, or electrode may also be used interchangeable with the term antenna.

As used herein the term "interleaved" is used to describe an orientation wherein the antenna has low coupling (e.g., makes no substantial electrical contact) with the rows or columns. It will be apparent to a person of skill in the art that despite being, interleaved according to this definition, there may nonetheless be some capacitive interaction between the row conductors 12 or column conductors 14 and the antenna 11. In an embodiment, the antenna 11 may be disposed or affixed to the same substrate as the row conductors 12 and/or the column conductors 14. In an embodiment, the antenna 11 may be disposed or affixed to a separate substrate from the row conductors 12 and the columns 14.

In an embodiment, the antennas 11 are oriented generally normal to the direction of hover. In an embodiment, the antennas 11 are generally flat and conductive. In an embodiment, the antennas 11 could be domed and conductive and/or pointed and conductive. In an embodiment, the antennas 11 are made of, for example, and not by way of limitation, copper braid and copper tape, conductive metal, copper, or a combination of all of these materials. In an embodiment, the antenna 11 is small enough to be interleaved with row conductors 12 and column conductors 14. In an embodiment, the antenna 11 is no more than about 1 cm square. In an embodiment, the antenna 11 is less than 0.5 cm square. In an embodiment, the antennas 11 are generally square. In an embodiment, the antennas 11 could also be rectangular, circular, and/or have the shape of a line, polyline, or curve. In an embodiment, the antennas 11 could be comprised of a combination of such shapes.

In an embodiment, the antennas 11 are oriented so signals are transmitted into each of the surface's rows, thereby forming a line, polyline, and/or curve. In an embodiment, the antennas are oriented so signals are transmitted into each of the surface's columns, thereby forming a line, polyline, and/or curve. In an embodiment, the rows or columns of antennas 11 are organized in a grid layout. In an embodiment, the rows or columns of antennas 11 are organized in a spatial layout in a manner similar to the shape of the surface or device's manifold.

In an embodiment, antenna receiver circuitry is adapted to receive signals present on the antenna 11 and to determine signal strengths for each of the orthogonal transmitted signals. In an embodiment, antenna receiver circuitry is adapted to receive signals present on the antenna 11 and to determine signal strengths for one or more of the orthogonal transmitted signals. In an embodiment, antenna receiver circuitry is adapted to receive signals present on the antenna 11 and to determine signal strengths for one or more injected signals. In an embodiment, a strength is determined for each of the signals for each antenna 11. In an embodiment, signal strength is represented in a heatmap.

Figure 19:
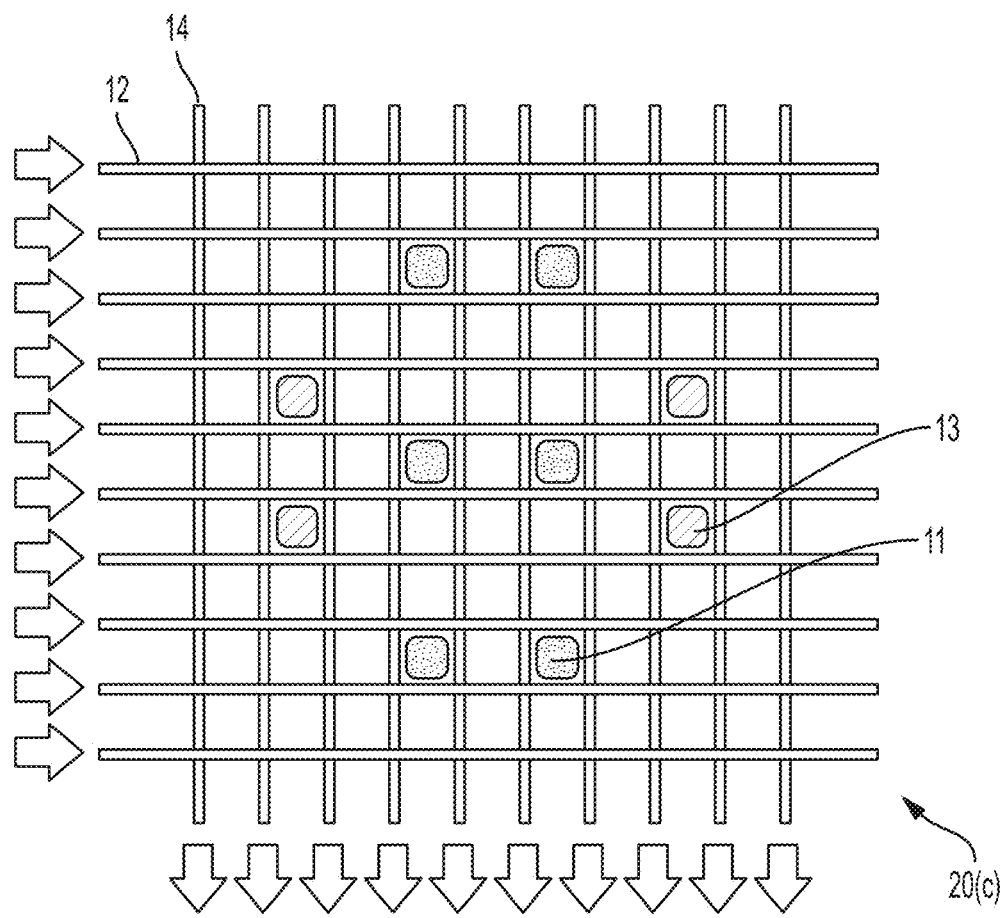
FIG. 19 shows an illustration of another embodiment of a heterogeneous sensor having interleaved antennas and signal infusion conductors and two conductive layers.

FIG. 19 shows an illustration of another embodiment of a heterogeneous sensor 20(c) having interleaved antennas 11 and signal infusion conductors 13. In an embodiment, the signal infusion conductors 13 and antennas 11 are substantially identical. In an embodiment, the signal infusion conductors 13 and the antennas 11 may be interchangeable. In an embodiment, the signal infusion conductors 13 are flush with, or parallel to, the surface of a manifold. In an embodiment, the signal infusion conductors 13 are placed or embedded below the surface of a manifold. In an embodiment, the signal infusion conductors 13 protrude from a manifold to better ensure contact with the subject of the injection. In an embodiment, the signal infusion conductors 13 protrude from a manifold in a domed fashion. In an embodiment, the signal infusion conductors 13 are formed from screws or rivets that are otherwise associated with assembly or disassembly of the object.

Figure 20:
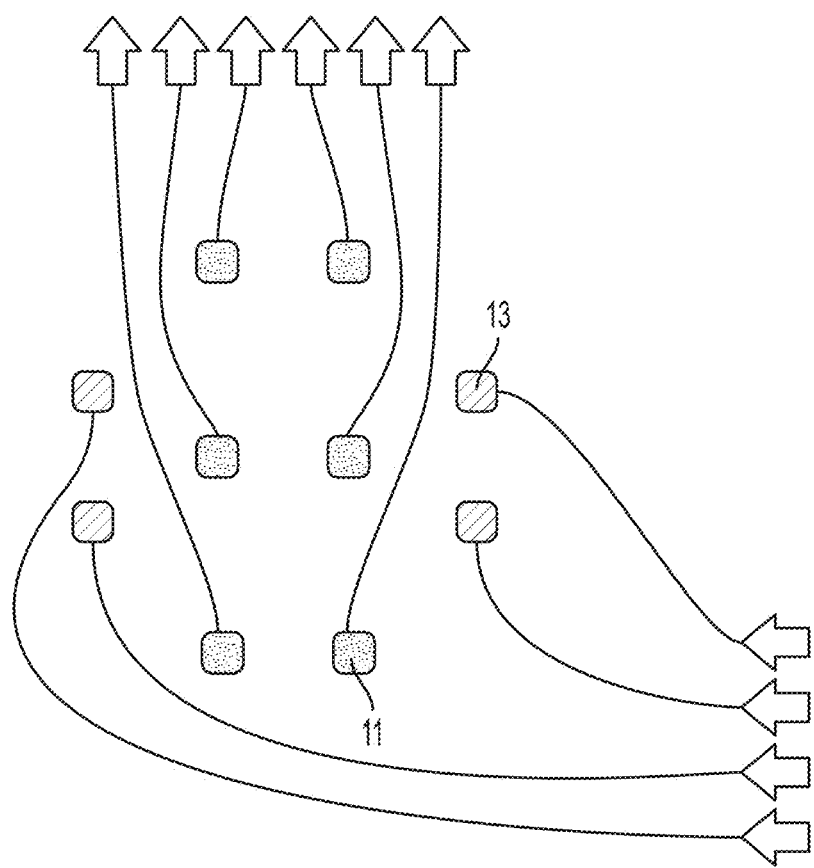
FIG. 20 shows an illustration of the connection between interleaved antennas and their associated receiver circuitry and signal infusion conductors and their associated signal drive circuitry in an embodiment like FIG. 19.
Figure 21:
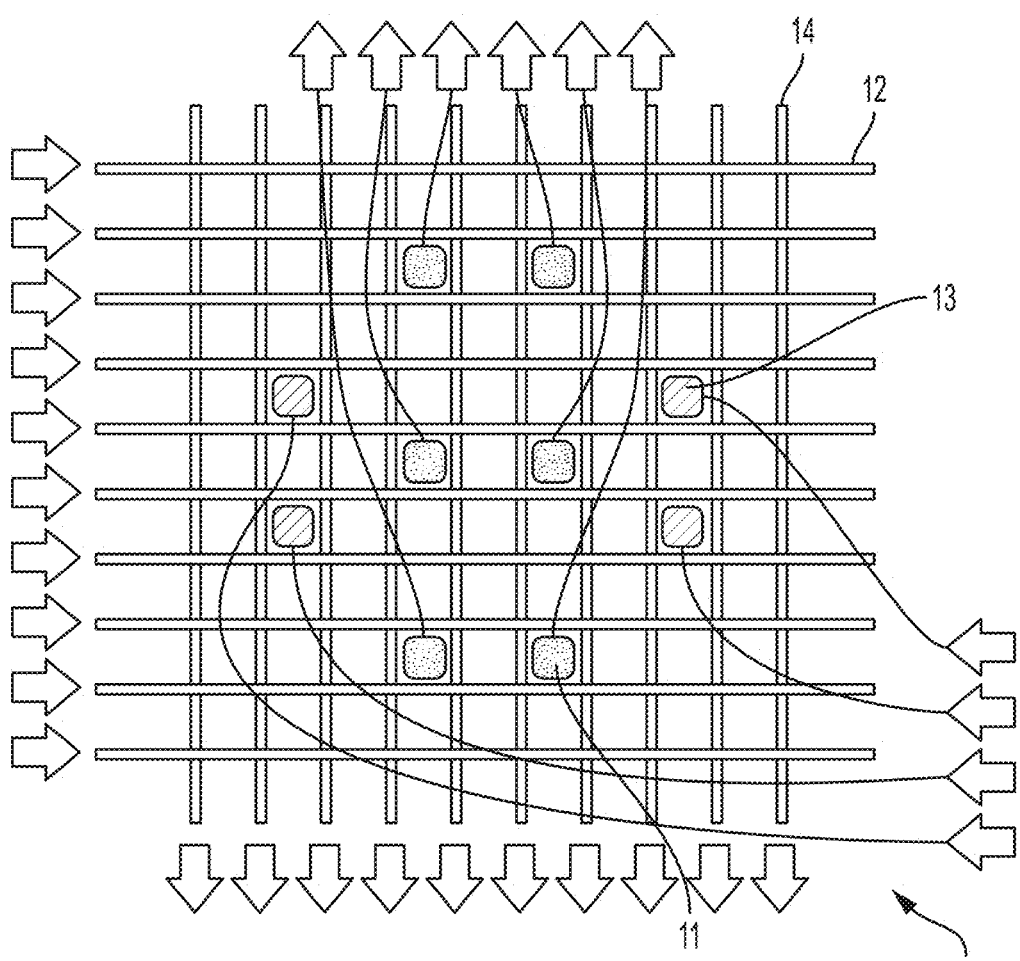
FIG. 21 shows an illustration of an embodiment of a heterogeneous sensor having interleaved antennas and their associated receiver circuitry and signal infusion conductors and their associated signal drive circuitry and two conductive layers as shown in FIG. 19.

FIG. 20 shows an illustration of an embodiment of connections between interleaved antennas 11 and their associated receiver circuitry, and signal infusion conductors 13 and their associated signal drive circuitry. FIG. 21 shows an illustration of an embodiment of a heterogeneous sensor 20(c) having interleaved antennas 11 and signal infusion conductors 13 as shown in FIG. 19. The configuration and orientation of the antennas 11 and signal infusion conductors 13 is merely illustrative. It will be apparent to a person of skill in the art in view of this disclosure that signal infusion conductors 13 are placed in a manner first, to ensure injection of signal and second to ensure that the appropriate signal will reach the desired signal location. It will also be apparent to a person of skill in the art in view of this disclosure that antennas 11 are placed in a manner to ensure appropriate signal reception and resolution. In an embodiment, motion is constrained by the object, (e.g., a game controller), and placement of the signal infusion conductors 13 and antennas 11 can take the constraints into account.

In an embodiment, the heterogeneous sensors, 20(a), 20(b) and 20(c), as illustrated herein (see e.g., FIGS. 16, 19 and 21) synergistically combines the two sensing modalities, fast multi-touch and frequency injection, taking advantage of the same orthogonal signal set, and the differing properties and requirements of the two modalities. In an embodiment, injected signals are received as an increased signal on, e.g., column receivers, row receivers and/or dot sensor receivers, whereas, the row signals are often received as a decrease in the signal on column and row receivers. Thus, in an embodiment, the injected signals and row signals appear in different ranges on the receivers, one being positive and the other negative. In an embodiment, the injected signals and row signals can be distinguished by processing the received signal, without a priori knowledge of which frequencies are injected and which signals are transmitted on the rows. In an embodiment, the injection signal can be generated with a 180-degree phase offset of frequency orthogonal signals transmitted on the rows. In an embodiment, shifting the phase of the injected signals magnifies the touch delta.

Demonstrative Handheld Controller

The term "controller" as used herein is intended to refer to a physical object that provides the function of human-machine interface. In an embodiment, the controller is handheld. In an embodiment, the handheld controller provides six degrees of freedom (e.g., up/down, left/right, forward/back, pitch, yaw, and roll), as counted separately from the sensed touch input and hover input described herein. In an embodiment, the controller may provide fewer than six degrees of freedom. In an embodiment, the controller may provide more degrees of freedom, as in a replica of the movement of a human hand which is generally considered to have 27 degrees of freedom. In an embodiment, the controller is designed to fit generally within the palm of a user's hand. In an embodiment, the controller is designed in a manner that permits use in either the left or right hand. In an embodiment, specialized controllers are used for each of the left and the right hand.

Capacitive sensor patterns are generally thought of as having rows and columns. Numerous capacitive sensor patterns have heretofore been proposed, see e.g., Applicant's prior U.S. patent application Ser. No. 15/099,179, filed on Apr. 14, 2016 entitled "Capacitive Sensor Patterns," the entire disclosure of that application, and the applications incorporated therein by reference, are incorporated herein by reference. As used herein, however, the terms row and column are not intended to refer to a square grid, but rather to a set of conductors upon which signal is transmitted (rows) and a set of conductors onto which signal may be coupled (columns). The notion that signals are transmitted on rows and received on columns itself is arbitrary, as the signals could as easily be transmitted on conductors arbitrarily designated columns and received on conductors arbitrarily named rows, or both could arbitrarily be named something else; further, the same conductor could act as both a transmitter and a receiver. As will be discussed in more detail below, it is not necessary that the rows and columns form a grid; many shapes are possible as long as touch proximate to a row-column intersection increases or decreases the coupling between the row and column. In an embodiment two or more sensor patterns can be employed in a single controller. In an embodiment, three sensor patterns are employed in a single hand-held controller. In an embodiment, one sensor pattern is employed for thumb-centric detection, another sensor pattern is employed for trigger-centric detection, and a yet another sensor pattern is employed for detection at other locations around the body of the controller.

The transmitters and receivers for all or any combination of the sensor patterns may be operatively connected to a single integrated circuit capable of transmitting and receiving the required signals. In an embodiment, where the capacity of the integrated circuit (i.e., the number of transmit and receive channels) and the requirements of the sensor patterns (i.e., the number of transmit and receive channels) permit, all of the transmitters and receivers for all of the multiple sensor patterns on a controller are operated by a common integrated circuit. In an embodiment, operating all the transmitters and receivers for all the multiple sensor patterns on a controller with a common integrated circuit may be more efficient than using multiple integrated circuits.

Figure 22:
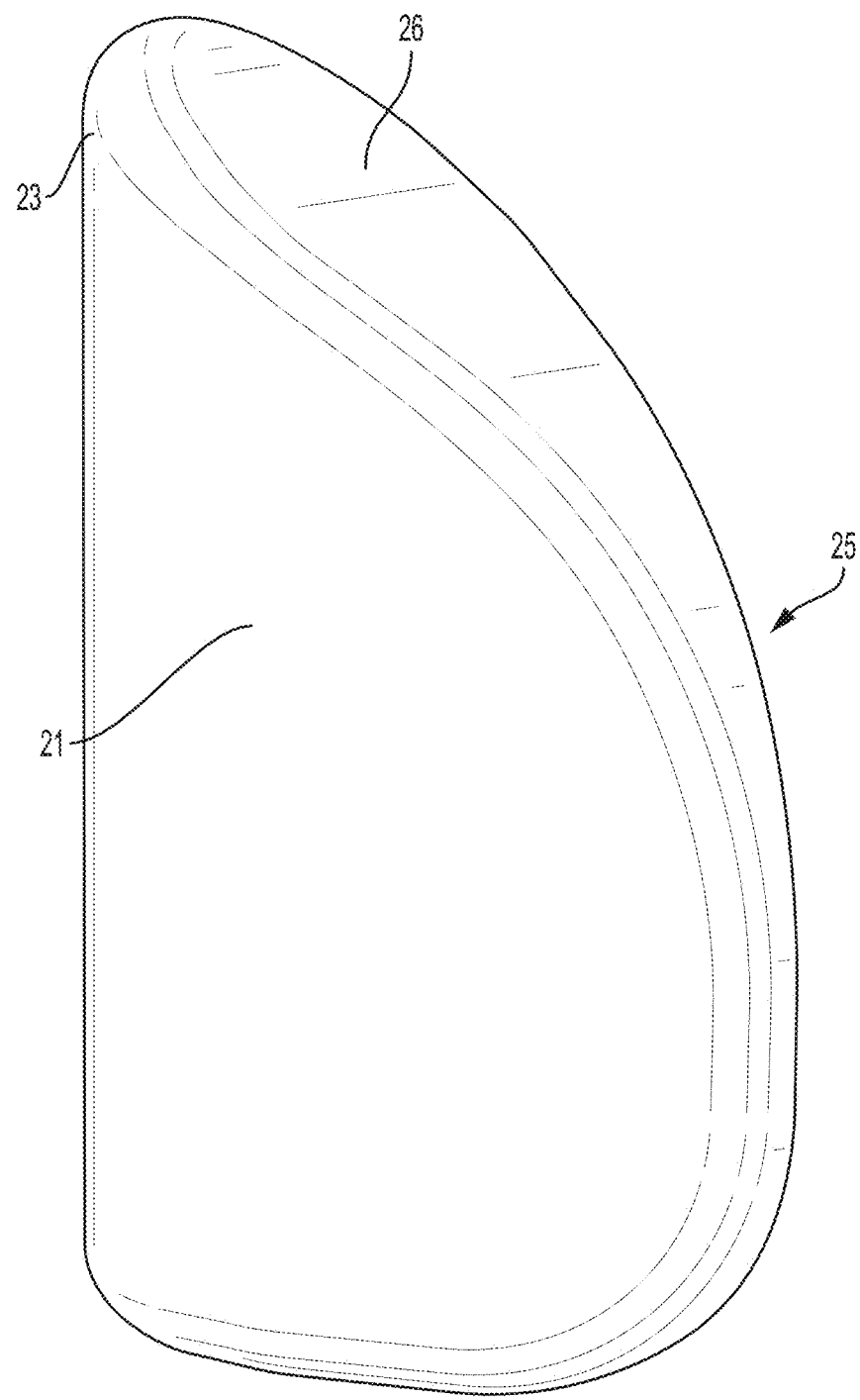
FIG. 22 is an illustration of an embodiment of a handheld controller.

FIG. 22 is an illustration of an embodiment of a handheld controller 25 that can be used with one or more capacitive, infusion (injection), and/or heterogeneous sensing elements. The handheld controller 25 is formed with a body 23 that has a curved portion 21. In an embodiment, the handheld controller 25 is symmetric such that it can be used in either hand. The curved portion 21 (curved in only one radius) is provided around which a capacitive, infusion (injection) or heterogeneous sensor is wrapped. In this sense the infusion sensor is forming the infusion area. In an embodiment, the curved portion may have compound curvature (i.e., multiple radii of curvature). For example, in an embodiment, the curved portion 21 of the handheld controller 25 (having a vertical axis) can have finger indents (having a horizontal axis) where fingers may rest in known locations.

FIG. 22 also shows an elongated thumb portion 26 visible on the top side of the handheld controller 25 which can comprise capacitive, infusion (injection) or heterogeneous sensing elements. The infusion sensing element may form an infusion area. In an embodiment, the thumb-centric sensor is deployed on the elongated thumb portion 26, which is a relatively flat surface most near the thumb as the controller is held. The taxel density may vary from sensor pattern to sensor pattern. In an embodiment, a sensor pattern is selected for the thumb-centric area with a relatively high taxel density such as between 3.5 mm and 7 mm. In an embodiment, the thumb-centric area is provided a taxel density of 5 mm to sufficiently improve fidelity to permit the sensed data to be used to accurately model the thumb. In an embodiment, the thumb-centric area is provided a taxel density of 3.5 mm to better improve fidelity.

In addition to the selection of taxel density, a sensor pattern can be selected based on its ability to detect far, near or mid hover, as opposed to contact. In an embodiment, the sensor pattern for the thumb-centric sensor is selected to detect hover up to between 3 mm to 10 mm. In an embodiment, the sensor pattern for the thumb-centric sensor is selected to detect hover to at least 3 mm. In an embodiment, the sensor pattern for the thumb-centric sensor is selected to detect hover to at least 4 mm. In an embodiment, the sensor pattern for the thumb-centric sensor is selected to detect hover to at least 5 mm. In an embodiment, the sensor pattern for the thumb-centric sensor is selected to detect hover to a distance that sufficiently permits the sensed data to be used to accurately model the thumb of a population of intended users.

Figure 23A:
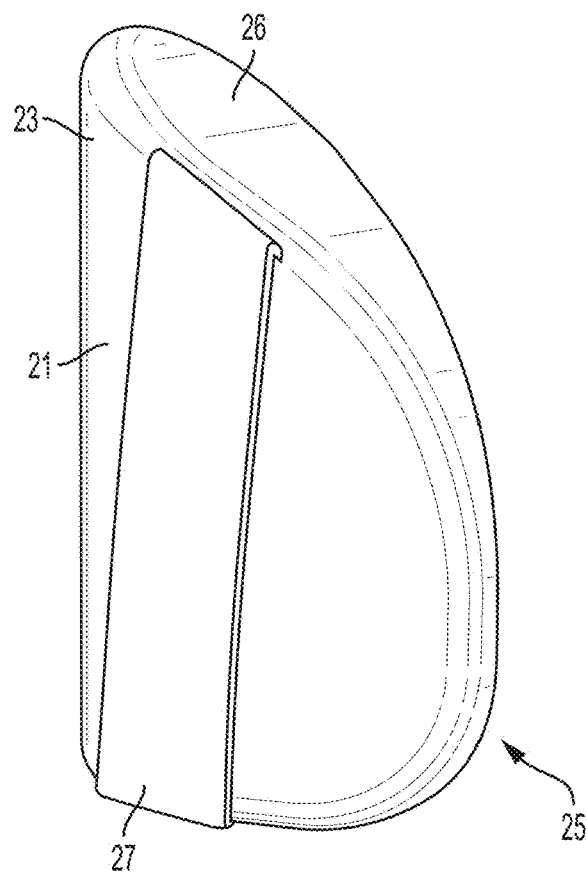
FIG. 23A is an illustration of a strap configuration for a controller.
Figure 23B:
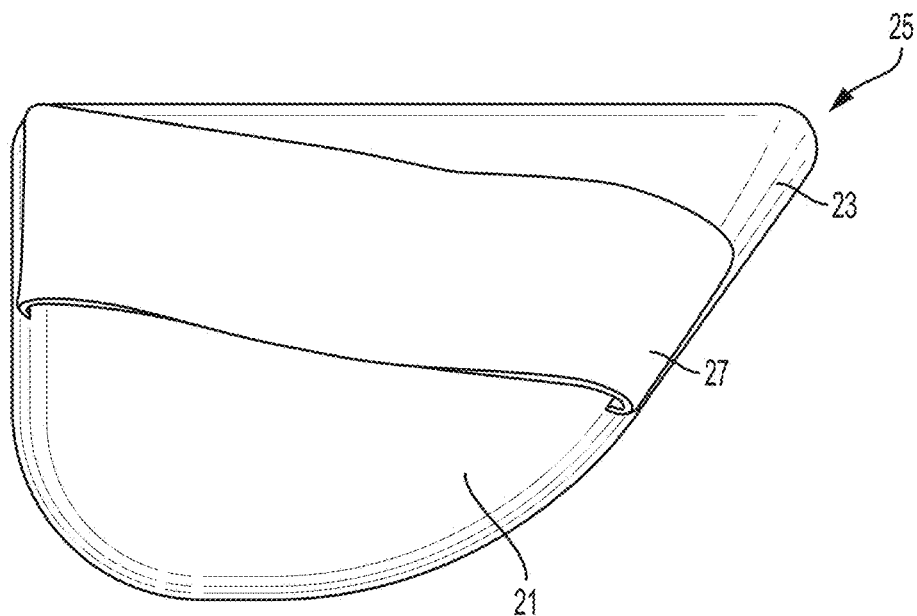
FIG. 23B is another illustration of a strap configuration for a controller.

FIGS. 23A-23B are illustrations of a strap configuration for a handheld controller 25. In an embodiment, a single strap 27 wraps about the handheld controller 25 beneath its top and bottom surface, but exterior to its right and left surface. In an embodiment, the strap 27 can be used with either hand by having a slidable connection at either the top or the bottom. In embodiment, the strap 27 can be used with either hand by being elastic on each side. In an embodiment, one or more electrodes are placed on the strap 27 for frequency infusion. In an embodiment, one or more electrodes are placed on the surface of the handheld controller 25 in a position that will cause substantial contact between a hand and the electrodes when the hand is between the strap 27 and the handheld controller 25. In an embodiment, the injected signals from the strap 27 or lanyard (or wearable or environmental source) are used to determine if the strap 27 or lanyard (or wearable or environmental source) is actually being worn by (or is in proper proximity to) the user, or if the handheld controller 25 is being held without use of the strap 27 or lanyard (or wearable or environmental source).

Figure 24:
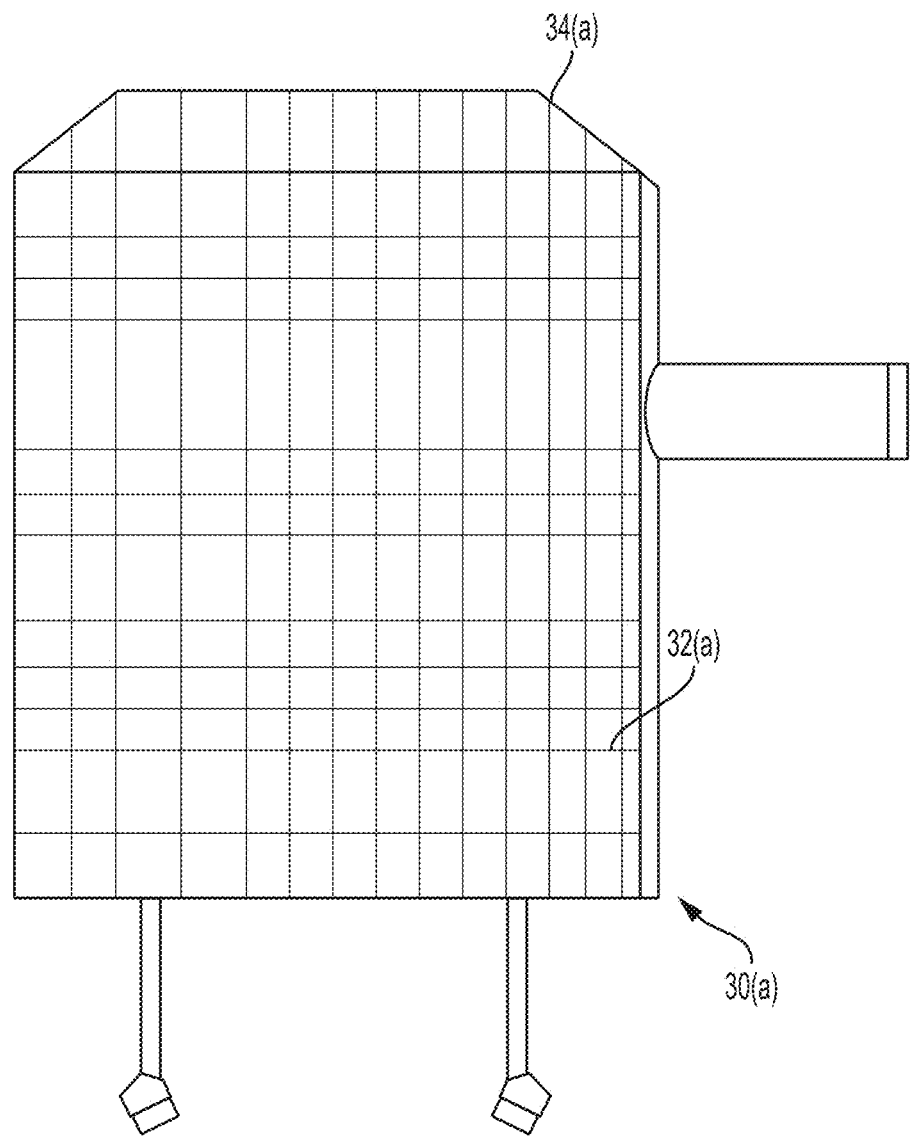
FIG. 24 is an illustration of an embodiment of a multi-layer sensor manifold that can be used on a curved surface, such as a handheld controller.

FIG. 24 is an illustration of an embodiment of a multi-layer sensor manifold 30(a) that can be used on a curved surface such as the handheld controller 25. In an embodiment, the multi-layer sensor manifold 30(a) has a layer of row conductors 32(a) and a layer of column conductors 34(a) separated by a small physical distance. In an embodiment, conductive leads are used for connection to the row conductors 32(a) and column conductors 34(a) In an embodiment, at least a portion of the conductive leads for the row conductors 32(a) are on the same layer as the row conductors 32(a). In an embodiment, at least a portion of the conductive leads for the column conductors 34(a) are on the same layer as the column conductors 34(a). In an embodiment, a flexible substrate is used to separate the layers of row conductors 32(a) and column conductors 34(a). In an embodiment, the row conductors 32(a) and column conductors 34(a) are etched, printed, or otherwise affixed onto opposite sides of the flexible substrate used to separate them. In an embodiment, the row conductors 32(a) and the column conductors 34(b) are affixed on separate substrates that are in close proximity with each other in the manifold 30(a).

In an embodiment, the multi-layer manifold 30(a) further comprises a layer of additional rows (not shown). In an embodiment, conductive leads are used for connection to the additional rows. In an embodiment, at least a portion of the conductive leads for the additional rows are on the same layer as the additional rows. In an embodiment, a flexible substrate is used to separate the layer of additional rows from the rows and/or columns. In an embodiment, the additional rows and one of the rows and columns are etched, printed, or otherwise affixed onto opposite sides of the flexible substrate used to separate them. In an embodiment, the additional rows are affixed on a separate substrate that is in close proximity to the substrate or substrates with the row conductors 32(a) and column conductors 34(a) in the manifold 30(a).

In an embodiment, the manifold 30(a) can be wrapped about a curved portion of a handheld controller 25. In an embodiment, the manifold 30(a) can be wrapped about the simple curvature of the curved portion of the handheld controller 25 shown in FIG. 22. In an embodiment, the manifold 30(a) can be wrapped about a handheld controller 25 or other shape that has compound curvature.

Figure 25:
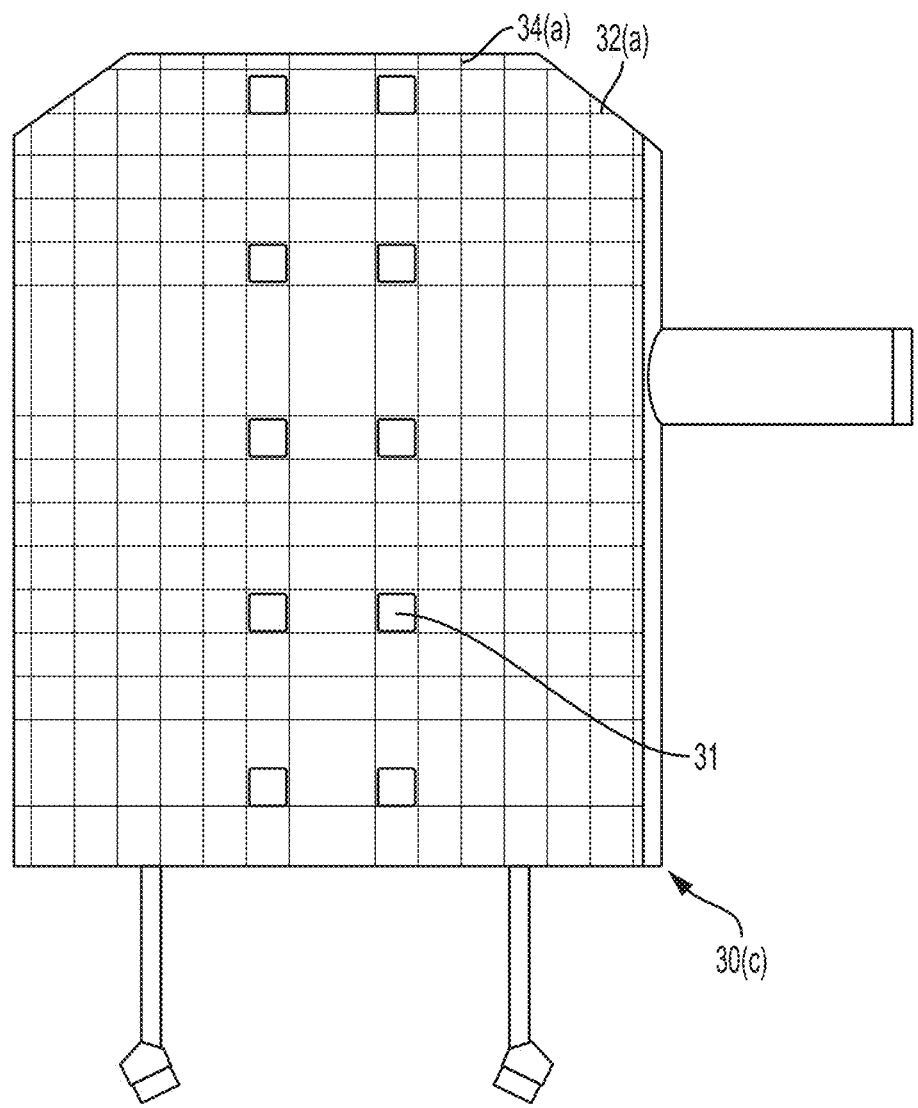
FIG. 25 is an illustration of an embodiment of a multi-layer sensor manifold as generally shown in FIG. 24 additionally having antennas.

FIG. 25 is an illustration of a manifold 30(c) additionally having antennas 31. In an embodiment, the manifold 30(c) can be used on a curved surface such as a handheld controller 25. In an embodiment, the antennas 31 are interleaved with the rows 32(a) and columns 34(a) on one of the row layer or the column layer. In an embodiment, the antennas 31 are interleaved with the rows 32(a) and columns 34(a) but on a separate layer. In an embodiment, at least one of the antennas 31 are flush with the surface of the layer in which they are on. In an embodiment, at least one of the antennas 31 protrude from the layer they are on. In an embodiment, at least one of the antennas 31 is electrically connected to drive circuitry. In an embodiment, at least one of the antennas 31 is electrically connected to receiver circuitry. In an embodiment, at least one of the antennas 31 are electrically connected to circuitry via a shielded coaxial cable. In an embodiment, the antennas 31 are electrically connected to circuitry via a shielded coaxial cable. In an embodiment, the antennas 31 are electrically connected to circuitry via a shielded coaxial cable, where the shield is grounded. In an embodiment, the antennas 31 are receive antennas that can be used as dot sensors. In an embodiment, the antennas 31 are signal infusion electrodes that can be used for frequency infusion (injection).

Figure 26:
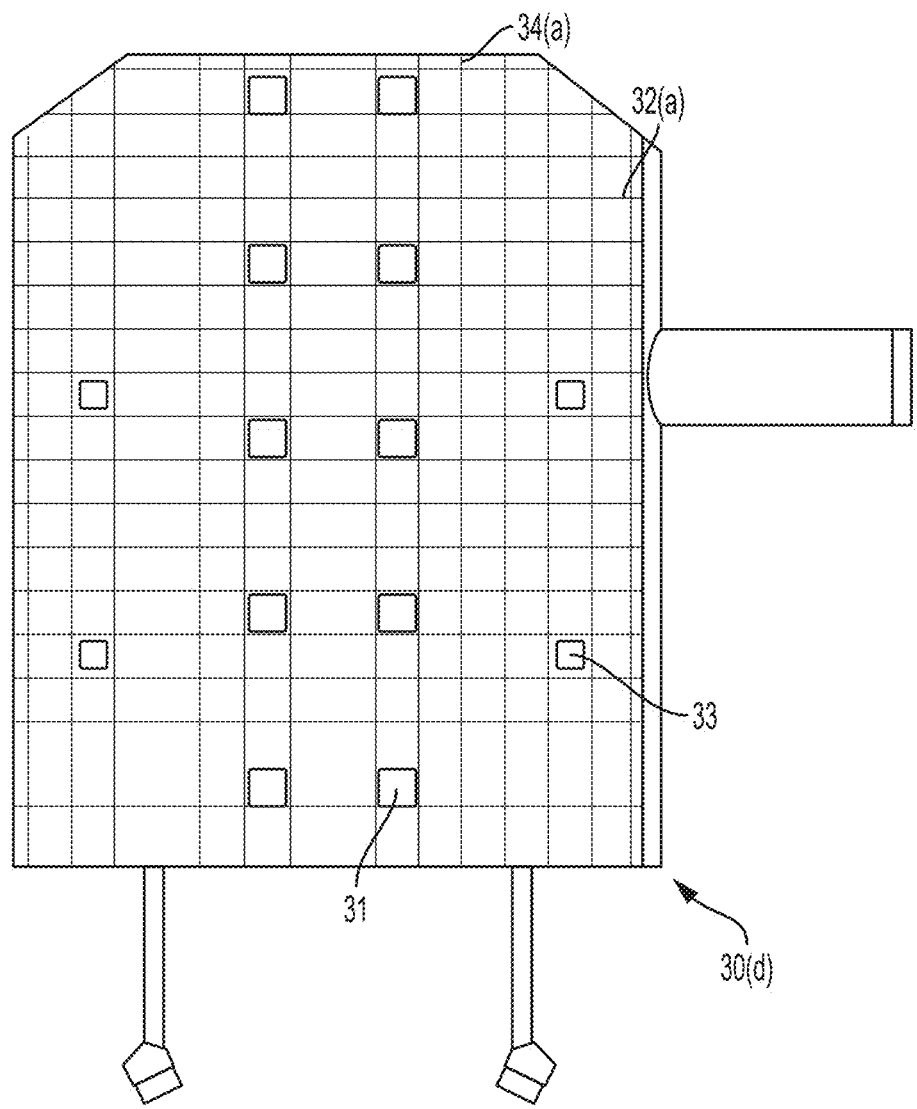
FIG. 26 is an illustration of another embodiment of a multi-layer sensor manifold having antennas.

FIG. 26 is an illustration of another embodiment of a multi-layer sensor manifold 30(*d*) as generally shown in FIG. 25 having antennas 31 and additional signal infusion conductors 33. In an embodiment, the manifold 30(*d*) is curved around a handheld controller 25 such as the one shown in FIG. 22. In an embodiment, the signal infusion conductors 33 are provided. In an embodiment, the signal infusion conductors 33 are used as a combination of frequency injectors and dot sensors. It will be apparent to one of skill in the art in view of this disclosure that the number, orientation and utilization of the additional signal infusion conductors 33 will vary with the application in which the sensor manifold 30(*d*) is used.

In an embodiment, the signal infusion conductors 33 are the outermost electrodes on the left and right sides. In an embodiment, the signal infusion conductors 33 are electrically connected to drive circuitry (not shown) that provides a plurality of unique orthogonal signals. In an embodiment, the drive circuitry simultaneously provides at least one of a plurality of unique frequency orthogonal signals to each of the signal infusion conductors 33. In an embodiment, the drive circuitry simultaneously provides multiple unique frequency orthogonal signals to each of the signal infusion conductors 33. In an embodiment, the drive circuitry simultaneously provides at least one of a plurality of unique frequency orthogonal signals to each of the signal infusion conductors 33 and to each of the row conductors 32(*a*). In an embodiment, the drive circuitry simultaneously provides multiple ones of a plurality of unique frequency orthogonal signals to each of the signal injection conductors 33 and at least one other of the plurality of unique frequency orthogonal signals to each of the row conductors 32(*a*).

In an embodiment, the five innermost antennas 31 on the left and the five innermost antennas 31 on the right sides are dot sensors. In an embodiment, the dot sensors are electrically connected to receive circuitry (not shown) that can determine a signal strength for a plurality of orthogonal signals, including, at least the orthogonal signals emitted by the signal infusion conductors 33. In an embodiment, the dot sensors are electrically connected to receive circuitry (not shown) that can determine a signal strength for a plurality of orthogonal signals, including at least the orthogonal signals emitted by the signal infusion conductors 33 and orthogonal signals transmitted on the row conductors 32(*a*).

In an embodiment, the heterogeneous manifold sensor 30(*d*) is wrapped about the surface of the handheld controller 25 of FIG. 22, the row conductors 32(*a*) and signal infusion conductors 33 each having a different one or more of a plurality of orthogonal signals thereupon provided by a drive circuitry, and the dot sensors antennas 31 and column conductors 34(*a*) each being electrically connected to receive circuitry that for each sensor antenna 31 or column conductors 34(*a*) can determine a signal strength associated with each of the plurality of orthogonal signals. In a further embodiment, the signal strengths are used to determine the position and orientation of a hand with respect to the sensor. And in yet a further embodiment, a strap 27 is used to support the handheld controller 25 on the hand to provide partially constrained freedom of movement to the hand.

Figure 27:
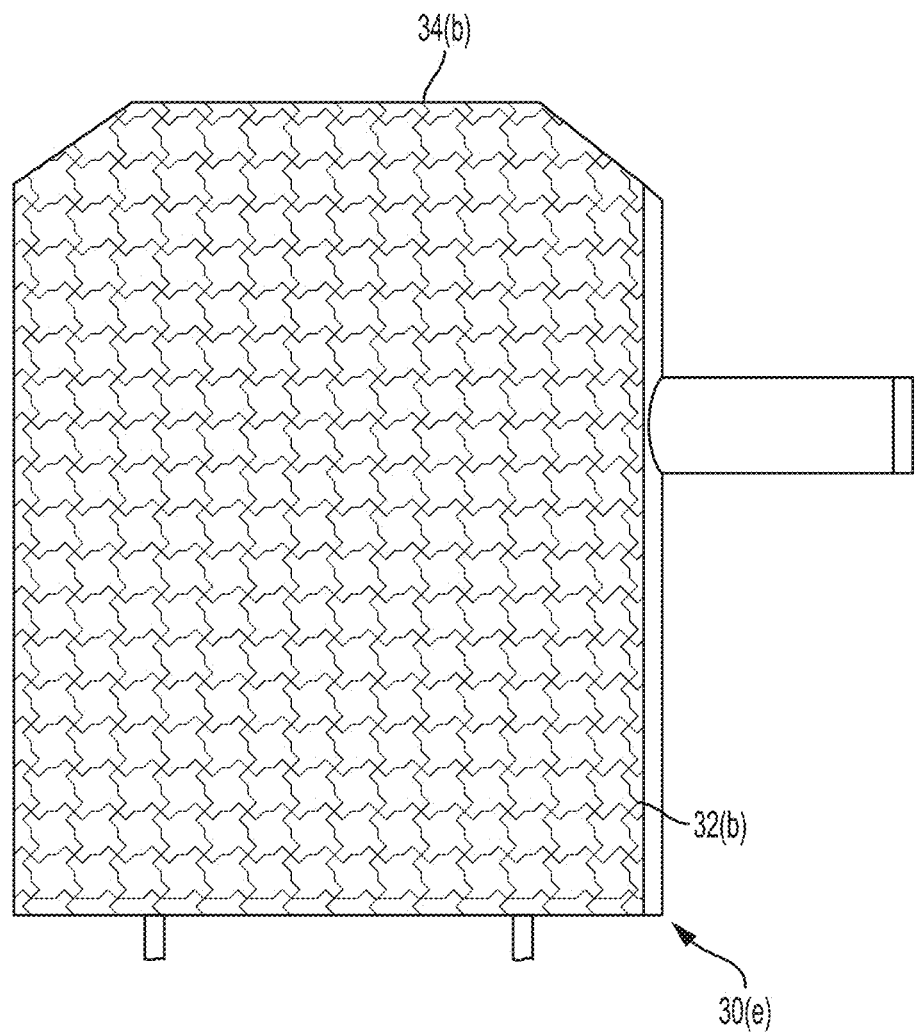
FIG. 27 is an illustration of another embodiment of a multi-layer sensor manifold having a different row and column design than that shown in FIGS. 24 and 26.

FIG. 27 is an illustration of another embodiment of a multi-layer sensor manifold 30(*e*). The multi-layer sensor manifold 30(*e*) has row conductors 32(*b*) and column conductors 34(*b*) that are formed in a pattern.

Figure 28:
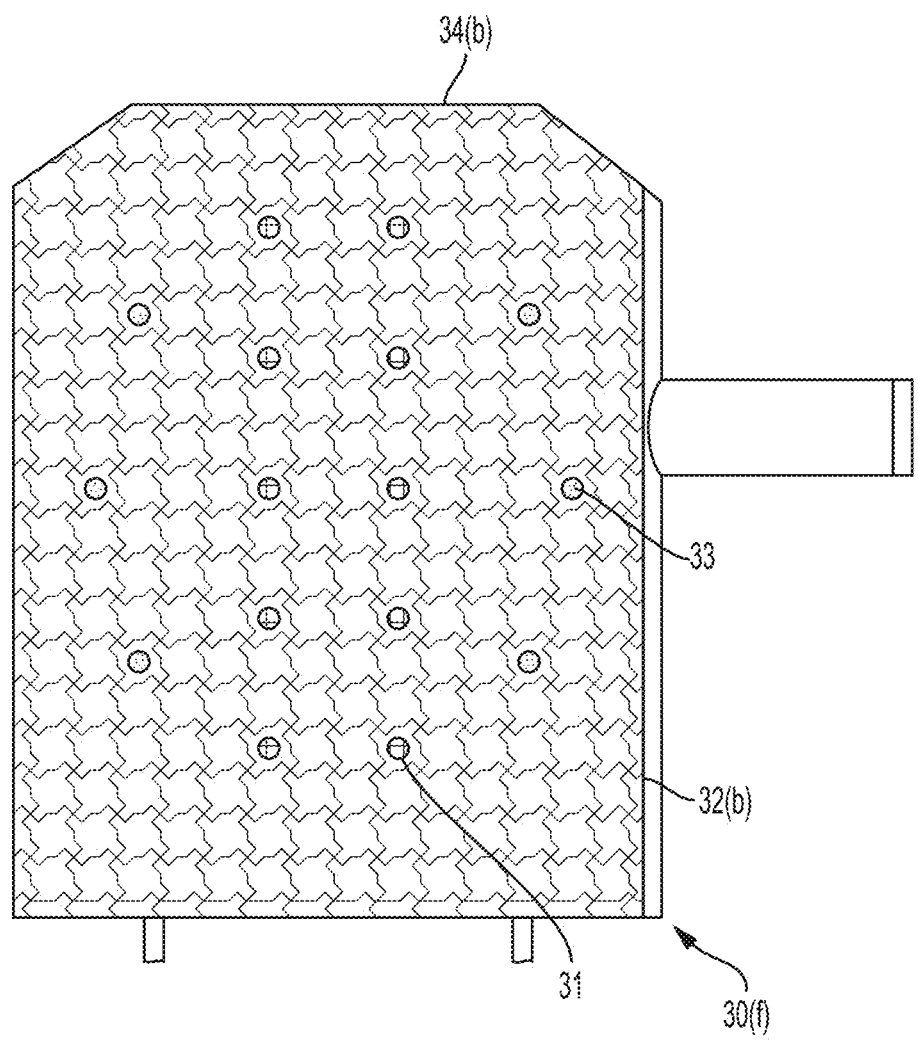
FIG. 28 is an illustration of another embodiment of a multi-layer sensor manifold having a different row and column design and having antennas and signal infusion conductor electrodes.

FIG. 28 is an illustration of yet another embodiment of a multi-layer sensor manifold 30(*f*) having antennas 31 and signal infusion conductors 33. Additionally, the multi-layer sensor manifold 30(*f*) has row conductors 32(*b*) and column conductors 34(*b*) having the same pattern as that shown in FIG. 28.

Although the rows and columns are oriented differently, the descriptions above applicable to FIGS. 27 and 28 are similarly applicable to FIGS. 24, 25 and 26.

In an embodiment, multi-finger flexion is sensed using close hover and contact data via fast multi-touch (FMT) sensing. In an embodiment, close hover and contact data from a trigger-centric sensor pattern is used to sense index, middle, ring, and pinky finger flexion. In an embodiment, multi-finger flexion is sensed using signal injection and dot sensors as herein described. In an embodiment, multi-finger flexion is sensed using a heterogeneous sensor and injectors as described herein.

In an embodiment, a reference frame is stored. In an embodiment, a reference frame reflects the state of the sensor detecting finger flexion when the controller is at rest, e.g., no detectable signals are received as a result of touch. In an embodiment, a single N×M frame of raw signal data is saved as the baseline. In an embodiment, an N×M frame of raw signal data and the state of the dot sensors is saved as the baseline.

In an embodiment, using the baseline, an incoming frame is converted into decibels (i.e. $-20.0\mathrm{f}^*\log 10$(incoming/baseline). The converted incoming frame may be referred to as the heatmap. In an embodiment, the incoming frame includes data from the dot sensors.

In an embodiment, the average signal value is calculated for the row frequencies. The average signal value is referred to as the multi-finger waveform. In an embodiment, for each column M in the heatmap, the average signal value of the column is calculated as the multi-finger waveform. In an embodiment, the multi-finger waveform is calculated for each row N. In an embodiment, the multi-finger waveform is calculated from a combination of the signal values of rows and columns. In an embodiment, the selection of information for calculation of the multi-finger waveform depends on the sensor pattern.

In an embodiment, the average signal value for each finger may be calculated. The average signal value is referred to as the finger waveform. In an embodiment, for each column M in the heatmap, the average signal value of the column is calculated as the finger waveform. In an embodiment, the finger waveform is calculated for each row N. In an embodiment, the finger waveform is calculated from a combination of the signal values of rows and columns. In an embodiment, the selection of information for calculation of the finger waveform depends on the sensor pattern. In an embodiment, the values for a multi-finger waveform may be calculated.

In an embodiment, a multi-finger waveform representing the nearly vertical fingers (as viewed from the top, i.e., extended away from the controller) may be saved as a template. In an embodiment, the template can be made from a controller grasped with the index, middle, ring, and pinky finger are nearly vertical. In an embodiment, the template is associated with the hand or user from which the template was acquired. In an embodiment, multiple templates (e.g., for multiple hands and/or users, and/or for the same hand) are also saved for future use. In an embodiment, multiple templates may combine. Templates may be combined to normalize information or obtain statistical data about the hand and finger.

In an embodiment, during typical movement, the incoming multi-finger waveforms can be compared against the template. In an embodiment, the normalized root mean square deviation (NRMSD) is calculated to provide a similarity measure of the incoming waveforms and the template.

In an embodiment, injected frequencies as detected at one or more dot sensors may support the determination of finger position and orientation.

To improve the accuracy of the similarity measure, in an embodiment, the incoming waveform and template are split into three regions corresponding to the individual bones of the finger (proximal, middle, distal) and their position along the sensor. In an embodiment, three NRMSD values are calculated, one for each section of the finger (NRMSDproximal, NRMSDmiddle, NRMSDdistal). Each portion of the incoming finger waveform can be compared against the template.

In an embodiment, the NRMSD value is used as a weight to calculate the rotation at each joint. For example:

$$R_{proximal} = NRMSD_{proximal} * Angle\_Maximum_{proximal}.$$

$$R_{middle} = NRMSD_{middle} * Angle\_Maximum_{middle}.$$

$$R_{distal} = NRMSD_{distal} * Angle\_Maximum_{distal}.$$

In an embodiment, because the NRMSD is always positive, the integral of the template and incoming finger waveform may be calculated to determine when the index finger is extended. The integral of the incoming waveform and the template will be less than zero. In an embodiment:

$$R_{proximal} = NRMSD_{proximal} * Angle\_Extension_{proximal}.$$

$$R_{middle} = NRMSD_{middle} * Angle\_Extension_{middle}.$$

$$R_{distal} = NRMSD_{distal} * Angle\_Extension_{distal}.$$

Figure 29:
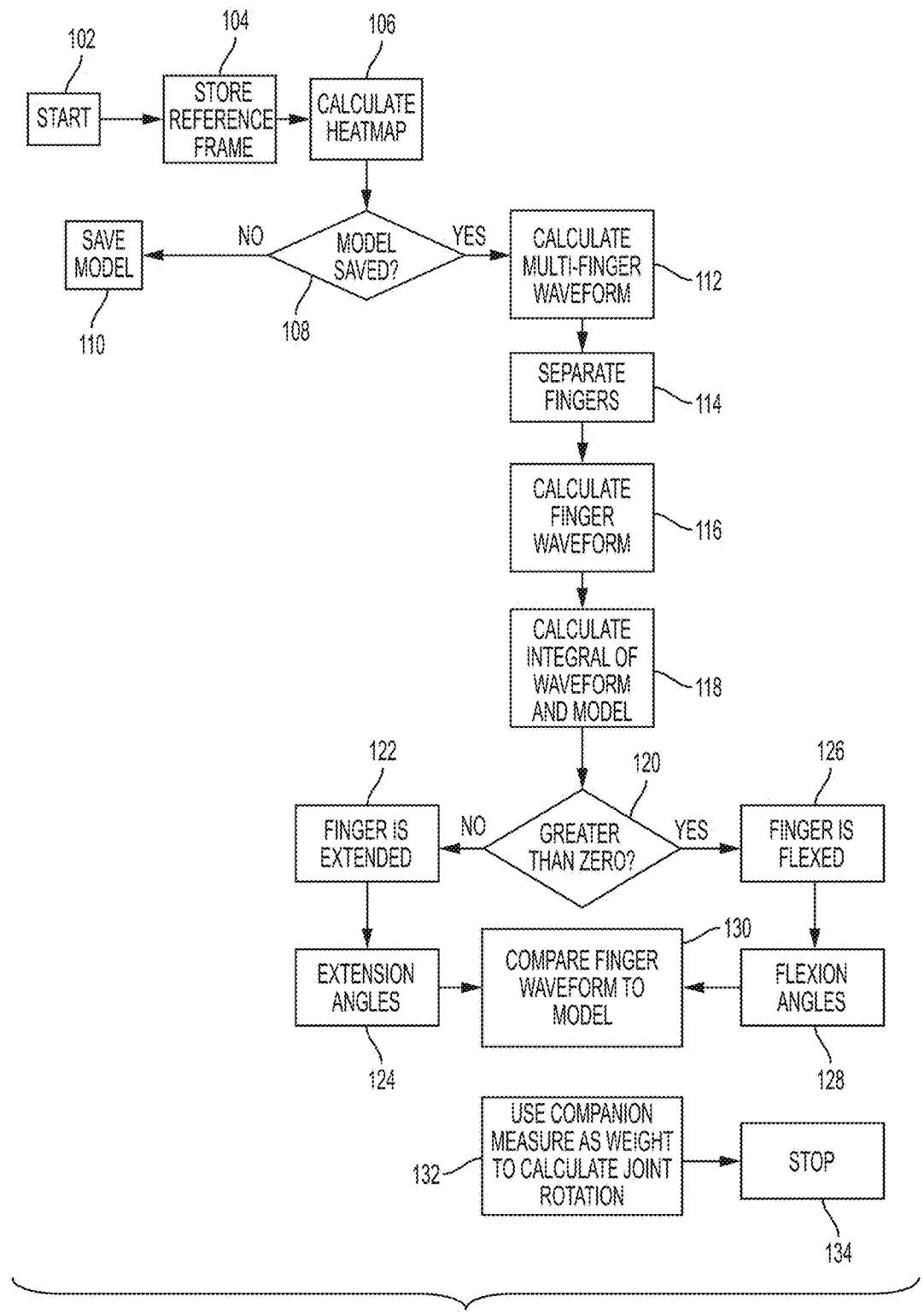
FIG. 29 illustrates a high-level, flow diagram showing one embodiment of a method of using sensor data to infer the skeletal position of the hand and fingers relative to the sensor.

FIG. 29 is a high-level flow diagram showing one embodiment of a method of using sensor data to infer skeletal position relative to the sensor. In step 102, the process is started. In step 104, a reference frame is stored. In step 106, a heatmap is calculated. In step 108, it is determined if the model was saved. In step 110, the model is saved if it was not saved before. In step 112, if the model had been saved the multi-finger waveform is calculated. In step 114, the separate fingers are calculated. In step 116, the finger waveform is calculated. In step 118, the integral of the waveform and the model is calculated. In step 120, it is determined if it is greater than zero. If not, in step 122, the finger is extended. In step 124, the extensions angles are determined. In step 126, if the integral of the waveform is greater than zero, the finger is flexed. In step 128, the flexion angles are determined. In step 130, the finger waveform is compared to a model. In step 132, a companion measure is used as a weight to calculate join rotation. In step 134, the calculation from step 132 is stopped.

Figure 30:
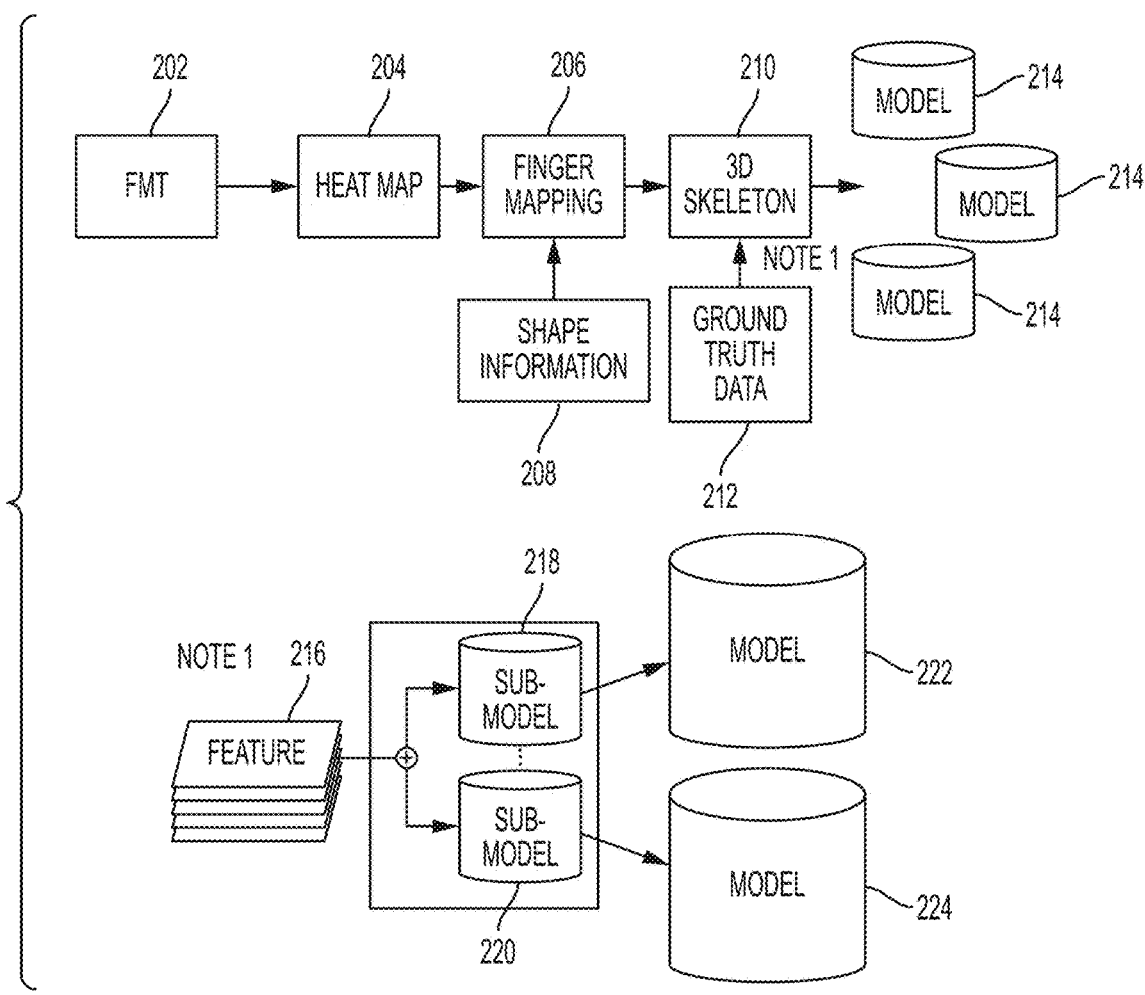
FIG. 30 is a block diagram showing an embodiment of a skeletal hand and finger reconstruction model creation workflow.

FIG. 30 is a block diagram showing one embodiment of a skeletal reconstruction model creation workflow. In step 202, fast multi-touch sensing occurs. In step 204, a heat map is created. In step 206, finger mapping occurs. In step 208, shape information can be used in the finger mapping. In step 210, a 3D skeleton is created. In step 212, ground truth data is used in creating the 3D skeleton. In step 214, models are created. In step 216 a feature is used. In step 218, sub-models are created. In step 222, models are created.

Figure 31:
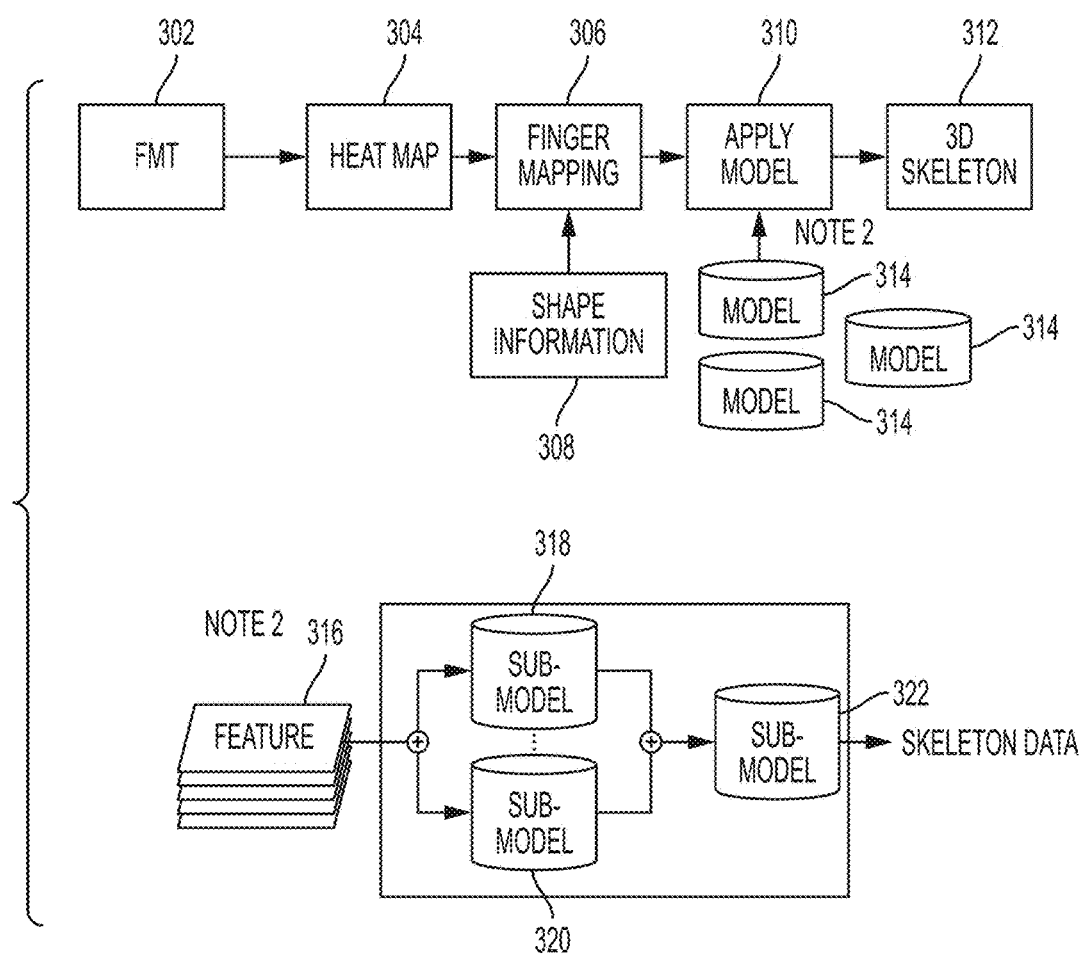
FIG. 31 is a block diagram showing an embodiment of a real-time skeletal hand and finger reconstruction workflow.

FIG. 31 is a block diagram showing one embodiment of a real-time skeletal hand reconstruction workflow. In step 302 fast multi-touch sensing occurs. In step 304, a heat map is created. In step 306, finger mapping occurs. In step 308, shape information can be used in the finger mapping. In step 310, a model is applied. In step 314, the models for step 310 are provided. In step 312, a 3D skeleton is formed. In step 316 a feature is used. In step 318, sub-models are created. In step 322, a sub-model is created.

Processing the Heatmap to Identify the Fingers and Finger Properties

In an embodiment, one step towards reconstructing a hand skeleton and movement is finger separation. Thus, in connection with the reconstruction of finger movement (e.g., while grasping handheld controller 25) separate finger locations (i.e., areas) may be determined on the heatmap before finger waveforms are calculated.

Figure 32:
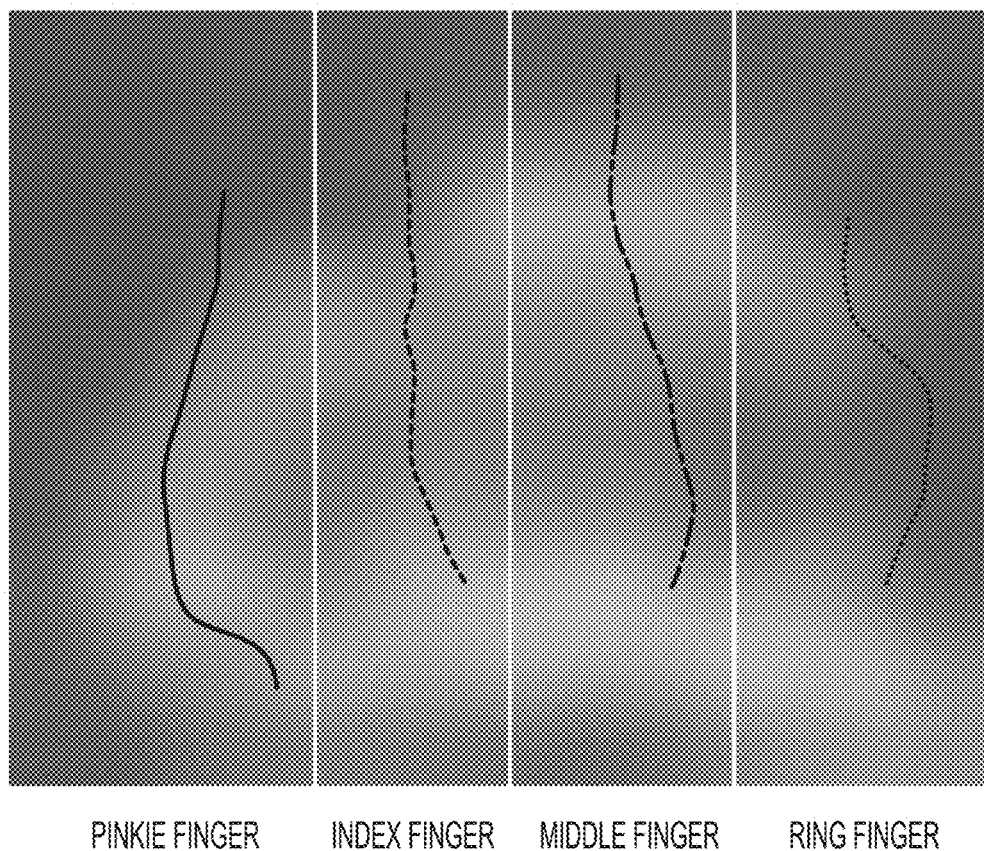
FIG. 32 illustrates a heatmap of fingers grasping a controller.
Figure 33:
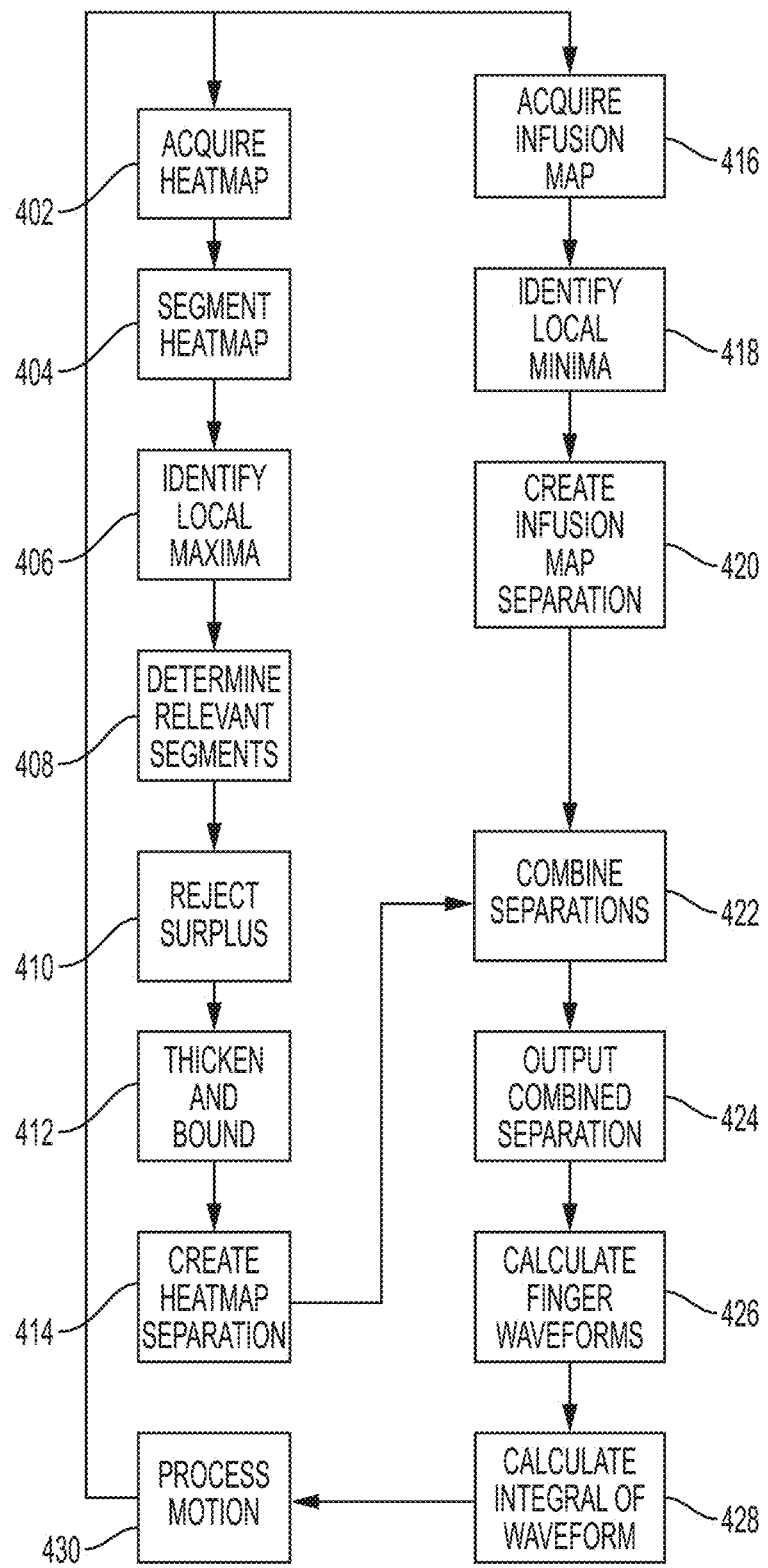
FIG. 33 shows a flowchart of a composite process to process motion in separated regions.

FIG. 32 contains a flowchart showing implementation of one embodiment of the present invention. The steps Acquire Heatmap in step 402, Segment Heatmap in step 404, Identify Local Maxima in step 406, Determine Relevant Segments in step 408, Reject Surplus in step 410, Thicken and Bound and Create Heatmap Separation in step 412, reflect one embodiment of the use of touch data to determine boundaries as described above. In step 414 the heatmap is created.

The steps Acquire Infusion Map in step 416, Identify Local Minima in step 418 and Create Infusion Map Separation in step 420, reflect one embodiment of the use of infusion data to determine boundaries as described below. In other words, the heatmap that is acquired may be a combination of both infusion and the use of FMT sensing.

The separation of the heatmap into a plurality of areas representing the separate digits is referred to as finger, body part or digit separation. The Combine Separations in step 422, as discussed below, identifies boundaries based upon the results of the touch data process and the infusion data process. The Output Combined Separation in step 424 reflects the combined boundaries, as, for example, shown in FIGS. 50A-50L. As described elsewhere in the specification, once separation is determined and thus the motion of each finger can be understood separately, the steps of Calculate Finger Waveforms in step 426, Calculate Integral of Waveforms in step 428 and Process Motion in step 430 may also be performed. See, for example, the description of FIG. 38.

A generalized method of identifying where a finger begins and ends presents a significant challenge due to hand size and shape variation and the bunching of fingers, which can cause the finger boundaries to blend together in the heatmap. Three separation approaches are described below. The first approach analyzes the spatial distribution of inferred points in the touch data, the second approach identifies the local minima of an interpolated infusion signal, and the third approach combines the first and second approaches. Note that the first two approaches are orthogonal and can be applied separately or combined.

For illustrative purposes, the general methods disclosed herein are discussed with respect to a handheld controller 25 such as the one shown in FIG. 22. It should be understood by a person of skill in the art in view of this disclosure that these methods are more generally applicable, and thus, for example, can be used to locate areas of interest (e.g., separate heatmap areas) in any skeletal or positional reconstruction, including any of the numerous hand-measurement applications. Thus, for example, the separation procedures disclosed herein, in addition to applying to a wide variety of handheld game controllers, may be useful for separating digits on other types of hand grips or gripped objects, such as those found on tennis racquets, golf clubs, ping-pong paddles, a wide variety of balls, steering wheels, joysticks, flight sticks, mouse controls, motorcycle and bicycle hand grips, and many others. Moreover, the procedures and apparatus can be applied to other postural and skeletal applications that are not directed only to hands. For example, the methods and apparatus disclosed herein can be used to separate arms or legs from other parts of the body in a bed or seat application. As another example, the methods and apparatus disclosed herein can be used to separate the toes. Also, for example, the methods and apparatus disclosed herein can be used to separate fingers on a touch-sensing keyboard.

Figure 34:
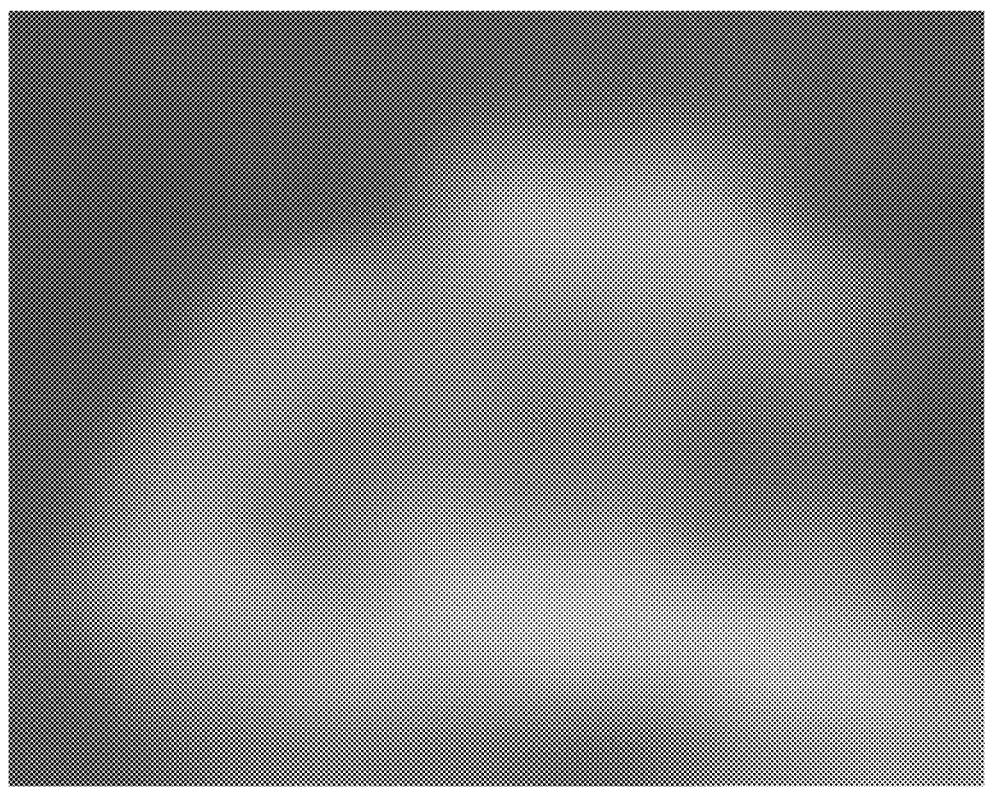
FIG. 34 shows an illustrative heatmap reflecting digit positions recorded on a handheld controller such as the one shown in FIG. 22.

Turning to FIG. 34, an illustrative heatmap is shown, the heatmap reflecting data acquired when a hand is positioned on a handheld controller 25 such as the one illustrated in FIG. 22 is shown. The use of the following novel technique of determining finger separation based on heatmap data is generally limited to the condition where there is a presence of fingers. Such presence refers to a condition that the proximal phalanx is touching and/or detected by the controller 25. In the event that only the metacarpals are present—i.e., assuming that the proximal phalanges are not in touch with the controller 25, which could occur if fingers are all straightened on the controller shown in FIG. 22—the separation algorithms should not be applied. Presence of the proximal phalanx can be detected via the number of skeletal points, strength of injected signal, or by other features, all of which will be apparent to a person of skill in the art in view of this disclosure.

In an embodiment, the heatmap data represents the distance of the hand from the surface of the controller. In an embodiment, the heatmap data represents the pressure of the hand on the surface of the controller. In an embodiment, the heatmap data represents contact between the hand and the surface of the controller. In an embodiment, the heatmap reflects data that represents one or more aspects (e.g., distance/contact/pressure) of the body (e.g., entire body/hand/finger/foot/toe) position with respect to a sensor. The heatmap can be from any source, and need not be a handheld controller. For example, the heatmap could be provided from a flat surface, or from any three-dimensional shape. For convenience of reference herein, the general direction of the fingers (or other part of interest) in the heatmap will be referred to herein as the vertical. The vertical direction corresponds to the manner in which the heatmaps are generally oriented in the Figures.

Figure 35:
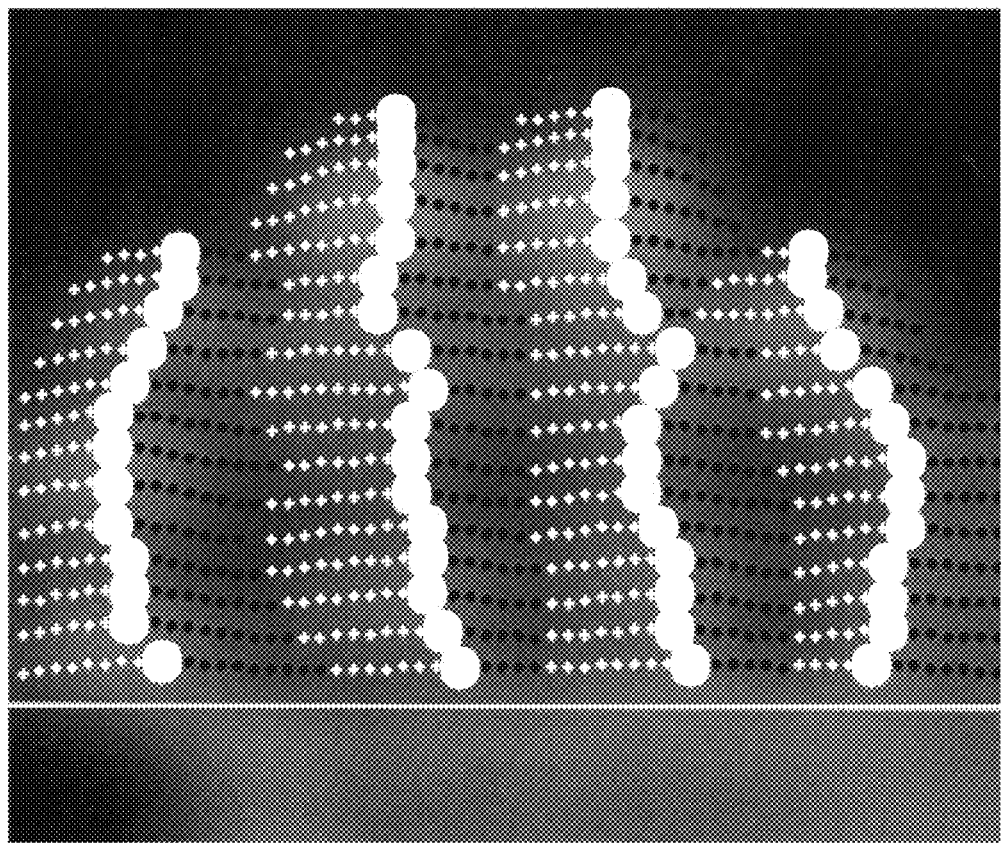
FIG. 35 shows an illustration of the results of a segmented local maxima computation on the heatmap shown in FIG. 34.

In a first step, inferred skeletal points are extracted via first derivative analysis. In this step, cross-sections of the heatmap are averaged column-by-column. Column averages above a threshold are identified as feature points. Local maximas within these feature points correlate with the finger bones and metacarpals. In an embodiment, the heatmap is segmented into horizontal strips, and each strip is processed to find local maxima. The size of each strip may depend on the resolution of the sensor and the size of the objects being detected. In an embodiment, an effective strip height of 10 pixels or less may be used for finger separation. In an embodiment, an effective strip height of 5 pixels may be used for finger separation. In an embodiment, the heatmap is upsampled, having the actual sensor lines 5 millimeters apart. In an embodiment, 10 pixels corresponds to approximately 3 mm; 5 pixels corresponds to approximately 1.5 mm. In an embodiment, an effective strip height of 3 pixels is used for finger separation. In an embodiment, the strips are processed with no overlapping data. In an embodiment, data is overlapped within the strips. Thus, for example, an effective strip height of 10 pixels may be used, but the strips may overlap by 5 pixels in each direction, thus every measurement is accounted for in two measurements. In an embodiment, strips may be of differing sizes. In an embodiment, strips may be of differing sizes with smaller sizing used where more resolution is desired. FIG. 35 shows the results of identifying the local maxima as discussed above. Dots are visually superimposed over the heatmap in FIG. 35, with small crosses dots reflecting upward changes, black crosses reflecting downward changes, and large filled dots representing local maxima.

Figure 36:
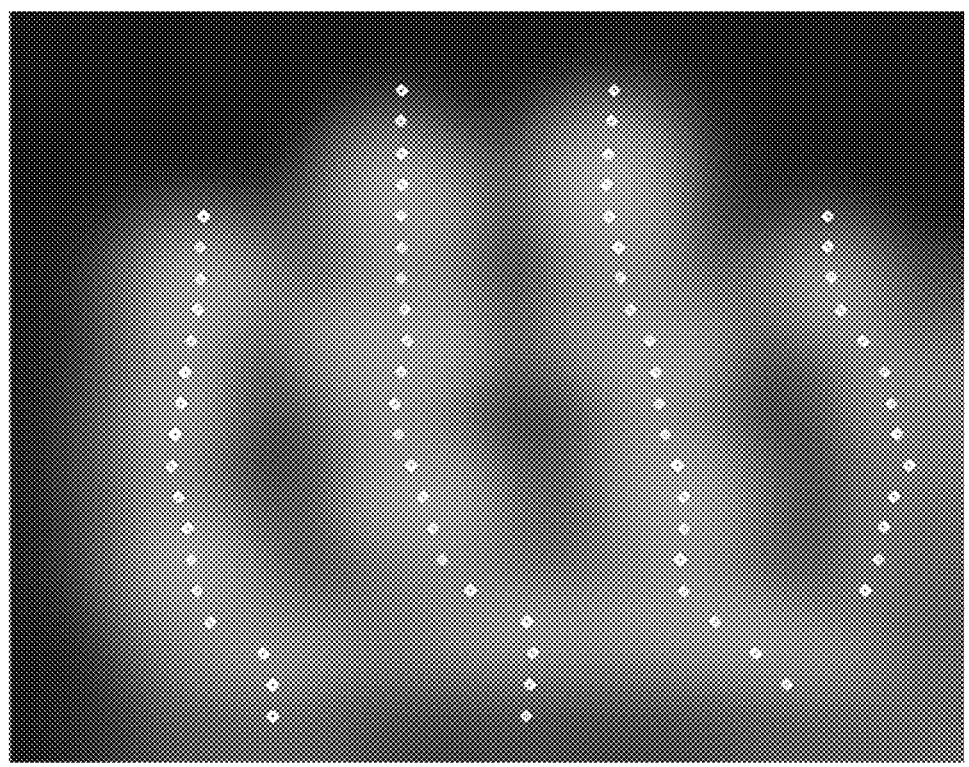
FIG. 36 shows a superimposition of local maxima illustrated in FIG. 35 on the heatmap of FIG. 34.

FIG. 36 reflects the same information, with the white crosses and black crosses removed, and the large filled dots resized. Finger data will be apparent in FIGS. 34, 35, and 36 to a person of skill in the art in view of this disclosure. It will also be apparent to a person of skill in the art that some palm data is present in addition to the finger data. For useful finger separation, palm data must be removed.

Figure 37A:
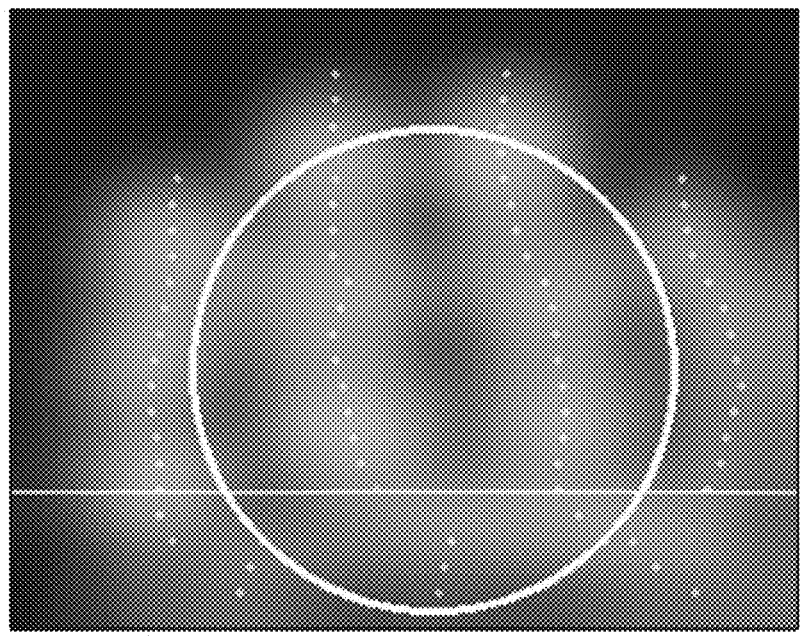
FIG. 37A shows an illustrative example of a circle-fit and an illustration of an exemplary method for rejecting superfluous data.
Figure 37B:
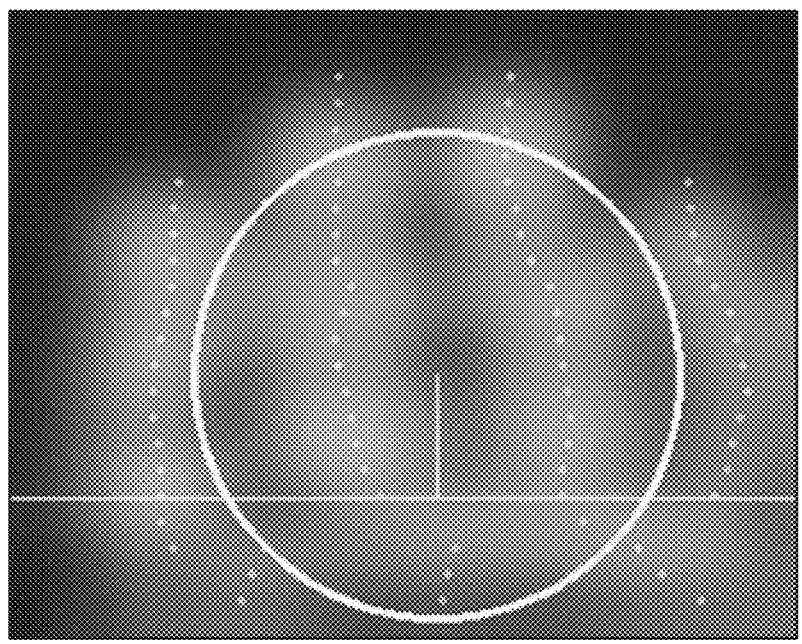
FIG. 37B shows an illustrative example of a circle-fit and an illustration of an exemplary method for rejecting superfluous data.

With reference to FIGS. 37A and 37B, in an embodiment, the palm data is removed using a circle fit. A circle fit defines the circle that best represents all of the local maxima. Stated differently, the circle fit minimizes the sum of the squared radial deviations. In an embodiment, given a set of measured (x,y) pairs that are supposed to reside on a circle but with some added noise, a circle is calculated to these points, i.e., find xc,yc,R, such that $(x-xc)^2+(y-yc)^2=R^2$. In an embodiment, a Taubin method circle fit can be used. Once the circle fit is determined, it may be used to reject or ignore information in the heatmap, for example, palm information. In an embodiment, the local maxima points are rejected if they fall below a horizontal line half of the radius below the circle center, as determined by the circle fit (see FIGS. 37A 37B). It is not required to use a circle fit to represent the local maxima, however, the circle fit provides an adequate reflection of the local maxima data to reject portions of the heat map, such as the palm, in connection with the controller 25 of FIG. 22 and data acquired therefrom. Similarly, while the illustrated controller 25 provides sufficient information to be able to ignore or reject the information below half the radius from the circle center, this is also more generally related to the geometry of the problem to be solved. For example, where arms are being separated from a body on a car seat or a bed, an ellipse fit function may be more appropriate. Similarly, where a handheld controller positions the palm using mechanical means, rejecting or ignoring portions of the heat map may be accomplished by correlating a known position of the palm with the received sensor data.

The circle fitting can also be used to measure the width or breadth of the palm. If the horizontal line that is half the radius below the circle center on the heatmap determines the boundary between the palm and the fingers, then the width or breadth of the palm can be measured by finding the leftmost and rightmost contours in the heatmap, finding the leftmost and rightmost positions in the contour (respectively), and subtracting the difference between the two positions. In instances where the hand may be too large to create a contour on the left, an approximation of the breadth of the palm may be measured by subtracting the maximum width of the heatmap from the rightmost position in the right contour. In instances where the hand may be too large to create a contour on the right, an approximation of the breadth of the palm may be measured by subtracting the leftmost position in the left contour from the minimum width of the heatmap. It will be apparent to those skilled in the art that a variety of methods can be used to find the contours of the palm.

In an embodiment, using the hand controller 25 shown in FIG. 22, it has been discovered that people with different sized and shaped hands naturally position their hands differently on the controller. Thus, for example, the palm of a smaller hand tends to be further "forward" on the controller, and thus, further up on the heatmap in the orientation shown. For this type of application, it has been generally shown that the combination of a circle fit, and the rejection or ignoring of the local maxima on the heatmap below half of the radius from the circle center is appropriate to reject or ignore the palm data. It will be apparent to a person of skill in the art in view of this disclosure how to apply different functions and constants to reject unwanted maxima in other contexts.

Figure 38:
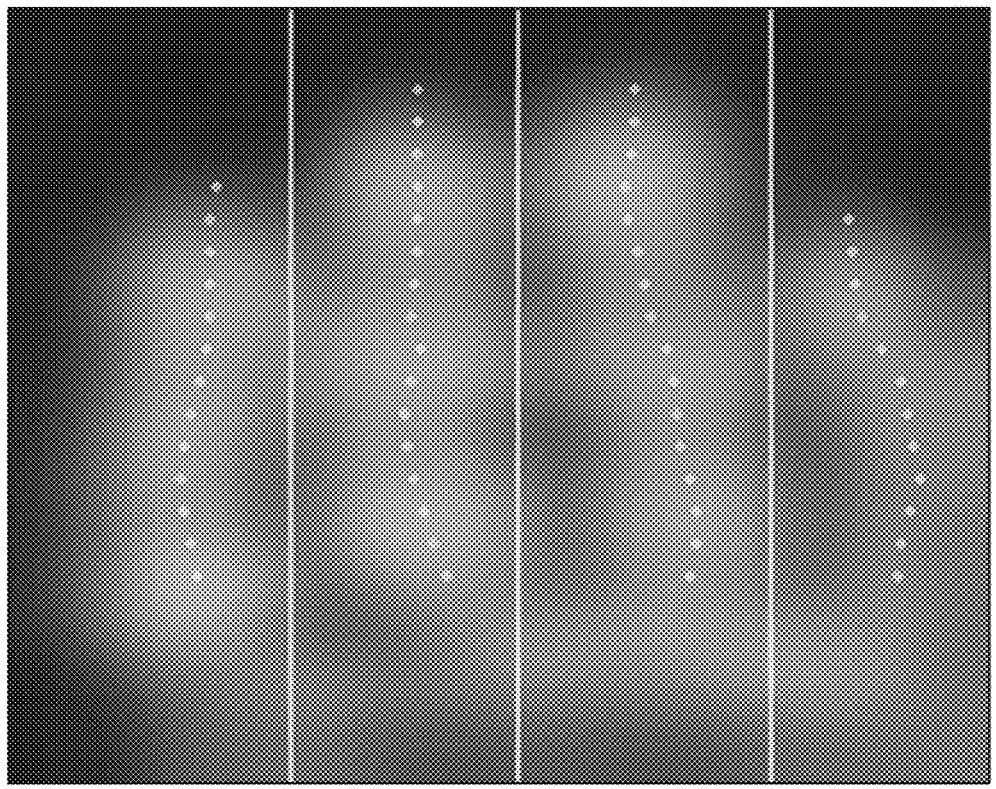
FIG. 38 shows finger separation superimposed on the non-superfluous local maxima shown in FIG. 34.

With the superfluous data (e.g., palm data) removed, an initial determination of the boundaries (i.e., the finger separation) may be made. In an embodiment, the set of all maxima points are averaged to produce a centroid, and the centroid is used to define the boundary between the middle and ring finger. In an embodiment, points to the left or right of the centroid are sorted and averaged within their respective regions (FIG. 38). This left/right half averaging produces the index-middle boundary and ring-pinky boundary. Thus, in an embodiment, an average of the X position of every non-rejected maxima is used to determine a center line, thus separating the index and middle finger from the ring finger and pinky finger. An average X position of every non-rejected maxima in each half can then be used to separate the index finger from the middle finger, and the ring finger from the pinky. FIG. 38 illustrates a finger separation as so described. In an embodiment, other methods of segmentation can be used, including when fewer than all of the fingers are present. For example, where three fingers are represented, trisection is possible. If two fingers are represented, only the first bi-section is needed. If there is only one-digit present, finger separation is not required.

Figure 39:
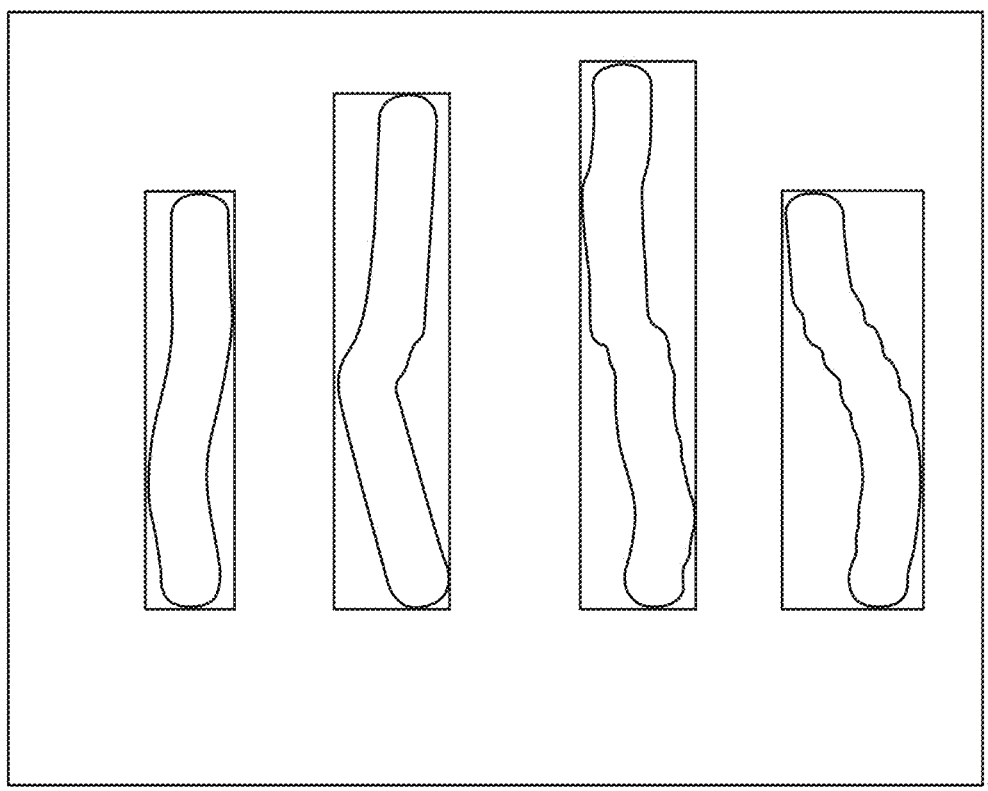
FIG. 39 shows an illustration showing enlarged local maxima in bounding boxes.

While these boundaries may present a sufficient separation, variations in hand size and shape have shown that further processing may provide better separation, especially with the illustrative controller and smaller hand sizes. In smaller hand sizes, some fingers appear less straight (i.e., more curled) on the heatmap. In an embodiment, the local maxima are processed to determine whether the identified boundaries require adjustment. In an embodiment, the maxima are inflated and circumscribed by a bounding box, and the bounding boxes are compared with the other bounding boxes and the initially identified boundaries. Turning to FIG. 39, maxima related to touch have been inflated horizontally for illustration. The inflated maxima create an inferred finger contour. FIG. 39 also illustrates a bounding box around each of the inferred finger contours. There is no overlap between the bounding boxes shown in FIG. 39. Moreover, as the boundaries shown in FIG. 39 do not intersect the bounding boxes shown in FIG. 39, no adjustment to the boundaries is required.

Figure 40:
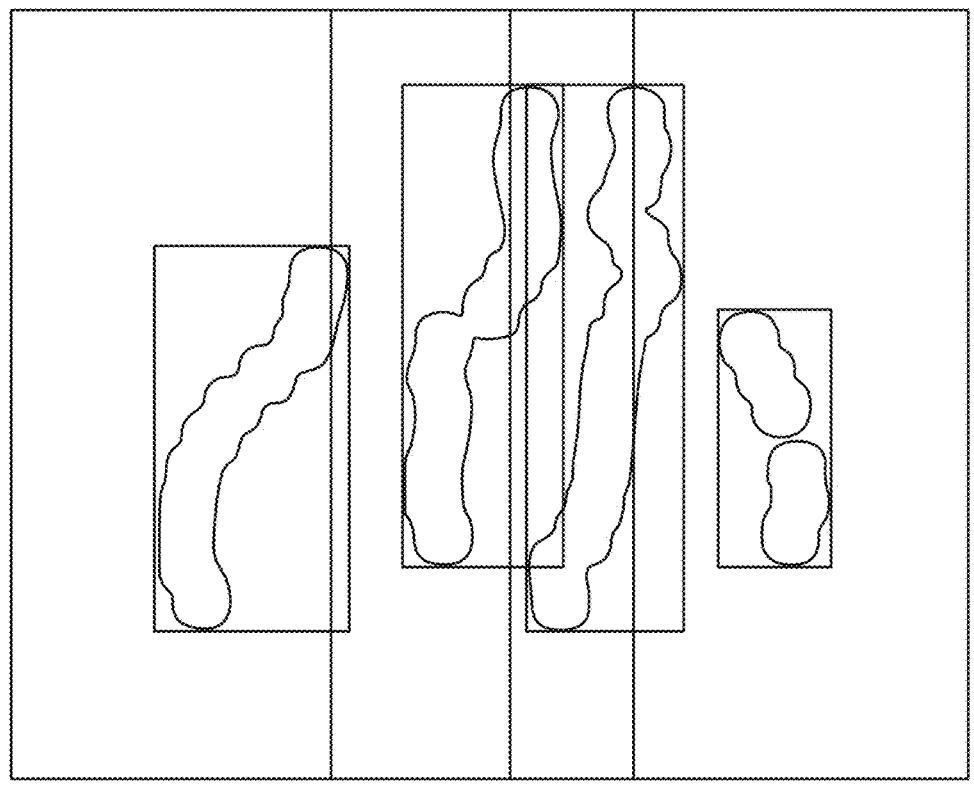
FIG. 40 shows an illustration showing enlarged local maxima in bounding boxes for a different hand than the one shown in FIG. 39.

Turning to FIG. 40, an inferred finger contour and the initially determined boundaries are shown for a different hand. The FIG. 40 data results in two issues, first, the bound boxes overlap, and second, the boundary lines intersect the bounding boxes. In an embodiment, the right side of the respective bounding boxes is used as the boundary as shown in FIG. 39. In an embodiment, where two bounding boxes overlap, a weighted computation may be made with respect to the overlapping regions of the bounding boxes, and the boundary shifted to a location within each box, but at a position that is dictated by the contribution of each finger contour to the overlap. In an embodiment, when a boundary line is within a bounding box, but the bounding box does not overlap with its neighbor, the line (instead of being moved to the right edge of the box) is adjusted to a point between the two non-overlapping bounding boxes. In an embodiment, when a boundary line is within a bounding box, but the bounding box does not overlap with its neighbor, the boundary line is adjusted to a point between the two non-overlapping bounding boxes, but weighted to be closer to the larger bounding box.

Figure 41:
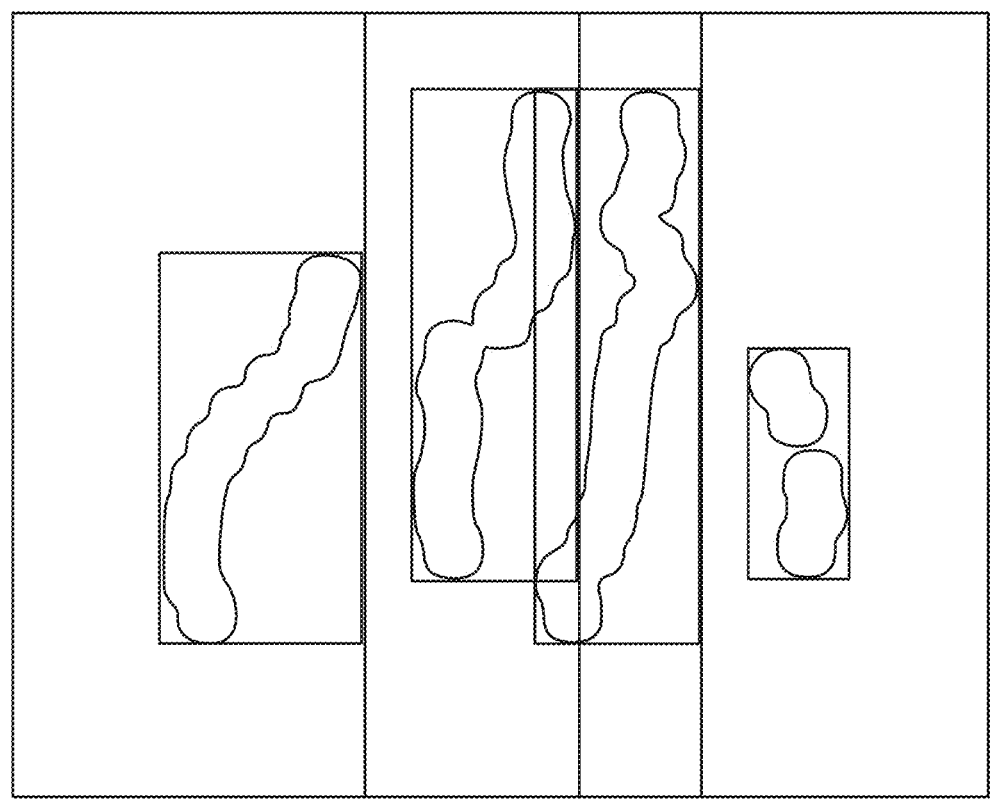
FIG. 41 shows an illustrative finger separation superimposed on enlarged the local maxima in bounding boxes shown in FIG. 40.
Figure 42:
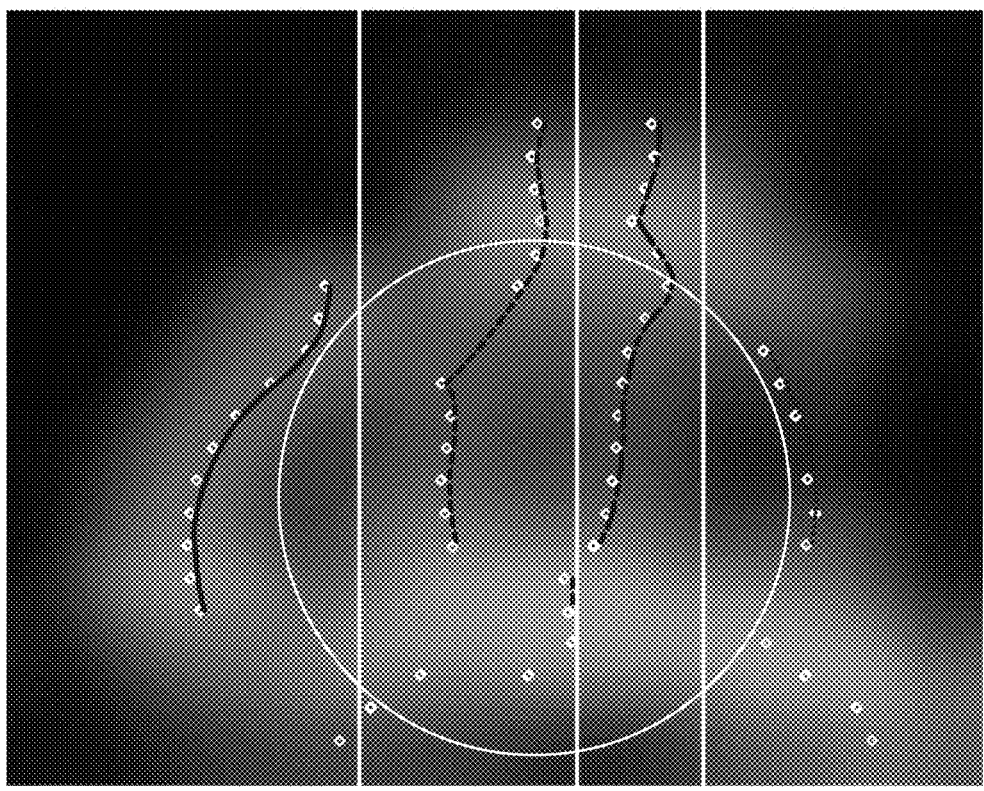
FIG. 42 provides an illustration showing a small segment error resulting from bunched fingers on the digit positions reflected in FIG. 41.

Because the overlap of bounding boxes and determined boundaries arises from the acquired data (and thus ostensibly from the actual hand position and controller geometry), the boundaries do not unambiguously determine the entire position of every finger. Turning briefly to FIG. 41, an illustration is shown where boundaries are shifted to the right side of the bounding boxes as described in connection with FIG. 40. Lines are used to connect relevant (i.e., unrejected or unignored maxima) as defined by the boundaries. The small error component can be seen to occur quite close to the palm. Notably, the error position which is proximal to the palm is an unlikely location for the first movement of a finger. Despite the small error, the technique has been found to be a substantial and quick means of assessing boundaries. In an embodiment, additional boundary processing may be employed to resolve such errors, but the resulting boundary may not result in straight lines, as in FIG. 42.

The width and length of each finger can also be measured using each finger's bounding box. To determine the width or thickness of each finger, the rightmost X-coordinate boundary of the finger's bounding box is subtracted from the leftmost X-coordinate boundary of the finger's bounding box. To determine the length of each finger, the bottommost Y-coordinate boundary of the finger's bounding box is subtracted from the topmost Y-coordinate boundary of the finger's bounding box.

The position of each finger joint and thickness of each finger joint can also be measured using each finger's bounding box and the local maxima for each finger. Dividing the length of the finger (as computed as detailed above), by three will give an approximation of the Y-position of each joint location. Using the Y-coordinate, one skilled in the art can use interpolation techniques to find the nearest X-coordinate position for each joint. Once these positions are known, the thickness of each joint can be determined by subtracting the rightmost X-coordinate boundary of the finger's bounding box at that Y-coordinate from the leftmost X-coordinate boundary of the finger's bounding box at that Y-coordinate.

The abduction of the fingers can also be determined using the bounding boxes of two fingers. When the right hand is grasping the controller, to determine the distance between the index finger and the middle finger, the leftmost X-coordinate in the middle finger's bounding box is subtracted from the rightmost X-coordinate in the index finger's bounding box. When the right hand is grasping the controller, to determine the distance between the middle finger and the ring finger, the leftmost X-coordinate in the ring finger's bounding box is subtracted from the rightmost X-coordinate in the middle finger's bounding box. When the right hand is grasping the controller, to determine the distance between the ring finger and the pinkie finger, the leftmost X-coordinate in the pinkie finger's bounding box is subtracted from the rightmost X-coordinate in the ring finger's bounding box. When the left hand is grasping the controller, to determine the distance between the index finger and the middle finger, the leftmost X-coordinate in the index finger's bounding box is subtracted from the rightmost X-coordinate in the middle finger's bounding box. When the right hand is grasping the controller, to determine the distance between the middle finger and the ring finger, the leftmost X-coordinate in the middle finger's bounding box is subtracted from the rightmost X-coordinate in the ring finger's bounding box. When the right hand is grasping the controller, to determine the distance between the ring finger and the pinkie finger, the leftmost X-coordinate in the ring finger's bounding box is subtracted from the rightmost X-coordinate in the pinkie finger's bounding box.

If two fingers are crossing each other while holding a controller, these finger postures can also be measured using the bounding boxes and local maxima. If only three bounding boxes are computed using the method described previously, the width of each bounding box can be computed. The bounding box with the largest width will have the two crossing fingers.

Figure 43:
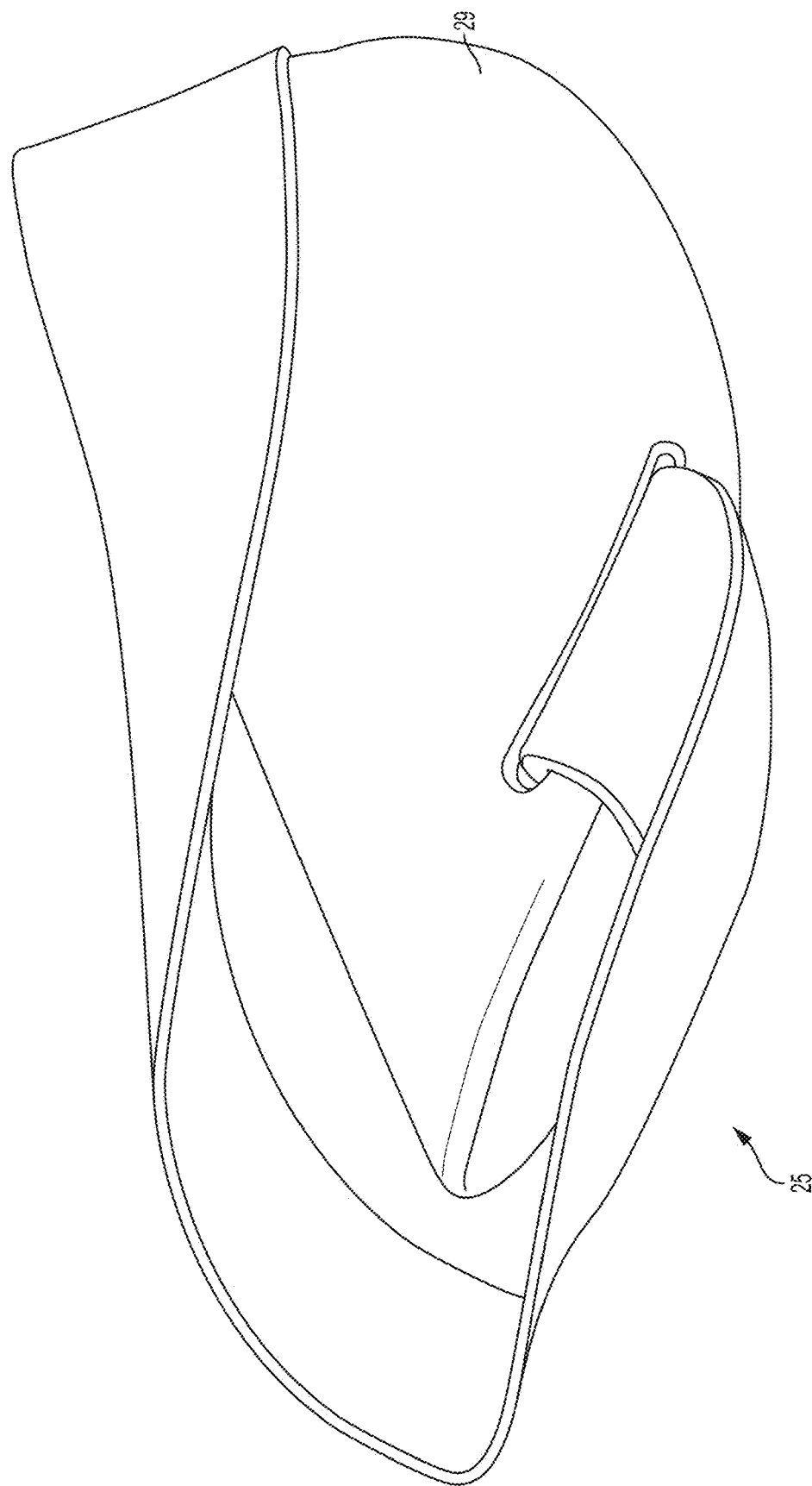
FIG. 43 shows an embodiment of a handheld controller having a strap, with the strap and other concealing material moved to show a signal infusion area.

FIG. 43 shows an embodiment of a handheld controller 25 having a strap, with the strap and other concealing material removed to show a signal infusion area 24. In an embodiment, the infuser area 24 is located under the controller strap to aid in contact between the hand and the infuser area 24. In an embodiment, an infusion signal transmitted to the infusion area 24 is conducted by a hand holding the controller 25, and received by the receivers in the controller 25. In an embodiment, the receivers in a controller 25 are oriented to be generally parallel with the direction of the fingers, see, e.g., the horizontal conductors shown in FIGS. 26 and 28.

In an embodiment, each receive line is examined to determine a magnitude of the infusion signal present thereon. In an embodiment, one magnitude is determined for each receiver. In an embodiment, additional values are determined by interpolation. In an embodiment, additional values are interpolated by Hermite interpolation.

Figure 44:
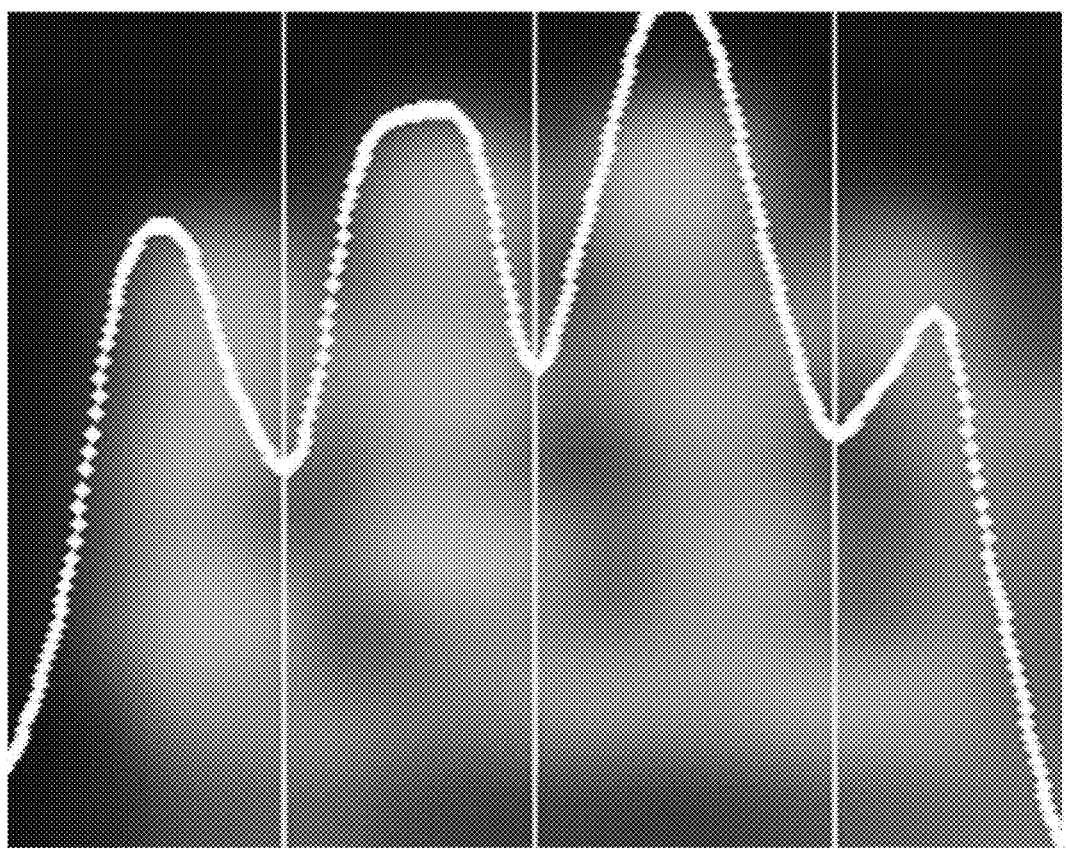
FIG. 44 shows a superimposition of a heatmap (graph) of signal infusion data and illustrative finger separation on the heatmap of FIG. 34.

A first derivative analysis is performed on the set of values (i.e., magnitudes, with or without additional interpolated values). Through the first derivative analysis, local minimas are identified as finger boundaries as determined from infusion data. FIG. 44 reflects finger boundaries as determined by infusion data.

As discussed above, in an embodiment, the infusion data and the touch data boundaries may be combined. In an embodiment, the infusion data and the touch data are averaged together. In an embodiment, the infusion data and the touch data are combined through a weighted average. In an embodiment, touch data is weighted based on the total number of maxima present.

In an embodiment, finger boundaries are calculated once in a calibration phase. In an embodiment, finger boundaries are recalculated periodically or upon the happening of an event. In an embodiment, finger boundaries are recalculated when a threshold input is reached, for example, changing from below a threshold number of local maxima in the touch data to more than the threshold number of local maxima. In an embodiment, the threshold number is 20. In an embodiment, the threshold number is between 20 and 30. In an embodiment, the threshold number is 30 or more.

Figure 45A:
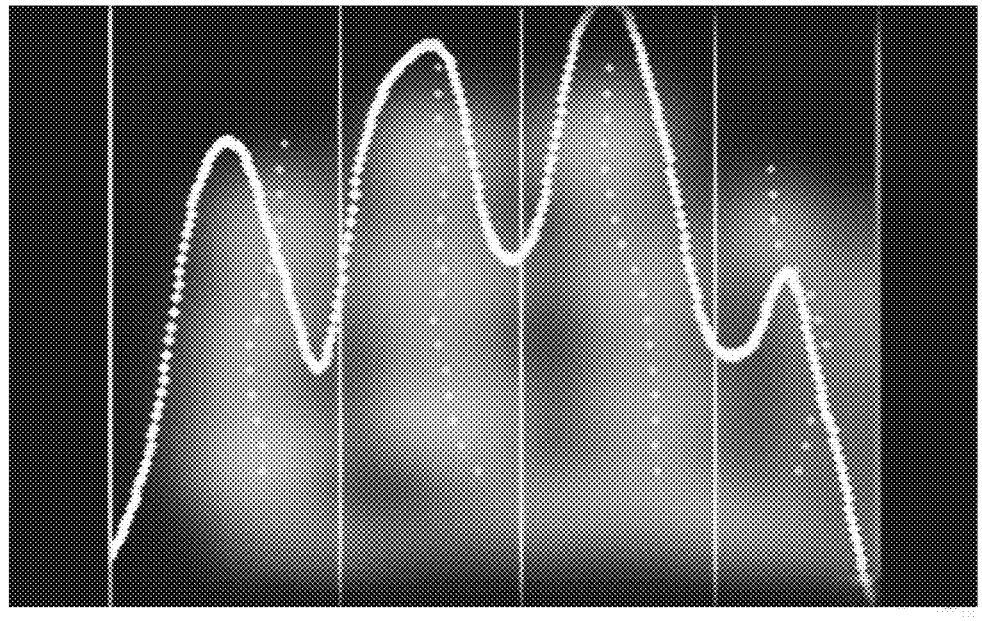
FIG. 45A shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45B:
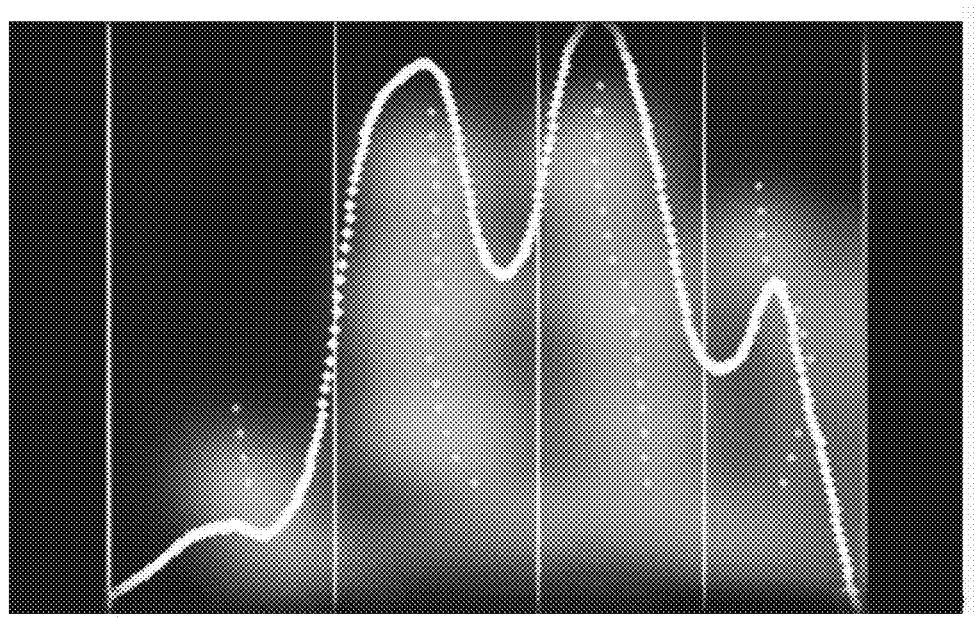
FIG. 45B shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45C:
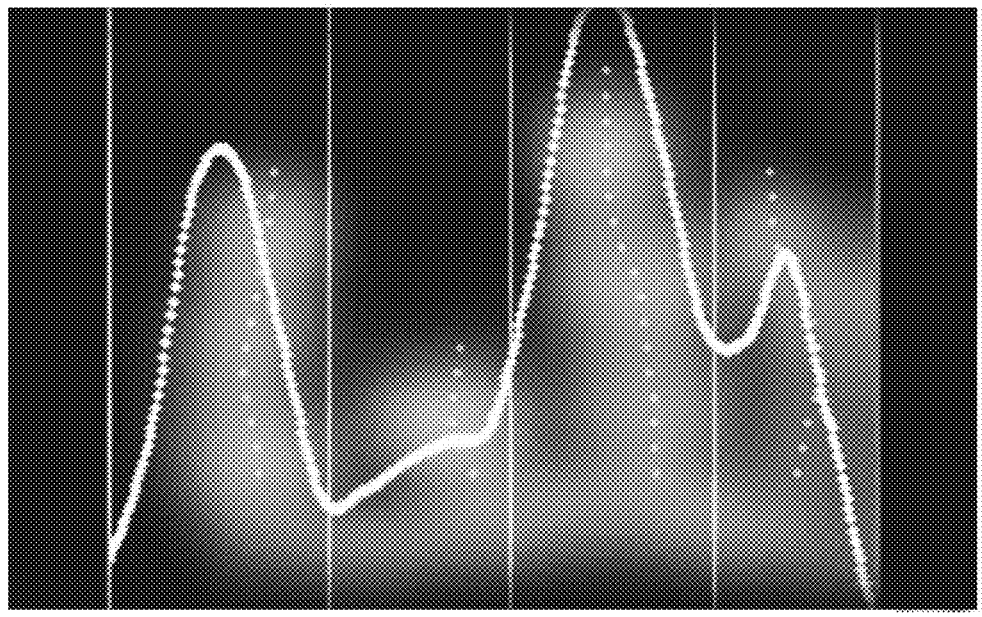
FIG. 45C shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45D:
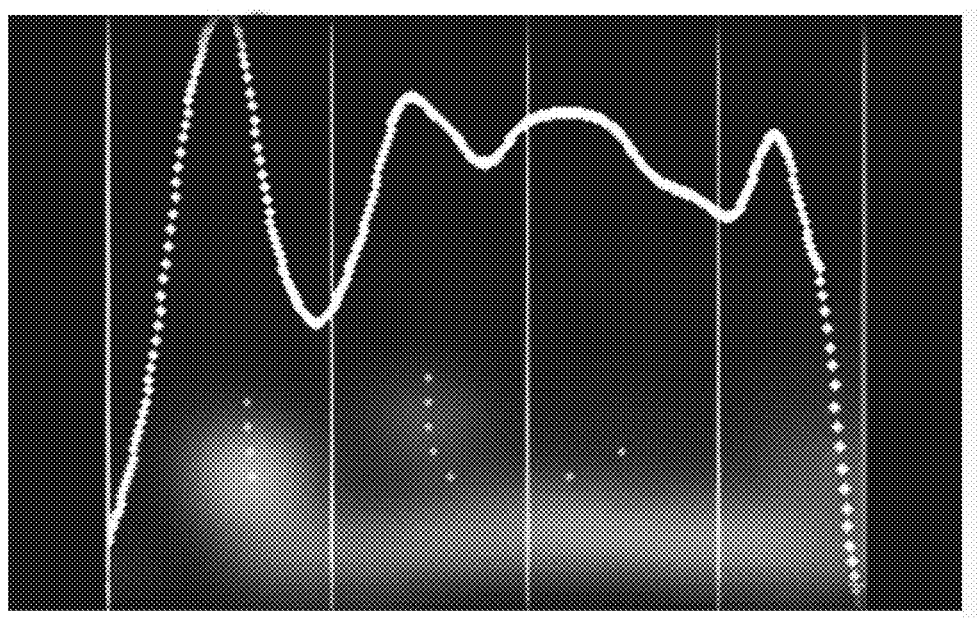
FIG. 45D shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45E:
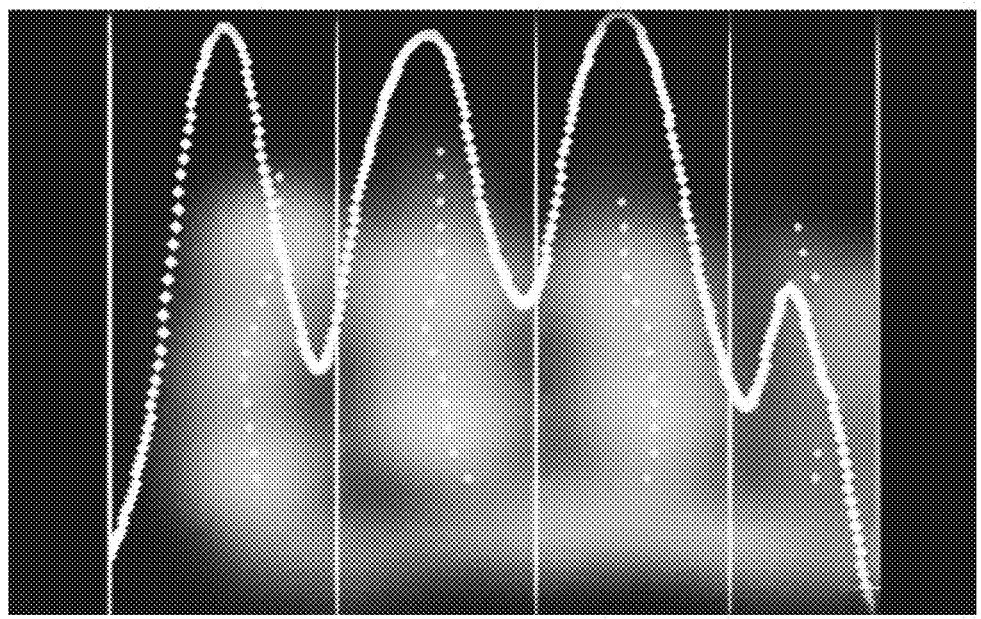
FIG. 45E shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45F:
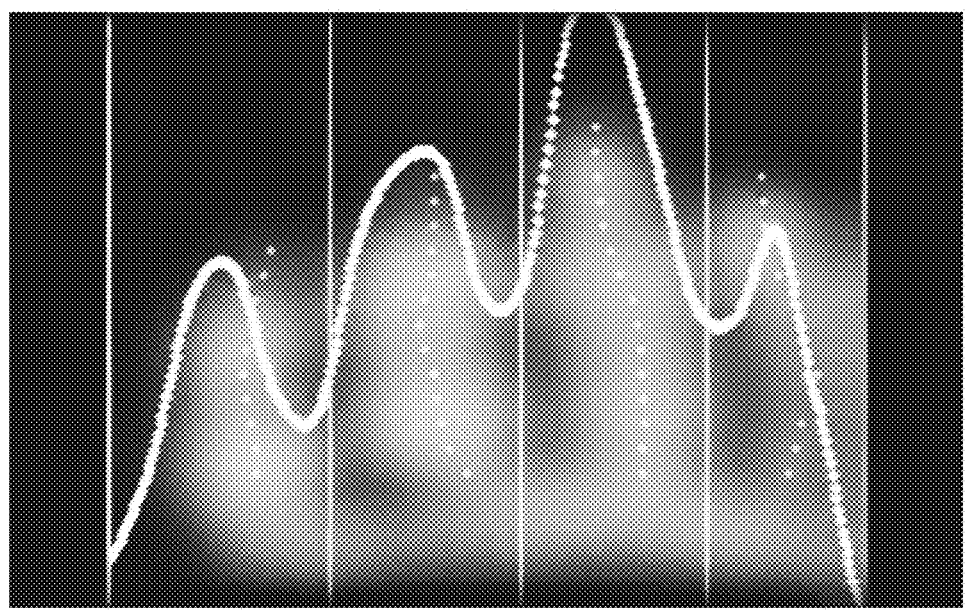
FIG. 45F shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45G:
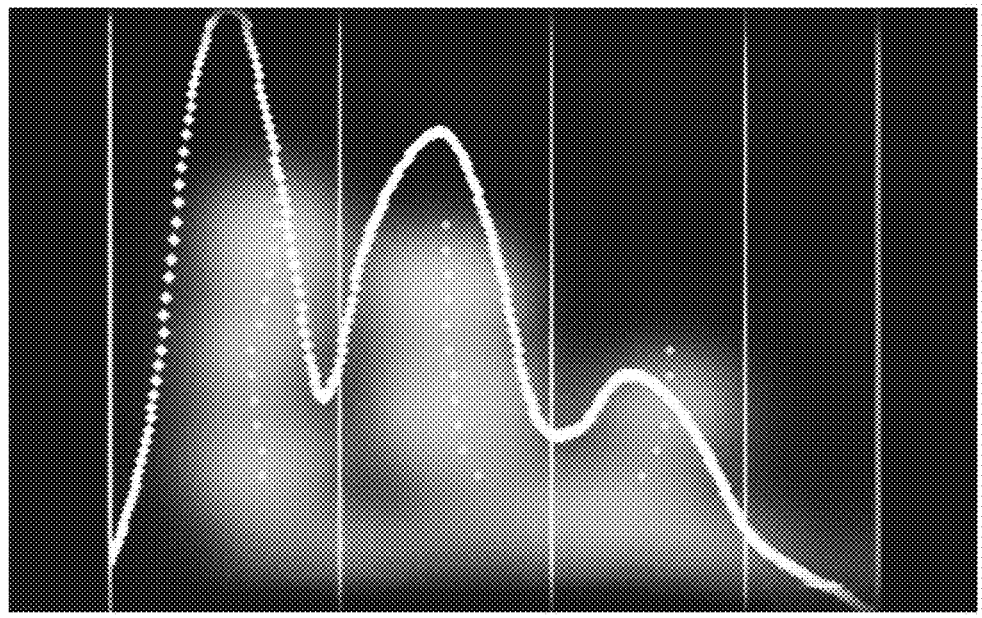
FIG. 45G shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45H:
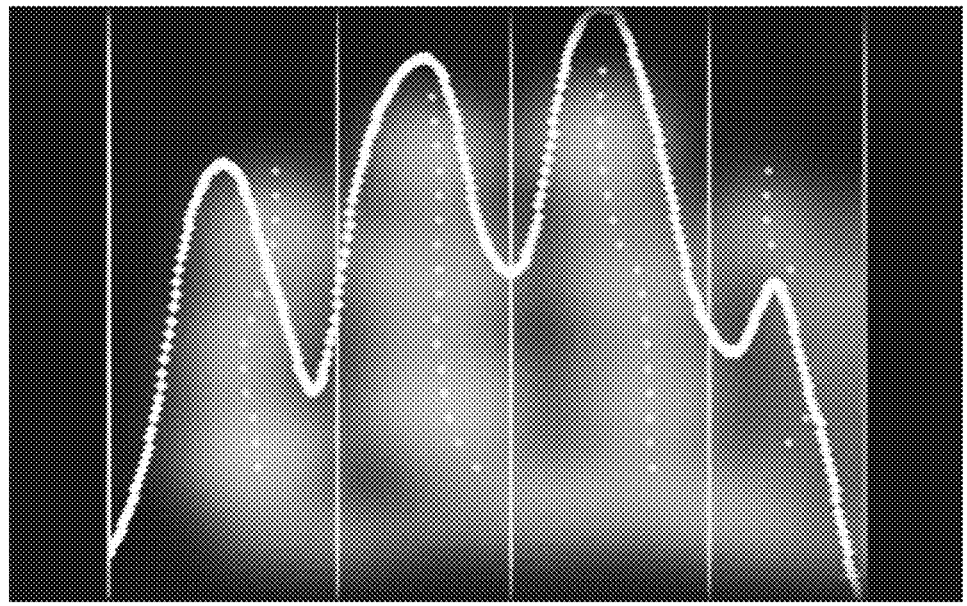
FIG. 45H shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45I:
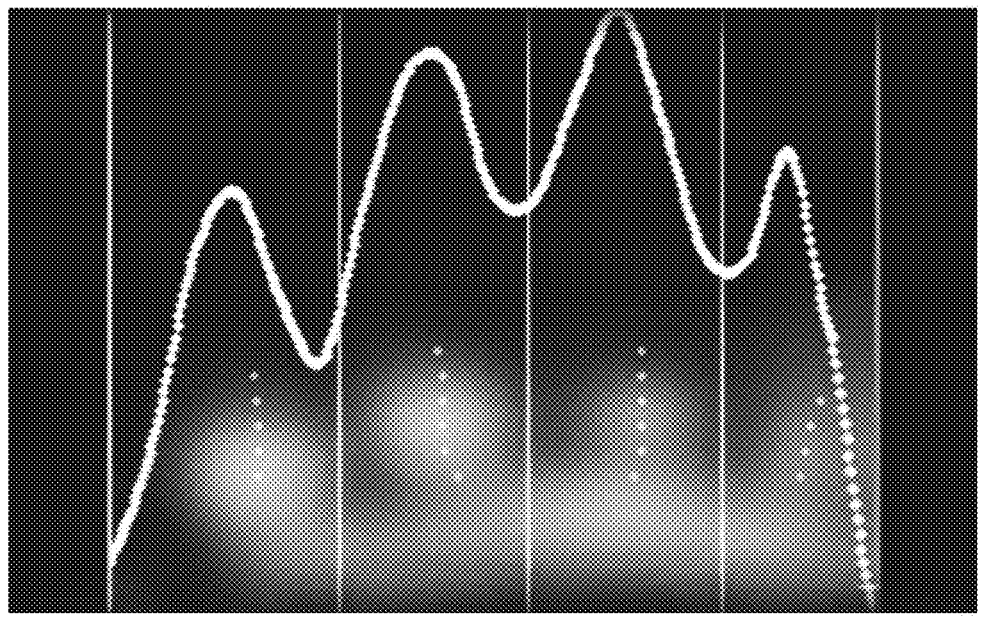
FIG. 45I shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45J:
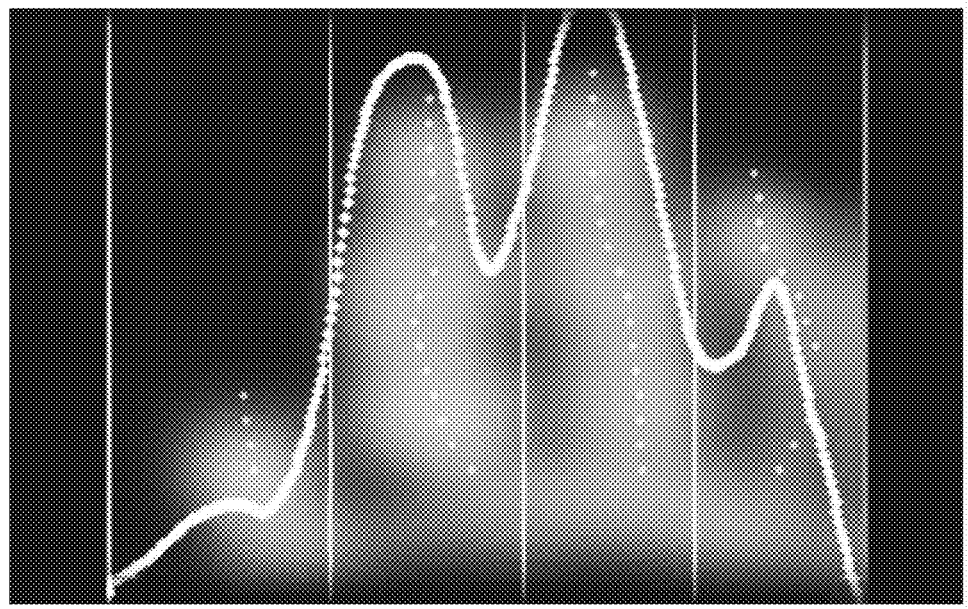
FIG. 45J shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45K:
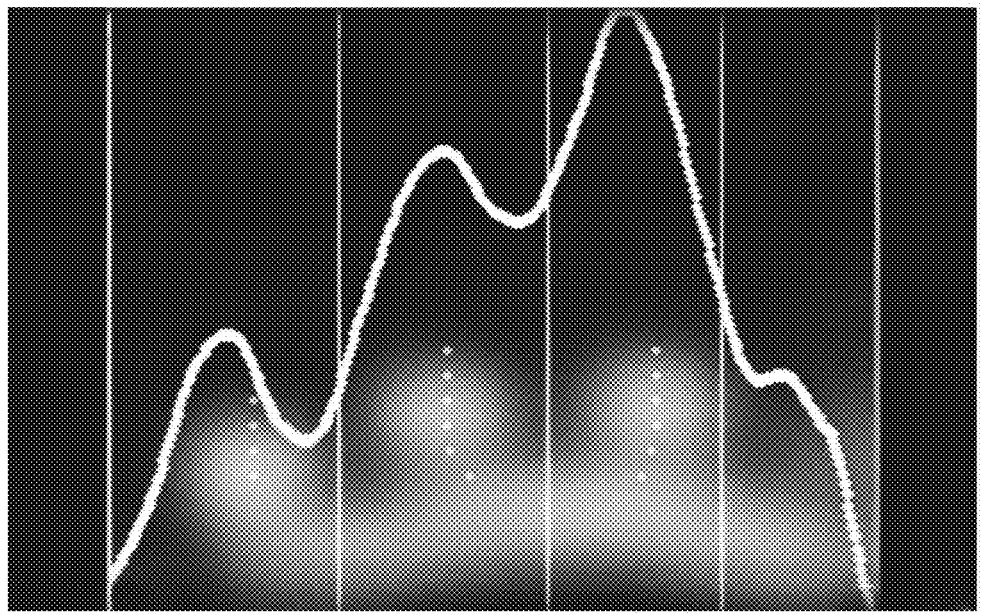
FIG. 45K shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.
Figure 45L:
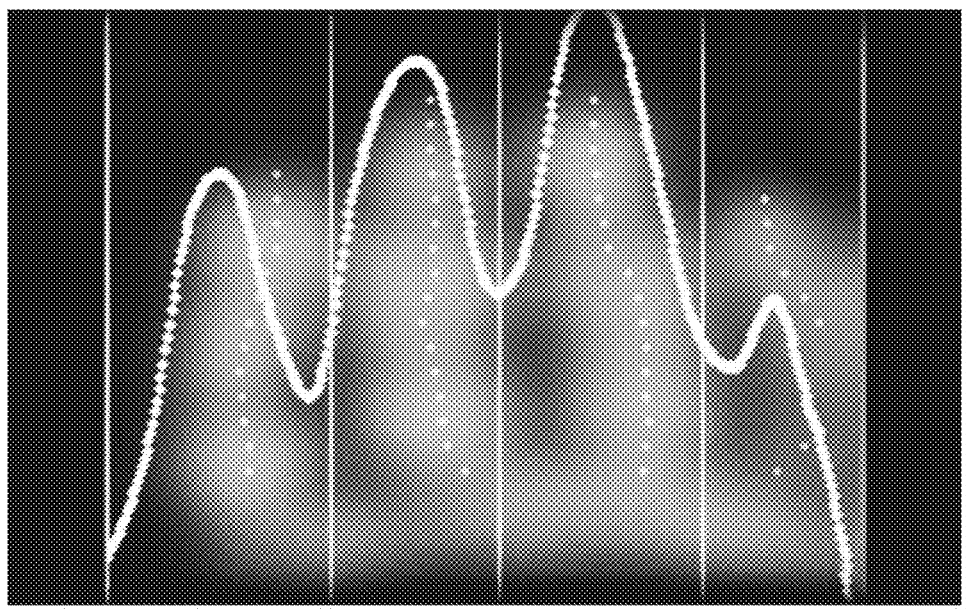
FIG. 45L shows a heatmap reflecting digit positions recorded on a handheld controller such as the one shown in FIG. 22; the non-superfluous local maxima calculated from the heatmap reflecting digit position; a heatmap (graph) of signal infusion data; and superimposed finger separation lines.

FIGS. 45A through 45L illustrate data acquired in sequence from a handheld controller (white ghosting), calculated local maxima (hollow diamonds) according to an embodiment of the present invention, interpolated infusion data (solid diamonds) according to an embodiment of the present invention, and boundaries determined based on the acquired data. As FIGS. 45A through 45L are reviewed, it is important to note that the boundaries varied between each based upon determinations made according various embodiments of the present invention as disclosed herein. In FIG. 45A, all four fingers appear to be in good contact with the controller and the boundaries between the maxima lines appears complete and accurate. In FIG. 45B, it appears that there is substantially less contact by the index finger. In FIG. 45C, it appears that the middle finger is straightened and the index finger is back in contact with the controller. FIG. 45D may reflect a substantial or complete straightening of all four fingers, which, in an embodiment would make the touch data reliability questionable. FIG. 45E may reflect that all four fingers are back in contact with the touch controller. FIG. 45F similarly appears to reflect substantial contact from all four fingers. In FIG. 45G, it can be inferred that at least the pinky and a substantial part of the ring finger is not in contact with the controller. FIG. 45H again may reflect that all four fingers are back in contact with the touch controller. Likewise, FIG. 45I may again reflect a substantial or complete straightening of all four fingers. FIG. 45J again shows a lack of substantial contact by the index finger. FIG. 45K may yet again reflect a substantial or complete straightening of all four fingers. FIG. 45L may again reflect good contact by all four fingers.

Body Skeletal Modeling

In an embodiment, data from a surface manifold (e.g., a manifold having a capacitive sensor or heterogeneous sensor) and a constrained model with limited degrees of freedom can be used to infer skeletal positioning. In an embodiment, using frequency injection descriptors, predefined profiles of signal strengths corresponding to a set of discrete positions of the skeleton (e.g., hand or spine) can be created or recorded. In an embodiment, descriptors are combined with baseline and noise reduction techniques or other multi-dimensional analysis technique to extract meaningful information from these descriptors that can correlate to the skeletal motion.

In an embodiment, fast multi-touch heatmap processing techniques may be used in addition to frequency strength signals. In an embodiment, hand tracking may be computed using a hierarchical skeleton-based description of a virtual hand to describe the real hand. In an embodiment, techniques can be applied to map the frequency injection descriptors into a continuous real-time animation of that skeleton mimicking the real hand motion. In an embodiment, mapping methods can rely on linear or nonlinear functions used in real time translating the signal feed into a feed of finger angles. In an embodiment, mapping methods can employ any correlation properties existing between signal strength samples and a ground truth reference captured using other techniques such as motion capture, other vision-based processing techniques, or predefined captured poses. In an embodiment, manual or automatic, supervised or unsupervised training, data mining, classification, MIMO-like techniques (such as principal component analysis) or regression techniques can be used to identify the adequate definition of these mapping functions priorly exploring the intrinsic properties of the signal injection techniques for hand tracking purposes. In an embodiment, software and hardware solutions can be combined with traditional fast multi-touch capabilities, exploring the same fast multi-touch sensor, or complementing a fast multi-touch touch sensor with additional receivers. In an embodiment, software and hardware solutions can be combined with traditional fast multi-touch capabilities, exploring the same fast multi-touch sensor, or complementing a fast multi-touch touch sensor with additional receivers and signal injectors.

It will be apparent to a person of skill in the art in view of this disclosure that the intrinsic properties of the signal injection as applied to and measured from the hand as described above can be used as the basis to define the model mapping. In an embodiment, the data technique is used to identify the adequate definition of the mapping functions which can be used for hand modeling, and thus hand tracking purposes. In an embodiment, the signal injection hardware and software as discussed above, can be combined with fast multi-touch capabilities, thus complementing a fast multi-touch touch sensor system with capacity to recognize additional injected frequencies.

It will be apparent to a person of skill in the art in view of this disclosure capacitive sensing has historically been used for two-dimensional positioning; detecting touch versus non-touch, or hard touch versus soft touch. Although capacitive sensing has some capability to detect hover, capacitive sensing was not known to be heretofore used to infer skeletal position. In an embodiment, the surface manifold can be conformed to a large variety of shapes, which can provide a known mathematical relation between sensors. Thus, in an embodiment, the surface manifold as conformed to an object can be mixed with a constrained model to infer skeletal position.

Where the surface manifold is conformed to a shape that itself is alterable or deformable within its own set of known constraints, the surface manifold can be used to track such alterations or deformations. For example, a manifold conformed to a folding object (e.g., folding smartphone) can use its own capacitive interaction and injected signals to interpret or infer the position of the phone. In another example, a game ball (e.g., a football or basketball) with known deformation characteristics when used can use a manifold conformed within or without its surface to interpret or infer its own deformation. Thus, in an embodiment, the surface manifold as conformed to an object can be mixed with a constrained model to infer information about the object.

With respect to the disclosures discussed above, embodiments of this disclosure relate to methods used for determining separation between discrete units represented in capacitive sensor data. Embodiments of this disclosure also relate to methods used for determining separation between fingers represented in capacitive sensor data on a handheld controller. Embodiments of this disclosure further relate to methods used for determining boundaries between discrete units represented in capacitive data and infusion data acquired on a common sensor. Embodiments of this disclosure also relate to methods used for determining boundaries between discrete units by combining capacitive data and infusion data acquired in parallel on a common sensor.

Additionally, embodiments of this disclosure relate to a system for modeling the movement of fingers about a handheld controller having a plurality of receiver lines and a plurality of transmitter lines, and an infusion area, where a touch signal transmitter is associated with the plurality of transmitter lines and configured to simultaneously transmit a unique signal on each of the plurality of transmitter lines, and an infusion signal transmitter is associated with the infusion area and configured to transmit an infusion signal to the infusion area, a receiver is associated with each of the plurality of receiver lines, and a processor is configured to generate a heatmap reflecting touch signal interaction on the receiver lines, generate an infusion map reflecting the infusion signal interaction on the receiver lines, determine a boundary between fingers on the handheld controller based at least in part on the heatmap and the infusion map, and output a model reflecting movement of fingers about a handheld controller.

Also embodiments of this disclosure relate to a system for modeling the movement of separately identifiable body parts (having a known relationship to each other) about a sensor having a plurality of receiver lines and a plurality of transmitter lines, and an infusion area, where a touch signal transmitter is associated with the plurality of transmitter lines and configured to simultaneously transmit a unique signal on each of the plurality of transmitter lines, and an infusion signal transmitter is associated with the infusion area and configured to transmit an infusion signal to the infusion area, a receiver is associated with each of the plurality of receiver lines, and a processor is configured to generate a heatmap reflecting touch signal interaction on the receiver lines, generate an infusion map reflecting the infusion signal interaction on the receiver lines, determine a boundary between identifiable body parts on the sensor based at least in part on the heatmap and the infusion map, and output a model reflecting movement of the body parts about the sensor.

As disclosed herein, embodiments of this disclosure relate to using heterogeneous capacitive data from a surface manifold, discrete capacitive sensors, and frequency injection transmitters and receiving layers alongside a constrained model with limited degrees of freedom to infer skeletal positioning.

Further, as disclosed herein, embodiments relate to a heterogeneous sensor for detecting touch and non-contact touch events (e.g., hover events) occurring more than a few millimeters from the sensor surface. In some embodiments, the sensor includes additional sensor layers. In some embodiments, the sensor comprises one or more receive antennas, which may be, but need not be, located on a common layer with the rows or the columns. In some embodiments, the sensor comprises one or more injection signal conductors, which may be, but need not be, located on a common layer with the rows or the columns.

Further, as disclosed herein, embodiments of the disclosure relate to the orientation of a heterogeneous sensor manifold on the surface of an object. In some embodiments, the manifold includes additional sensor layers, which may be associated with drive circuitry to generate additional orthogonal signals for transmission thereupon. In some embodiments, the sensor comprises one or more receive antennas, which may be, but need not be, located on a common layer with the rows or the columns. In some embodiments, the sensor comprises one or more injection signal conductors, which may be, but need not be, located on a common layer with the rows or the columns, and which may be associated with drive circuitry to generate additional orthogonal signals for transmission thereupon.

Also embodiments of the disclosure relate to a heterogeneous sensor having drive circuitry for the rows, and drive circuitry for one or more additional antennas or rows, the signals simultaneously generated by the drive circuitries being orthogonal to one-another, which orthogonality may be, but is not necessarily limited to frequency orthogonality. In some embodiments, signals received by receivers are processed to determine a strength for each of the orthogonal signals, and this information may be used to determine touch events. In some embodiments, the touch events are associated with discrete sources, and a skeletal model may be inferred from the touch events.

Further, as disclosed herein, embodiments relate to a heterogenous sensor that creates a first heatmap from orthogonal signals in a first range, and creates a separate heatmap from orthogonal signals in a second range. In some embodiments, the first heatmap is used as a basis to infer a, or multiple, skeletal models. In some embodiments, the second heatmap is used as a basis to infer a, or multiple, skeletal models. In some embodiments, the two heatmaps are both used as a basis to infer a, or multiple, skeletal models.

Also embodiments of the disclosure relate the measurement of the three-dimensional position, orientation, "curl" or flex, thickness, length, and abduction of the fingers, position, orientation, and length of the joints of the fingers, breadth of the palm, identification of the hand (i.e., right or left), and crossing of the fingers, of the hand holding a device with a heterogeneous sensor that are measured by the signals injected into the hand and the contribution of each of these signals at various points along the heterogeneous sensor.

Additionally, embodiments of the disclosure relate to a system for modeling the movement of separate identifiable body parts (having a known relationship to each other) about a sensor having a plurality of receiver lines and a plurality of transmitter lines, and an infusion area, where a touch signal transmitter is associated with the plurality of transmitter lines and configured to simultaneously transmit a unique signal on each of the plurality of transmitter lines, and an infusion signal transmitter is associated with the infusion area and configured to transmit an infusion signal to the infusion area, a receiver is associated with each of the plurality of receiver lines, and a processor is configured to generate a heatmap reflecting touch signal interaction on the receiver lines, generate an infusion map reflecting the infusion signal interaction on the receiver lines, determine a boundary between identifiable body parts on the sensor based, at least, in part, on the heatmap and the infusion map, and output a model reflecting movement of the body parts about the sensor.

Further, embodiments of the disclosure relate to a hand operated controller having at least one heterogeneous sensor manifold that surrounds at least a portion of the controller body. In some embodiments, the heterogeneous sensor manifold comprises a third layer of rows. In some embodiments, the heterogeneous sensor manifold comprises a third layer of columns. In some embodiments, the heterogeneous sensor manifold comprises a plurality of antennas. In some embodiments, an injection signal conductor supplies an injected signal, the injection signals may be, but need not be, on or within the manifold. In some embodiments, an injection signal conductor is internal to a hand held, hand worn, finger held, and/or finger worn, device, and may be, but need not be, physically separated from the device. In some embodiments, an injection signal conductor is external to a hand held, hand worn, finger held, and/or finger worn, device, and may be, but need not be, physically separated from the device.

Further, embodiments of the disclosure relate to a sensor deployed in a manner such that touch events can be used to infer a constrained skeletal model. In some embodiments, the sensor is deployed on a hand operated controller. In some embodiments the sensor is deployed on a hand held or worn input peripheral such as a stylus or mouse. In some embodiments the sensor is deployed as part of a hand held or worn artifact such as a bracelet, watch, ring, ball, smartphone, shoe, or tangible object. In some embodiments, the sensor is deployed proximate to the surface such as a steering wheel, keyboard, touchscreen, or flight control, and may be, but need not be also, deployed proximate to the surface of other areas within reach of the operator of that control (such as proximate to the surface of the dashboard, the surface of controls on the dashboard, or the surface of other controls). In some embodiments, the sensor, or additional sensors are deployed proximate to the surface of an operator seat, armrest, headrest, seat belt, or restraint. In some embodiments, one or more injection signal conductors supply an injected signal. In some embodiments, one or more injection signal conductors are deployed in, or proximate to, the sensor manifold. In some embodiments, one or more injection signal conductors are deployed in an operator seat, armrest, headrest, seat belt, or restraint.

As disclosed herein, embodiments of the sensor are deployed proximate to the surface of an object having known constraints of deformation such as a flexible screen or ball, and the sensor is used as a self-sensing mechanism to detect deformation. In some embodiments, one or more injection signal conductors are deployed in, or proximate to, the sensor manifold on the surface of the deformable object.

As disclosed herein, heterogeneous sensing may be accomplished using a combination of data reflecting mutual-capacitance and frequency injection. In some embodiments, heterogeneous sensing is accomplished using a combination of data reflecting mutual-capacitance, frequency injection, and cross-talk. In some embodiments, heterogeneous sensing is accomplished using a combination of data reflecting mutual capacitance and frequency injection, and a known constraint model or plurality of known constraint models, of which a known constraint model could, for example, be a model of object deformation or a model of skeletal constraints, such as a model of object pose or degrees of freedom. In some embodiments, a model of object pose or degrees of freedom could be further constrained by a shape, such as a hand controller shape, that limits the object's poses.

Other embodiments of disclosure are related to and describe a sensor that combines the results of two separate types of sensing to enable better detection. The present disclosure describes a sensor receiving system that can receive and interpret two separate types of sensor data. The present disclosure describes a sensor that combines the results of two separate types of sensing using the same receivers to enable better detection. The present disclosure describes methods for combining the results of separate sensing data to reduce errors, improve accuracy and/or improve overall sensing. The present disclosure describes methods and apparatus to use signal infusion to enhance appendage detection. The present disclosure describes a method for determining finger separation from touch data using the results of a Fourier transform reflecting the interaction of touch with the sensor. The present disclosure also describes a method for determining finger separation from touch data and using infusion information to overcome various hand posture challenges that cannot be resolved using touch data. The present disclosure describes a sensor layout on controller, with a segmented spatial orientation that provides a robust heterogenous design to sense touch and infusion data.

Also, an embodiment of the disclosure is related to a hand operated controller comprising a body portion, with a curved finger area around which a user's fingers may wrap, the finger area having a vertical axis; a manifold comprising a plurality of row conductors in a first layer, a plurality of columns in a second layer, the path of each of the row conductors in the first layer crossing the path of each of the columns in the second layer, a plurality of antenna, and the manifold being disposed upon a surface of at least a portion of the body portion; antenna receiver associated with each one of the plurality of antenna, the antenna receiver adapted to receive signals present on its associated antenna, at least one injection signal conductor; each of the plurality of row conductors in the first layer and each of the at least one injection conductors being associated with a drive signal circuit, the drive signal circuit adapted to transmit a unique orthogonal signal upon each; each unique orthogonal signal being orthogonal to each other unique orthogonal signal; each of the plurality of columns being associated with a column receiver adapted to receive signals present on its associated column; and the injection signal conductor being associated with a row receiver adapted to receive signals present thereon.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A system for modeling the movement of fingers about a handheld controller comprising:
    a handheld controller body comprising;
        a plurality of receiver conductors oriented generally parallel on the handheld controller body;
        a plurality of transmitter conductors oriented generally normal to the orientation of the plurality of receiver conductors;
        an infusion area positioned proximate to a surface of the controller body;
        a touch signal transmitter associated with the plurality of transmitter conductors, the touch signal transmitter configured to simultaneously transmit a unique signal on each of the plurality of transmitter conductors, each of the unique signals being different than each of the other unique signals;
        an infusion signal transmitter associated with the infusion area, the infusion signal transmitter configured to transmit an infusion signal to the infusion area simultaneously with the transmission of the unique signals by the touch signal transmitter;
        a receiver associated with the plurality of receiver conductors, the receiver being adapted to receive signals present thereon;
    a processor configured to;
        generate a heatmap related to touch signal interaction on the receiver conductors;
        generate an infusion map related to infusion signal interaction on the receiver conductors;
        determine a boundary between fingers on the handheld controller based at least in part on the heatmap and the infusion map; and
        output a model related to movement of at least one finger about controller body.

2. The system of claim 1, wherein the infusion area is adapted to contact the palm of a user.

3. The system of claim 1, wherein the receiver conductors are adapted to be generally parallel to fingers of a user.

4. The system of claim 1, wherein the touch signal transmitter and the infusion transmitter are the same transmitter.

5. The system of claim 1, wherein the boundary between fingers on the handheld controller is based on the heatmap and the infusion map.

6. The system of claim 5, wherein the boundary between fingers on the handheld controller is based on local maxima in the heatmap.

7. The system of claim 6, wherein the boundary between fingers on the handheld controller is based on local minima in the infusion map.

8. The system of claim 1, wherein each of the unique signals are frequency orthogonal to each other.

9. A controller for modeling the movement of body parts comprising:
    a controller body comprising;
        a plurality of receiver conductors oriented generally parallel on the handheld controller body,
        a plurality of transmitter conductors oriented generally normal to the orientation of the plurality of receiver conductors,
        an infusion area positioned proximate to a surface of the controller body;
        a touch signal transmitter associated with the plurality of transmitter conductors, the touch signal transmitter configured to simultaneously transmit a unique signal on each of the plurality of transmitter conductors, each of the unique signals being different than each of the other unique signals;
        an infusion signal transmitter associated with the infusion area, the infusion signal transmitter configured to transmit an infusion signal to the infusion area simultaneously with the transmission of the unique signals by the touch signal transmitter; and
        a receiver associated with the plurality of receiver conductors, the receiver being adapted to receive signals present thereon, wherein the received signals are used to generate a heatmap related to touch signal interaction on the receiver conductors, generate an infusion map related to infusion signal interaction on the receiver conductors, determine a boundary between body parts on the controller body based at least in part on the heatmap and the infusion map, and output a model related to movement of at least one body part about the controller.

10. The controller of claim 9, wherein the infusion area is adapted to contact the palm of a user.

11. The controller of claim 9, wherein the receiver conductors are adapted to be generally parallel to fingers of a user.

12. The controller of claim 9, wherein the touch signal transmitter and the infusion transmitter are the same transmitter.

13. The controller of claim 9, wherein the boundary between body parts is based on the heatmap and the infusion map.

14. The controller of claim 13, wherein the boundary between fingers on the handheld controller is based on local maxima in the heatmap.

15. The controller of claim 14, wherein the boundary between fingers is based on local minima in the infusion map.

16. The controller of claim 9, wherein each of the unique signals are frequency orthogonal to each other.

17. A method for modeling the movement of body parts comprising:
    simultaneously transmitting a unique signal on each of a plurality of transmitter conductors, each of the unique signals being different than each of the other unique signals;
    transmitting an infusion signal to an infusion area simultaneously with the transmission of the unique signals;
    receiving signals on receiver conductors;
    generating a heatmap related to touch signal interaction on the receiver conductors;

generating an infusion map related to infusion signal interaction on the receiver conductors; and determining a boundary between body parts based at least in part on the heatmap and the infusion map, and output a model related to movement of at least one body part.

18. The method of claim 17, wherein the boundary between body parts on the handheld controller is based on the heatmap and the infusion map.

19. The method of claim 17, wherein the boundary between body parts is based on local maxima in the heatmap.

20. The method of claim 17, wherein the boundary between fingers is based on local minima in the infusion map.

* * * * *